United States Patent
Schultheiss et al.

(10) Patent No.: US 10,309,212 B2
(45) Date of Patent: Jun. 4, 2019

(54) ENERGETIC COCRYSTALS FOR TREATMENT OF A SUBTERRANEAN FORMATION

(71) Applicant: Halliburton Energy Services, Inc., Houston, TX (US)

(72) Inventors: Nathan Carl Schultheiss, Kingwood, TX (US); Jeremy A. Holtsclaw, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 228 days.

(21) Appl. No.: 14/910,528

(22) PCT Filed: Aug. 27, 2013

(86) PCT No.: PCT/US2013/056825
§ 371 (c)(1),
(2) Date: Feb. 5, 2016

(87) PCT Pub. No.: WO2015/030730
PCT Pub. Date: Mar. 5, 2015

(65) Prior Publication Data
US 2016/0177698 A1    Jun. 23, 2016

(51) Int. Cl.
*E21B 47/00* (2012.01)
*C09K 8/03* (2006.01)
(Continued)

(52) U.S. Cl.
CPC .......... *E21B 47/00* (2013.01); *C06B 21/0066* (2013.01); *C06B 25/04* (2013.01);
(Continued)

(58) Field of Classification Search
CPC ...... E21B 43/263; E21B 43/267; E21B 43/26; E21B 47/00; E21B 49/00
See application file for complete search history.

(56) References Cited

U.S. PATENT DOCUMENTS

| 3,561,532 A | 2/1971 | Fletcher et al. |
| 3,659,652 A | 5/1972 | Roberts |

(Continued)

FOREIGN PATENT DOCUMENTS

| WO | WO-2013081609 A1 | 6/2013 |
| WO | WO-2013/106850 A1 | 7/2013 |
| WO | WO-2015030730 A1 | 3/2015 |

OTHER PUBLICATIONS

"International Application Serial No. PCT/US2013/056825, International Search Report dated May 27, 2014", 3 pgs.
(Continued)

*Primary Examiner* — Brad Harcourt
(74) *Attorney, Agent, or Firm* — Thomas Rooney; C. Tumey Law Group PLLC

(57) ABSTRACT

The present invention relates to energetic cocrystals, and to methods for using the same for treatment of a subterranean formation. In various embodiments, the present invention provides a method of treating a subterranean formation, the method including obtaining or providing a composition including energetic cocrystals. Each energetic cocrystal independently includes an energetic compound and a secondary material. The method also includes placing the composition in a subterranean formation.

23 Claims, 6 Drawing Sheets

(51) Int. Cl.

| | |
|---|---|
| *C09K 8/52* | (2006.01) |
| *C09K 8/62* | (2006.01) |
| *C09K 8/72* | (2006.01) |
| *E21B 43/26* | (2006.01) |
| *E21B 49/00* | (2006.01) |
| *C06B 21/00* | (2006.01) |
| *C06B 25/04* | (2006.01) |
| *C06B 25/34* | (2006.01) |
| *C06B 47/00* | (2006.01) |
| *C06B 47/14* | (2006.01) |
| *C09K 8/80* | (2006.01) |
| *E21B 43/267* | (2006.01) |
| *G01V 1/104* | (2006.01) |
| *G01V 1/28* | (2006.01) |

(52) U.S. Cl.
CPC ............. *C06B 25/34* (2013.01); *C06B 47/00* (2013.01); *C06B 47/14* (2013.01); *C09K 8/03* (2013.01); *C09K 8/52* (2013.01); *C09K 8/62* (2013.01); *C09K 8/72* (2013.01); *C09K 8/805* (2013.01); *E21B 43/26* (2013.01); *E21B 43/267* (2013.01); *E21B 49/00* (2013.01); *G01V 1/104* (2013.01); *G01V 1/288* (2013.01)

(56) References Cited

U.S. PATENT DOCUMENTS

| | | |
|---|---|---|
| 3,747,679 A | 7/1973 | Roberts |
| 4,343,663 A | 8/1982 | Breza et al. |
| 5,597,974 A | 1/1997 | Voreck, Jr. et al. |
| 6,651,564 B1 | 11/2003 | Tite et al. |
| 2003/0037692 A1 | 2/2003 | Liu |
| 2004/0226715 A1 | 11/2004 | Willberg et al. |
| 2009/0288820 A1 | 11/2009 | Barron et al. |
| 2009/0308613 A1* | 12/2009 | Smith ............... E21B 43/26 166/305.1 |
| 2012/0037368 A1 | 2/2012 | Eick et al. |
| 2012/0305150 A1* | 12/2012 | Matzger ............ C06B 21/0066 149/92 |

OTHER PUBLICATIONS

"International Application Serial No. PCT/US2013/056825, Written Opinion dated May 27, 2014", 12 pgs.

Bolton, O., et al., "High Power Explosive with Good Sensitivity: A 2:1 Cocrystal of CL-20:HMX", Cryst. Growth Des., 12, (2012), 4311-4313.

Landenberger, K., et al., "Cocrystal Engineering of a Prototype Energetic Material: Supramolecular Chemistry of 2,4,6-trinitrotoluene", Cryst. Growth Des., 10, (2010), 5341-5347.

Landenberger, K., et al., "Cocrystals of 1,3,5,7-Tetranitro-1,3,5,7-tetrazacyclooctane (HMX)", Cryst. Growth Des., 12, (2012), 3603-3609.

Yang, Z., et al., "Characterization and Properties of a Novel Energetic-Energetic Cocrystal Explosive Compound of HNIW and BTF", Cryst. Growth Des., 12, (2012), 5155-5158.

Zhang, C., et al., "Toward low-sensistive and high-energetic cocrystal I: evaluation of the power and the safety of observed energetic cocrystals", CrystEngComm, 15, (2013), 4003-4014.

"Australian Application Serial No. 2013399169, First Examiner Report dated Aug. 5, 2016", 8 pgs.

Shen, Jin P., et al., "Preparation and Characterization of a Novel Cocrystal Explosive", *Crystal Growth & Design*, 11. (2011), 1759-1765.

\* cited by examiner

ENERGETIC COCRYSTALS FOR TREATMENT OF A SUBTERRANEAN FORMATION

PRIORITY APPLICATIONS

This application is a U.S. National Stage filing under 35 U.S.C. 371 from International Application No. PCT/US2013/056825, filed on Aug. 27, 2013; and published as WO 2015/030730 on Mar. 5, 2015; which application and publication are incorporated herein by reference in their entirety.

BACKGROUND OF THE INVENTION

Hydraulic fracturing is an important technique that includes placing or extending channels from the wellbore to the reservoir. This operation includes hydraulically injecting a fracturing fluid into a wellbore penetrating or adjacent to a petroleum-producing subterranean formation and forcing the fracturing fluid against the surrounding subterranean material by pressure. The subterranean material is forced to crack, creating or enlarging one or more fractures. Proppant can be placed in fractures to prevent or reduce closure. The fractures can provide flow or can provide improved flow of the recoverable fluids from the formation, such as petroleum materials.

The geometry of a hydraulic fracture can have a heavy impact on the efficiency of an extraction operation. It can be valuable to understand the dimensions and pattern of a hydraulic fracture, such as during and after the fracturing operation, including after other stimulation treatments are conducted. One method currently used to characterize hydraulic fractures is by the detection of microseismic events triggered by shear slippage on bedding planes or on natural fractures adjacent to the hydraulic fracture. However, limited data regarding fracture geometry, including length, height, width, and the overall pattern of the fracture, is provided by current methods.

A wide variety of energetic materials are known. However, sensitivity to shock, pressure, temperature, density, and chemical sensitivity limits the ability to use various energetic materials downhole in subterranean extraction operations safely and effectively.

SUMMARY OF THE INVENTION

Various embodiments of the present invention provide a method of treating a subterranean formation. The method includes obtaining or providing a composition. The composition includes energetic cocrystals. Each energetic cocrystal independently includes an energetic compound and a secondary material. The method also includes placing the composition in the subterranean formation.

In various embodiments, the present invention provides a method of treating a subterranean formation. The method includes obtaining or providing a composition including energetic cocrystals. Each energetic cocrystal independently includes an energetic compound and a secondary material. The method also includes placing the composition in a subterranean formation. The subterranean formation includes at least one of a fracture, flow pathway, area surrounding a fracture, and an area surrounding a flow pathway. The method includes detonating at least some of the energetic cocrystals. The detonation of the energetic cocrystals generates a compression wave. The method also includes using the compression wave to determine at least one characteristic of the fracture, flow pathway, area surrounding the fracture, or area surrounding the flow pathway.

In various embodiments, the present invention provides a system including a composition. The composition includes energetic cocrystals, wherein each energetic cocrystal independently includes an energetic compound and a secondary material. The system includes a subterranean formation including the composition therein.

In various embodiments, the present invention provides an apparatus including a mixing tank. The mixing tank is configured to blend energetic cocrystals with a downhole fluid to form a composition. Each energetic cocrystal independently includes an energetic compound and a secondary material. The apparatus also includes a pump configured to place the composition in a subterranean formation.

In various embodiments, the present invention provides an apparatus including an activator. The activator is configured to trigger detonation of energetic cocrystals placed in a subterranean formation. The detonation of energetic cocrystals is such that compression waves are generated in the subterranean formation. Each energetic cocrystal independently includes an energetic compound and a secondary material. The apparatus also includes a detector configured to detect the compression waves and thereby measure at least one dimension of an area surrounding the composition placed in the subterranean formation.

In various embodiments, the present invention provides a composition for treatment of a subterranean formation. The composition includes energetic cocrystals, wherein each energetic cocrystal independently includes an energetic compound and a secondary material. The composition can optionally include a downhole fluid.

In various embodiments, the present invention provides a method of preparing a composition for treatment of a subterranean formation. The method includes forming a composition including energetic cocrystals, with each energetic cocrystal independently including an energetic compound and a secondary material.

Various embodiments of the present invention provide certain advantages over other methods of treating a subterranean formation, at least some of which are unexpected. In various embodiments, depending on the type of secondary material used with the energetic compound in the cocrystals, the cocrystals can have different properties than the energetic compound in non-cocrystal form, such as at least one of different density, melting point, solubility, rate of dissolution, reactivity, mechanical properties, volatility, hygroscopicity, water resistance, impact sensitivity, aspect ratio, sphericity, heat sensitivity, friction sensitivity, electrical sensitivity, stability, velocity of detonation, oxygen balance, explosive power, brisance, and toxicity. Various embodiments can advantageously enable tuning and adjustment of these various properties by adjusting the type of the one or more secondary materials that the energetic compound is cocrystalized with. In various embodiments, the different properties of the cocrystal including the energetic compound can make the cocrystal more useful for treatment of a subterranean formation than the energetic compound in a non-cocrystal state, and more useful than other available materials. Some embodiments of the cocrystals include secondary materials having non-energetic properties, while other embodiments include other energetic materials allowing for combining properties of one energetic material with another.

Some embodiments provide advantages over other methods of treating a subterranean formation using energetic materials. In some embodiments, the energetic cocrystals including the energetic compound can be more safely handled as compared to the energetic compound in a non-cocrystal state, or as compared to other energetic materials. In some embodiments, while the energetic compound in non-cocrystal form is too sensitive to various conditions to safely and dependably be deposited in a downhole formation, a cocrystal including the energetic compound can be safely and reliably deposited in or near the downhole fracture. In some embodiments, the energetic cocrystals can be more suitable for coating on a proppant for delivery to a downhole fracture than other available energetic materials. In various embodiments, the energetic cocrystals including the energetic compound can advantageously be designed to detonate using triggering mechanisms that are difficult or not possible to achieve with the energetic compound in a non-cocrystal state, such as upon occurrence of an event triggered from the surface or that occurs downhole during fracturing, such as vibration, pressure, temperature, exposure to oil, or exposure to water. In various embodiments, the energetic cocrystal including the energetic compound can form a more effective slurry with various downhole fluids than the energetic compound in a non-cocrystal state.

Some embodiments provide advantages over other methods of measuring subterranean fracture or flow pathway dimensions using compression waves. In some embodiments, a compression wave can be generated by the energetic cocrystals in a more dependable and more useful way than the compression waves generated by shear slippage downhole or by other means or methods. In various embodiments, a compression wave can safely and dependably be produced near-to or inside of a fracture, allowing greatly enhanced details of the fracture geometry and overall pattern to be resolved, as compared to other methods of imaging fractures. In various embodiments, the enhanced ability to measure and monitor fracture geometry using the energetic cocrystals can provide more efficient fracturing and stimulation operations, and can provide a well having a greater overall output of petroleum materials from the reservoir than possible by available methods.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
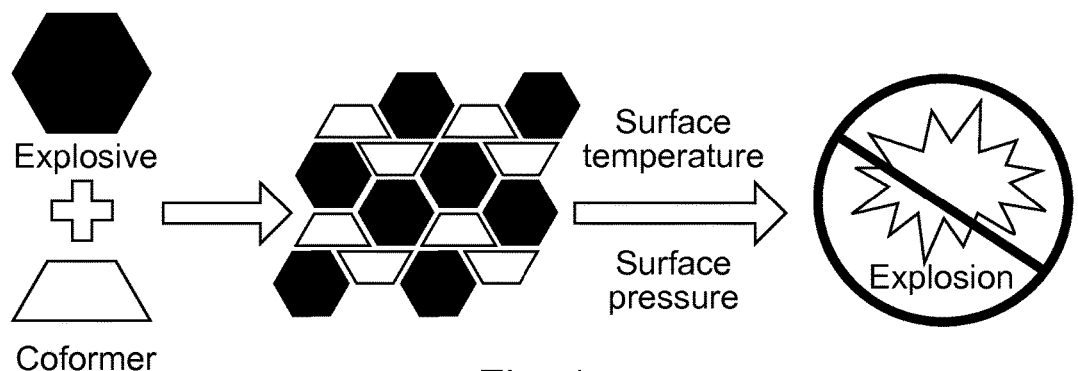
FIG. 1 illustrates an energetic cocrystal having reduced sensitivity to at least one of temperature and pressure, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, "degree of polymerization" is the number of repeating units in a polymer.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore; placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein "treatment of a subterranean formation" can include any activity directed to extraction of water or petroleum materials from a subterranean petroleum- or water-producing formation or region, for example, including drilling, stimulation, hydraulic fracturing, clean-up, acidization, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Method of Treating a Subterranean Formation.

Embodiments of the present invention relate generally to creating and operating oil, gas or geothermal wells and more particularly, but not by way of limitation, to fracturing subterranean formations and determining characterizing information about the fractures, such as for use in monitoring or controlling the fracturing process or in performing subsequent fracturing jobs. This can generally include determining characteristics of subterranean structures by obtaining and evaluating signals created in the well in response to one or more excitation events. As a specific, but non-limiting example, the present invention can be used to determine geometry (e.g., length, width, and height) and events before, during, or after the creation of fractures in oil or gas-bearing formations.

Figure 2:
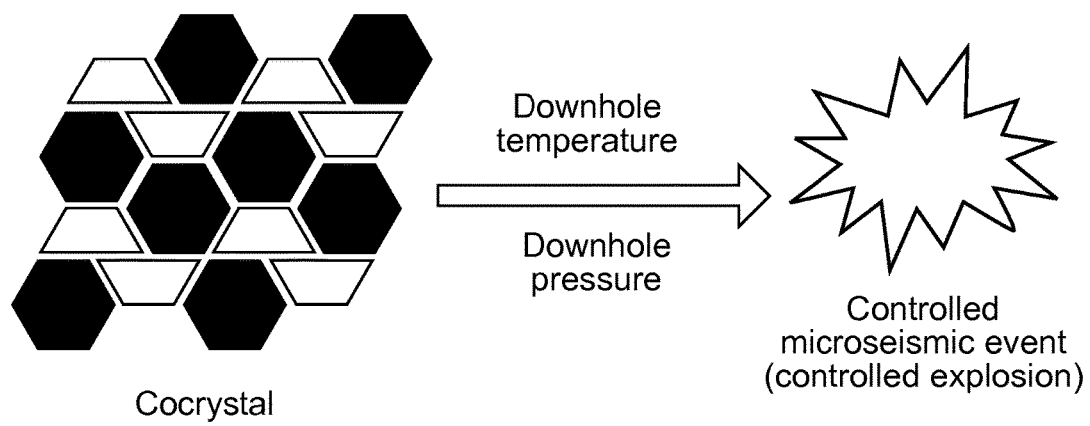
FIG. 2 illustrates an energetic cocrystal that can be detonated when subjected to various stimuli downhole, in accordance with various embodiments.

In various embodiments, the physical properties of explosive compounds are modified by using them in the form of cocrystals, for example along with an inert chemical co-crystallization component (FIG. 1). By using energetic materials in the form of cocrystals, the physical properties (e.g., temperature stability, shock sensitivity, solubility, dissolution rate, etc.) of the energetic materials can be tuned to make them safer to handle and more effective downhole. Once downhole, within the fracture or near to the fracture, an external stimuli, pressure (closure stress), temperature (e.g., bottom hole temperature, BHT), or other trigger mechanism, can be used to trigger the explosive (FIG. 2) and generate a compression wave that can be used to determine the shape and pattern of the fracture.

In some embodiments, the present invention provides a method of treating a subterranean formation. The method includes obtaining or providing a composition including energetic cocrystals, wherein each energetic cocrystal independently includes an energetic compound, and a secondary material. The obtaining or providing of the composition can occur at any suitable time and at any suitable location. The obtaining or providing of the composition can occur above the surface. The obtaining or providing of the composition can occur downhole. The method also includes placing the composition in a subterranean formation. The placing of the composition in the subterranean formation can include contacting the composition and any suitable part of the subterranean formation, or contacting the composition and a subterranean material downhole, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing, and can include any suitable contacting between the subterranean formation and the composition, wherein the cocrystals can contact the subterranean formation as a slurry, or can sit on or otherwise contact the surface of the subterranean formation in a greater concentration than present in the surrounding solution. In some embodiments, the placing of the composition in the subterranean formation can include placing a cocrystal-coated proppant in the subterranean formation. The placing of the composition in the subterranean formation can include at least partially depositing the cocrystals in a fracture, flow pathway, or area surrounding the same, or contacting a fracture, flow pathway, or area surrounding the same with a slurry including the cocrystals.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidization, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

The method can include detonating at least some of the cocrystals downhole. The detonating can occur at any suitable time with respect to the placing of the composition in the subterranean formation or the contacting of the subterranean formation and the composition, such as at least one of before, during, and after the contacting or placing. The detonating is sufficient to generate at least one compression wave downhole. The detonation of the crystals can be used for any suitable purpose. In some embodiments, the compression wave formed by the detonation can be used to create fractures downhole, to enlarge fractures downhole, or to otherwise manipulate material downhole toward the purpose of extracting petroleum from an adjacent subterranean formation. In some embodiments, the compression wave can be used to fracture capsules containing a useful downhole material, such as an acid, a base, a resin-former, a gel (e.g., a hydrated gel, or a dehydrated gel), a crosslinker, a scale-inhibitor, or any suitable material. In some embodiments, the detonation can be triggered by water, and the compression wave can fracture capsules containing dehydrated gel or scale-inhibitors, allowing the dehydrated gel to soak up the water, or allowing the scale-inhibitors to inhibit scale without being consumed by crosslinkers or ions therefrom in the surrounding solution during transit to a desired downhole location and during waiting time downhole. In some embodiments, the pressure wave formed by the detonation can be used to approximately measure at least one dimension in an area surrounding the composition placed in the subterranean formation, such as in an area surrounding a subterranean material contacted by the composition.

In some embodiments, the cocrystals or a composition including the cocrystals is at least partially coated on a proppant. The coating can have any suitable thickness, such as about 1 nm to about 5 mm, or such as about 1 nm or less, or about 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, 1 mm, 2 mm, 3 mm, 4 mm, or about 5 mm or more. In some embodiments, at least one of the cocrystals and the composition including the cocrystals is at least partially encapsulated by a protective shell. The protective shell can have any suitable thickness, such as about 1 nm or less, or about 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, 1 mm, 2 mm, 3 mm, 4 mm, or about 5 mm or more. The protective shell can at least partially protect the cocrystals from the surrounding environment, such as the surrounding chemical environment. In some embodiments, the protective shell can be at least one of soluble, porous, and can have pore formers therein.

The composition including the cocrystals can have any suitable viscosity. In some embodiments, the viscosity at standard temperature and pressure, or under downhole conditions, is about 0.01 cP to about 10,000 cP, or about 0.05 cP to about 1,500 cP, or about 0.01 cP or less, or about 0.1 cP, 1 cP, 5 cP, 10 cP, 15 cP, 20 cP, 25 cP, 30 cP, 40 cP, 50 cP, 60 cP, 70 cP, 75 cP, 80 cP, 85 cP, 90 cP, 100 cP, 150 cP, 200 cP, 500 cP, 1000 cP, 5000 cP, or about 10,000 cP or more.

Triggering Detonation.

The method can include triggering the detonation of at least some of the cocrystals. The triggering can occur at least one of during and after the placing of the composition in the subterranean formation or the contacting of the composition and the subterranean material. In some embodiments, detonation of some of the cocrystals is triggered. In other embodiments, detonation of substantially all of the cocrystals is triggered. In some embodiments, the triggering of detonation of some of the cocrystals (e.g., of one or more cocrystals) results in a compression wave that is sufficient to trigger the detonation of substantially all or most of the cocrystals.

The triggering of the detonation can occur in any suitable manner, and can depend on the properties of the cocrystals. For example, the triggering can include at least one of a compression wave, a chemical activator, heat, pH change, pressure, friction, time, and vibration. For example, a compression wave caused by another explosion (e.g., a suitably placed detonator or primer), caused by sending a compression wave down the wellbore from the surface, or caused by another suitable means, can trigger the detonation. Heat, such as the temperature downhole, can trigger the detonation. In some embodiments, heat caused by the release of petroleum materials, heat caused by the fracturing of rock, or heat caused by friction such as friction between proppant and the fracture, can trigger the detonation. Pressure can trigger the detonation. The triggering pressure can occur naturally downhole, or can be generated by pumping from the surface. The triggering pressure can occur due to closure of the fracture on the cocrystal. In some embodiments, the triggering can be initiated via an activator that can be above the surface, such as a switch that causes an electronic signal to be sent downhole to detonate a detonator or primer, or to initiate another triggering means.

In some embodiments, pH change that triggers the detonation can be due to chemical interactions of acid or base with the cocrystal and can occur as a result of released water or petroleum or from the addition of acid or base, which can be controlled from the surface such as via coiled tubing or other suitable means. In some embodiments, pH change can cause a change in temperature that triggers the detonation. Friction to trigger the detonation can be generated against the inner walls of the fracture or flow pathway, for example during the placement of proppant in the fracture, such as during the placement of proppant in the fracture that is coated with or otherwise has cocrystals thereon. Friction to trigger the detonation can be generated by closure of the fracture. The cocrystal can be designed to detonate after a suitable period of time in a suitable chemical environment, such as due to dissolution of a secondary component in the cocrystal or other degradation of the stability of the cocrystal to detonation over time. In some embodiments, the cocrystal can have a protective shell that can be dissolved or otherwise broken down in particular chemical environments, such as in the presence of water, petroleum, acid, or base, such that upon the breakdown of the protective shell the sensitivity of the cocrystal to detonation via various triggers increases, thus effectively triggering the detonation by exposure to particular chemical environments. In some embodiments, vibration can trigger the detonation, such as vibration caused by placing proppant in the fracture, vibration from the fracturing of rock, vibration caused by various downhole operations such as drilling, or vibration artificially created to trigger the detonation.

Measuring a Fracture or Flow Pathway.

In various embodiments, the detonating of the cocrystals can be sufficient to generate a compression wave downhole (e.g., an acoustic wave). The detonating can be sufficient to generate a compression wave at least partially within a fracture or flow pathway, such as the fracture or flow pathway where the cocrystals are placed during the method of treating the subterranean formation. The method can include using the compression wave to measure at least one characteristic of the fracture or flow pathway, or at least one characteristic of the area surrounding the fracture of the area surrounding the flow pathway. The characteristic can be any characteristic that can be determined from or at least partially using the generated compression wave. For example, the measured characteristic can be at least one of length, height, width, volume, surface area, shape, degree of closure of the fracture, and time of closure of the fracture.

In some embodiments, using the compression wave to measure the at least one characteristic includes using a compression wave detector to approximately determine at least one dimension of an area surrounding the placed composition, such as a fracture, an area surrounding a fracture, a flow pathway, or an area surrounding a flow pathway. The compression wave detector can be any suitable compression wave detector that can allow determination of the characteristic at least in part from the generated compression wave. For example, the compression wave detector can include at least one of an accelerometer, a geophone, and a microseismic detector.

The compression wave detector can be located in any suitable location, such that the measurement of the at least one characteristic using the wave detector can be performed. For example, the compression wave detector can be located at least one of downhole or above the surface. The compression wave detector can be located in the fracture. The compression wave detector can be located near to the fracture in the wellbore. The compression wave detector can be located above or below the fracture or flow pathway from which the compression wave originated or occurred near to. The method can include placing the compression wave detector proximate to the placed composition, which can include any suitable location including the locations disclosed herein.

The compression wave detector can be used to determine the geometry or the pattern of the fracture of flow pathway in any suitable manner. Methods of using compression waves to determine geometry and patterns of subterranean fractures and flow pathways are known to those of ordinary skill in the art.

Cocrystals.

Each of the energetic cocrystals including an energetic compound independently can be any suitable type of cocrystal having any suitable type of structure, such that the cocrystals can be used as described herein and have properties as described herein, e.g., such that the cocrystals can be used downhole and are at least one of detonatable, explodable, implodable, ignitable, and combustible. In some embodiments, the cocrystals can be explosive. The cocrystal includes a crystalline structure including both the energetic compound and the at least one secondary material. For example, the cocrystal can include a crystalline structure that has a unit cell including both the energetic compound and the at least one secondary material. The cocrystal can have a crystal structure wherein the energetic and the secondary material interact via at least one of ionic interaction, ionic bonding, Van der Waals force, London dispersion force, dipole-dipole interaction, hydrogen bonding, metallic bond, pi-interaction, and cation-pi interaction. In some embodiments, the cocrystal can be at least one of a hydrate, a solvate, and a clathrate.

The cocrystals can include one type of crystals or the cocrystals can include multiple types of cocrystals. For example, the cocrystals can include some cocrystals including one particular energetic compound, while other cocrystals can include a different energetic compound. In some examples, some of the cocrystals have one set of properties, while other cocrystals can have a different set of properties. In some examples, some of the cocystals can be designed to detonate under a certain temperature, pressure, or in the presence of a particular chemical, while other cocrystals can be designed to detonate under another temperature, pressure, or in the presence of a different chemical. For example, some of the cocrystals can be designed to detonate upon application of a crushing force or pressure, and other cocrystals can be designed to detonate upon exposure to water or petroleum materials.

The cocrystal can have a crystal structure that is different from a crystal structure of a crystal of the energetic compound alone. The cocrystal can have at least one property that is different than a corresponding property of a crystal of the energetic compound alone. For example, the cocrystal can have at least one of a different density, melting point, solubility, rate of dissolution, reactivity, mechanical properties, volatility, hygroscopicity, water resistance, impact sensitivity, aspect ratio, sphericity, heat sensitivity, friction sensitivity, electrical sensitivity, stability, velocity of detonation, oxygen balance, explosive power, brisance, and a different toxicity than a crystal of the energetic compound alone. The cocrystal can have a crystal structure that is different from a crystal structure of a crystal of the secondary material alone. The cocrystal can have at least one property that is different than a corresponding property of the secondary material alone. For example, the cocrystal can have at least one of a different density, melting point, solubility, rate of dissolution, reactivity, mechanical properties, volatility, hygroscopicity, water resistance, impact sensitivity, aspect ratio, sphericity, heat sensitivity, friction sensitivity, electrical sensitivity, stability, velocity of detonation, oxygen balance, explosive power, brisance, and a different toxicity than a crystal of the energetic compound alone.

Each of the cocrystals can independently have any suitable shape and size. For example, the cocrystal can be substantially spherical or can be irregularly shaped. The cocrystals can be nanoparticles. The cocrystals can have an particle size of about 0.1 nm to about 10 mm, or about 1 nm to about 5 mm, or about 0.1 nm or less, or about 1 nm, 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, 1 mm, 2 mm, 3 mm, 4 mm, 5 mm, or about 10 mm or more. A particle size of a spherical particle corresponds to the approximate diameter of the sphere. A non-spherical particle size corresponds to the largest dimension of the particle.

In some embodiments, the cocrystals can be less sensitive to detonation than a crystal of the energetic compound alone, such as less sensitive to at least one of temperature, pressure, shock, or to a particular chemical environment. In some embodiments, the cocrystals can be as sensitive or more sensitive to detonation as compared to a crystal of the energetic compound alone, such as having the same sensitivity or a greater sensitivity to at least one of temperature, pressure, shock, or to a particular chemical environment.

The cocrystals can have any suitable impact sensitivity, which can be measured as described in the Examples. For example, the cocrystals can have an impact sensitivity of about 10 cm to about 1000 cm, or about 50 cm to about 1000 cm, or about 10 cm or less, or about 15 cm, 20, 25, 30, 35, 40, 45, 50, 60, 70, 80, 90, 100, 200, 300, 400, 500, 600, 700, 800, 900, or about 1000 cm or more.

The cocrystals can have any suitable density. For example, the cocrystals can have a density of about 1.4 g/cm$^3$ to about 3.0 g/cm$^3$, or about 1.78 g/cm$^3$ to about 3.0 g/cm$^3$, or about 1.4 g/cm$^3$ or less, or about 1.5 g/cm$^3$, 1.55, 1.6, 1.65, 1.7, 1.75, 1.8, 1.85, 1.9, 1.95, 2.0, 2.1, 2.2, 2.3, 2.4, 2.5, 2.6, 2.7, 2.8, 2.9, or about 3.0 g/cm$^3$ or more.

The cocrystals can have any suitable velocity of detonation. For example, the cocrystals can have a velocity of detonation of about 4 km/s to about 20 km/s, or about 8.5 km/s to about 20 km/s, or about 4 km/s or less, or about 4.5 km/s, 5, 5.5, 6, 6.5, 7, 7.5, 8, 8.5, 9, 9.5, 10, 10.5, 11, 11.5, 12, 12.5, 13, 13.5, 14, 14.5, 15, 16, 17, 18, 19, or about 20 km/s or more.

The cocrystals can have any suitable oxygen balance (OB). For example, the cocrystals can have an OB of about −1000% to about −20%, or of greater than or equal to about −100% to less than or equal to about −50%, or of about −1000%, −900%, −800%, −700%, −600%, −500%, −400%, −300%, −250%, −200%, −175%, −150%, −125%, −100%, −90%, −80%, −70%, −60%, −50%, −40%, −30%, −20%, or about −10% or more.

The energetic compound and the secondary material can any suitable ratio in the cocrystal. For example, the energetic compound and the secondary material can have a mole ratio in the cocrystal of about 1:0.01 to about 1:100 in the cocrystals, about 1:1 to about 1:10, about 1:1 or about 1:2, or about 1:0.01 or less, or about 1:0.1, 1:0.3, 1:0.5, 1:1, 1:2, 1:3, 1:4, 1:5, 1:6, 1:7, 1:8, 1:9, 1:10, 1:15, 1:20, 1:50, or about 1:100 or more in the cocrystals.

Energetic Compound.

The energetic compound in the cocrystal can be any suitable energetic material, such as any suitable explosive material, such that the cocrystal can be used as described herein. The energetic material can be at least one of detonatable, explodable, implodable, ignitable, and combustable. The cocrystal can include, apart from the secondary material, one energetic compound or more than one energetic compound.

In some embodiments, the energetic compound is acetone peroxide, ammonium azide, ammonium chlorate, ammonium dinitramide, ammonium nitrate, ammonium permanganate, 1,1'-azobis-1,2,3-triazole, barium azide, benzotrifuroxan (BTF), tricyclo[3.1.0.0$^{2,6}$]hex-3-ene or benzvalene, 1,2,4-butanetriol trinitrate, chlorine azide, copper(I) acetylide, copper(II) azide, cyanuric triazide, diacetyl peroxide, 2,6-diamino-3,5-dinitropyrazine-1-oxide (LLM-105), 6-diazo-2,4-dinitrocyclohexa-2,4-dien-1-one or diazodinitrophenol, diazomethane, diethylene glycol dinitrate, 4-dimethylaminophenylpentazole, 4,4'-dinitro-3,3'-diazenofuroxan (DDF), 2,4-dinitrotoluene, [(2R,3R)-1,3,4-trinitrooxybutan-2-yl]nitrate or erythritol tetranitrate, ethyl azide, ethylene glycol dinitrate, fluorine perchlorate, 1,1-diamino-2,2-dinitroethene (FOX-7 or DADNE), N,N'-bis-(1H-tetrazol-5-yl)-hydrazine (HBT), heptanitrocubane (HNC), 3,4,8,9,12,13-hexaoxa-1,6-diazabicyclo[4.4.4]tetradecane or hexamethylene triperoxide diamine (HMTD), hexanitrobenzene (HNB), 2,4,6-trinitro-N-(2,4,6-trinitrophenyl)aniline or hexanitrodiphenylamine (HND), hexanitroethane, 2,4,6,8,10,12-hexanitro-2,4,6,8,10,12-hexaazaisowurtzitane (HNIW or CL-20), 1,3,5-trinitro-2-[2-(2,4,6-trinitrophenyl)ethenyl]benzene or hexanitrostilbene (HNS), 2,6-dioxo-1,3,4,5,7,8-hexanitrodecahydro-1H,5H-diimidazo[4,5-b:4',5'-e] (HHTDD), octahydro-1,3,5,7-tetranitro-1,3,5,7-tetrazocine (HMX), hydrazoic acid or hydrogen azide, lead 2,4,6-trinitrobenzene-1,3-diolate or lead styphnate, lead(II) azide, manganese heptoxide, (2R,3R,4R,5R)-Hexane-1,2,3,4,5,6-hexol-1,2,3,4,5,6-hexanitrate or mannitol hexanitrate, methyl azide, methyl nitrate, methylammonium nitrate, 1-methyl-2-nitro-benzene or mononitrotoluene, nitrocellulose, nitrogen trichloride, nitrogen triiodide, nitroglycerin, nitroguanidine, nitromethane, nitrostarch, 5-nitro-1,2,4-triazol-3-one (NTO), nitrourea, octaazacubane, octanitrocubane (ONC), [3-nitrooxy-2,2-bis(nitrooxymethyl)propyl] nitrate or pentaerythritol tetranitrate (PETN), pentazenium, pentazole, picric acid, picryl chloride, polycarbonyl, polyvinyl nitrate, potassium picrate, propylene glycol dinitrate, 1,3,5-trinitroperhydro-1,3,5-triazine (RDX), silicon tetraazide, silver acetylide, silver azide, silver nitride, sodium azide, 2,4,6-trinitrobenzene-1,3-diol or styphnic acid, 1,3-diamino-2,4,6-trinitrobenzene (DATB), 1,3,5-triamino-2,4,6-trinitrobenzene (TATB), tetraazidomethane, tetranitromethane, 1-(5-tetrazolyl)-3-guanyl tetrazene hydrate, N-methyl-N,2,4,6-tetranitroaniline or tetryl, 1,3,5-triazido-2,4,6-trinitrobenzene, 2,2'-(ethane-1,2-diylbis(oxy))bisethyl dinitrate] or triethylene glycol dinitrate, [2-methyl-3-nitrooxy-2-(nitrooxymethyl)propyl] nitrate or trimethylolethane trinitrate (TMETN or METN), 2,4,6-trinitroaniline, 2-methoxy-1,3,5-trinitrobenzene or trinitroanisole (TNA), 1,3,5-trinitrobenzene (TNB), 2,4,6-trinitrobenzenesulfonic acid, 1,3,3-trinitroazetidine (TNAZ), 1-methyl-amino-2,4,6-trinitrobenzene (MATNB), 2-methyl-1,3,5-trinitrobenzene or trinitrotoluene (TNT), 2,4,6-trinitro-1,3,5-triazine or trinitrotriazine, 2,4,6-tris(trinitromethyl)-1,3,5-triazine, urea nitrate, or 1,2,3,4,5-pentakis-nitrooxy-pentane or xylitol pentanitrate. In some embodiments, the energetic compound is 2,4,6-trinitrotoluene (TNT), octahydro-1,3,5,7-tetranitro- 1,3,5,7-tetrazocine (HMX), 2,4,6,8,10,12-hexanitro-2,4,6,8, 10,12-hexaazaisowurtzitane (HNIW or CL-20), 1,3,5-trinitroperhydro-1,3,5-triazine (RDX), nitroglycerin, nitrocellulose, [3-nitrooxy-2,2-bis(nitrooxymethyl)propyl] nitrate or pentaerythritol tetranitrate (PETN), or benzotrifuroxan (BTF).

Secondary Material.

The secondary material in the energetic cocrystal can be any suitable secondary material, such that the cocrystal can be used as described herein. The secondary material can be a compound or an elemental material (e.g., including only one type of atom). The secondary material is not the same material as the energetic compound. There can be one secondary material in the cocrystal or more than one secondary material. The secondary material can be a substantially non-energetic compound or an inert material. The secondary material can be an energetic material that is less energetic than the energetic compound. The secondary material can be an energetic material that is about as energetic or that is more energetic as compared to the energetic compound.

In some embodiments, the secondary material is an energetic material, such as acetone peroxide, ammonium azide, ammonium chlorate, ammonium dinitramide, ammonium nitrate, ammonium permanganate, 1,1'-azobis-1,2,3-triazole, barium azide, benzotrifuroxan (BTF), tricyclo[3.1.0.0$^{2,6}$]hex-3-ene or benzvalene, 1,2,4-butanetriol trinitrate, chlorine azide, copper(I) acetylide, copper(II) azide, cyanuric triazide, diacetyl peroxide, 2,6-diamino-3,5-dinitropyrazine-1-oxide (LLM-105), 6-diazo-2,4-dinitrocyclohexa-2,4-dien-1-one or diazodinitrophenol, diazomethane, diethylene glycol dinitrate, 4-dimethylaminophenylpentazole, 4,4'-dinitro-3,3'-diazenofuroxan (DDF), 2,4-dinitrotoluene, [(2R,3R)-1,3,4-trinitrooxybutan-2-yl] nitrate or erythritol tetranitrate, ethyl azide, ethylene glycol dinitrate, fluorine perchlorate, 1,1-diamino-2,2-dinitroethene (FOX-7 or DADNE), N,N'-bis-(1H-tetrazol-5-yl)-hydrazine (HBT), heptanitrocubane (HNC), 3,4,8,9,12,13-hexaoxa-1,6-diazabicyclo[4.4.4]tetradecane or hexamethylene triperoxide diamine (HMTD), hexanitrobenzene (HNB), 2,4,6-trinitro-N-(2,4,6-trinitrophenyl)aniline or hexanitrodiphenylamine (HND), hexanitroethane, 2,4,6,8,10,12-hexanitro-2,4,6,8,10,12-hexaazaisowurtzitane (HNIW or CL-20), 1,3,5-trinitro-2-[2-(2,4,6-trinitrophenyl)ethenyl]benzene or hexanitrostilbene (HNS), 2,6-dioxo-1,3,4,5,7,8-hexanitrodecahydro-1H,5H-diimidazo[4,5-b:4',5'-e] (HHTDD), octahydro-1,3,5,7-tetranitro-1,3,5,7-tetrazocine (HMX), hydrazoic acid or hydrogen azide, lead 2,4,6-trinitrobenzene-1,3-diolate or lead styphnate, lead(II) azide, manganese heptoxide, (2R,3R,4R,5R)-Hexane-1,2,3,4,5,6-hexol-1,2,3,4,5,6-hexanitrate or mannitol hexanitrate, methyl azide, methyl nitrate, methylammonium nitrate, 1-methyl-2-nitro-benzene or mononitrotoluene, nitrocellulose, nitrogen trichloride, nitrogen triiodide, nitroglycerin, nitroguanidine, nitromethane, nitrostarch, 5-nitro-1,2,4-triazol-3-one (NTO), nitrourea, octaazacubane, octanitrocubane (ONC), [3-nitrooxy-2,2-bis(nitrooxymethyl)propyl] nitrate or pentaerythritol tetranitrate (PETN), pentazenium, pentazole, picric acid, picryl chloride, polycarbonyl, polyvinyl nitrate, potassium picrate, propylene glycol dinitrate, 1,3,5-trinitroperhydro-1,3,5-triazine (RDX), silicon tetraazide, silver acetylide, silver azide, silver nitride, sodium azide, 2,4,6-trinitrobenzene-1,3-diol or styphnic acid, 1,3-diamino-2,4,6-trinitrobenzene (DATB), 1,3,5-triamino-2,4,6-trinitrobenzene (TATB), tetraazidomethane, tetranitromethane, 1-(5-tetrazolyl)-3-guanyl tetrazene hydrate, N-methyl-N,2,4,6-tetranitroaniline or tetryl, 1,3,5-triazido-2,4,6-trinitrobenzene, 2,2'-(ethane-1,2-diylbis(oxy))bisethyl dinitrate] or triethylene glycol dinitrate, [2-methyl-3-nitrooxy-2-(nitrooxymethyl)propyl] nitrate or trimethylolethane trinitrate (TMETN or METN), 2,4,6-trinitroaniline, 2-methoxy-1,3,5-trinitrobenzene or trinitroanisole (TNA), 1,3,5-trinitrobenzene (TNB), 2,4,6-trinitrobenzenesulfonic acid, 1,3,3-trinitroazetidine (TNAZ), 1-methyl-amino-2,4,6-trinitrobenzene (MATNB), 2-methyl-1,3,5-trinitrobenzene or trinitrotoluene (TNT), 2,4,6-trinitro-1,3,5-triazine or trinitrotriazine, 2,4,6-tris (trinitromethyl)-1,3,5-triazine, urea nitrate, or 1,2,3,4,5-pentakis-nitrooxy-pentane or xylitol pentanitrate.

In some embodiments, the secondary material is 2,4,6-trinitrotoluene (TNT), octahydro-1,3,5,7-tetranitro-1,3,5,7-tetrazocine (HMX), 2,4,6,8,10,12-hexanitro-2,4,6,8,10,12-hexaazaisowurtzitane (HNIW or CL-20), 1,3,5-trinitroperhydro-1,3,5-triazine (RDX), nitroglycerin, nitrocellulose, [3-nitrooxy-2,2-bis(nitrooxymethyl)propyl] nitrate or pentaerythritol tetranitrate (PETN), benzotrifuroxan (BTF), N-methyl-2-pyrrolidone, 2,4-dinitro-2,4-diazapentane, 1,2-phenylenediamine, 2-bromoaniline, 3,4-diaminotoluene, 4-fluoroaniline, thieno[3,2-b]thiophene, 2-pyrrolidone, 2-picoline-N-oxide, 4-picoline-N-oxide, naphthalene, 1-bromonaphthalene, 9-bromonaphthalene, anthracene, 9-bromoanthracene, phenanthrene, perylene, tetrathiafulvalene, phenothiazine, dibenzothiophene, 4,6-dimethyldibenzothiophene, 1,2-phenylenediamine, 1,4-dimethyoxybenzene, 4-aminobenzoic acid, 1,4-piperazinedicarboxaldehyde, anthranilic acid, pyrene, caprolactam, $H_2O$, $CO_2$, dimethylformamide (DMF), 1,4-dioxane, γ-butyrolactone, or hexamethylphosphoramide.

In some embodiments, the secondary material is acetylsalicylic acid, adipic acid, 4-aminobenzoic acid, 4-aminobenzamide, anthranillic acid, arabinose, arginine (e.g., L-arginine), ascorbic acid (e.g., L-ascorbic acid), aspartic acid (e.g., L-aspartic acid), benzamide, benzenesulfonic acid, benzoic acid, boric acid, calcium chloride, camphoric acid (e.g., (+) camphoric acid), cholic acid, citric acid, cyclamic acid, erythitol, fructose, fumaric acid, gentisic acid, glucose, glucoronic acid (e.g., D-glucuronic acid), gluconic acid (e.g., D-gluconic acid), glutamic acid (e.g., L-glutamic acid), glutaric acid, glycine, glycolamide, glycolic acid, hippuric acid, 4-hydroxybenzamide, 4-hydroxybenzoic acid, 1-hydroxy-2-naphthoic acid, imidazole, isonicotinamide, ketoglutaric acid, lactamide, lactic acid, lactose, laurylsulfonic acid, lysine (e.g., L-lysine), magnesium chloride, maleic acid, malic acid (e.g., L-malic acid), malonic acid, maltose, mandelic acid, mannitol, mannose, methyl-4-hydroxybenzoic acid, neotame, nicotinamide, nicotinic acid, orcinol, oxalic acid, 2-oxoglutaric acid, palmoic acid, pimelic acid, piperazine, proline (e.g., L-proline), pyroglutamic acid (e.g., L-pyroglutamic acid), resourcinol, saccharin, salicylic acid, sebacic acid, sorbic acid, sorbitol, stearic acid, suberic acid, succinic acid, sucrose, tartaric acid, threonine (e.g., L-threonine), thromethamine, cinnamic acid (e.g., trans-cinnamic acid), trimesic acid, tyrosine ethyl ester, tyrosine (e.g., L-tyrosine), or urea.

In some embodiments, the secondary material can be formed from a reaction of an acid and a base. The acid and base can be reacted in any suitable way to produce the secondary material. The acid and base can be any suitable acid and base, such that a secondary material is formed that generates a cocrystal with the energetic material that can be used as described herein. For example, the base can be a base such as ammonia, L-arginine, benethamine, benzathine, betaine, calcium hydroxide, choline, decanal, diethanolamine, diethylamine, 2-(diethylamino)ethanol, 2-aminoethanol, ethylenediamine, N-methylglucamine, hydrabamine, 1H-imidazole, lysine, a hydroxide salt (e.g., magnesium hydroxide, sodium hydroxide, potassium hydroxide, or zinc hydroxide), morpholine, 4-(2-hydroxyethyl)morpholine, piperazine, pyrrolidine, 1-(2-hydroxyethyl)pyrrolidine, triethanolamine, or tromethamine. For example, the acid can be an acid such as (+)-L-tartaric acid, 1,2,2-trimethyl-1,3-cyclopentanedicarboxylic acid, 10-undecylenic acid, 1-hydroxy-2-naphthoic acid, (+)-camphor-10-sulfonic acid, 2,5-dihydroxybenzoic acid, 2-furancarboxylic acid, 2-mercaptobenzoic acid, 3-cyclopentylpropionic acid, 3-phenylpropionic acid, 4-aminosalicylic acid, 4-hydroxybenzoic acid, acetic acid, adipic acid, alpha-hydroxypropionic acid, benzenesulfonic acid, benzoic acid, carbonic acid, cholic acid, citric acid, (−)-D-tartaric acid, (+)-D-camphoric acid, (+)-D-malic acid, (+)-L-malic acid, 2,2-dichloroacetic acid, DL-10-camphorsulfonic acid, DL-glutamic acid, DL-malic acid, DL-tartaric acid, dodecylsulfuric acid, ethanesulfonic acid, ethylenediaminetetraacetic acid, ethylsulfuric acid, fumaric acid, galactaric acid, gallic acid, gluconic acid, glutamic acid, glycolic acid, hippuric acid, hydroiodic acid, hydrobromic acid, hydrochloric acid, (−)-L-apple acid, (+)-L-lactic acid, (+)-L-tartaric acid, D,L-lactic acid, lactobionic acid, L-aspartic acid, lauric acid, L-glutamic acid, maleic acid, (−)-L-malic acid, malonic acid, D,L-mandelic acid, methanesulfonic acid, naphthalene-2-sulfonic acid, n-butyric acid, n-decanoic acid, n-hexanoic acid, nitric acid, n-tetradecanoic acid, octanoic acid, oleic acid, orotic acid, orthoboric acid, oxalic acid, 4-acetamidobenzoic acid, palmitic acid, pamoic acid, phosphoric acid, picric acid, pivalic acid, propionic acid, p-toluenesulfonic acid, pyrophosphoric acid, salicylic acid, stearic acid, succinic acid, sulfosalicylic acid, sulfuric acid, terephthalic acid, thiocyanic acid, valeric acid, or valproic acid.

In some embodiments, the secondary material can be (−)-carvyl propionate, (−)-caryophyllene oxide, (−)-dihydrocarvyl acetate, (−)-limonene, (−)-menthyl lactate, (−)-myrtenal, (+)-camphor, (+)-neomenthol, (+/−)-citronellic acid, (1S)-(−)-alpha-pinene, (2R,3S)-tartaric acid, (2S,7S)-(−)-cystine, (E)-2-octenol, (E,E)-2,4-octadienal, (E,Z)-2,6-nonadienal, (e,z)-2,6-nonadienyl acetate, (1R)-2,6,6-trimethylbicyclo[3,1,1]hept-2-ene, (1S)-6,6-dimethyl-2-methylenebicyclo[3,1,1]heptane, (S)-(−)-cysteine, (S)-(−)-histidine, (S)-(−)-phenylalanine, (S)-(−)-tryptophan, (S)-(−)-tyrosine, (S)-(+)-arginine, (S)-(+)-lysine, (Z)-3-hexenal, 1R-(−)-camphorsulfonic acid, 1-(2-furyl)-1,3-butanedione, 1-(2-furyl)-2-propanone, 1-(3-pyridinyl)ethanone, 1,1'-azobisformamide, 1,1-diethoxyethane, 1,1-dimethoxy-2-phenylpropane, 1,1-dimethoxy-3,7-dimethyl-7-octanol, 1,2,2-trimethyl-1,3-cyclopentanedicarboxylic acid, 1,2,3-propanetricarboxylic acid, 2-hydroxy-, disodium salt, 1,2-benzisothiazol-3(2H)-one 1,1-dioxide, ammonium salt, 1,2-benzisothiazol-3(2H)-one 1,1-dioxide, calcium salt, 1,2-benzisothiazolin-3-one 1,1-dioxide, potassium salt, 1,2-butanedithiol, 1,2-ethanediamine, N,N'-bis(phenylmethyl)-, 1,3,4,6,7,8-hexahydro-4,6,6,7,8,8-hexamethyl cyclopenta[g][2]benzopyran, 1,3,5-trithiane, 2,2,4,4,6,6-hexamethyl-, 1,3,5-undecatriene, 1,3-butanediol, 1,3-butanedithiol, 1,3-dihydroxy-5-methylbenzene, 1,3-dimercaptopropane, 1,4-dithiane, 1,4-dithiane-2,5-diol, 1,5-naphthalenedisulfonic acid disodium salt, 1,6-hexanedithiol, 10-camphorsulfonic acid, 10-undecylenic acid, 1-benzyloxy-2-methoxy-4-propenyl benzene, 1-butanol, 2-methyl-, acetate, 1-hexanethiol, 2-ethyl-, 1-hexen-3-ol, 1H-pyrrole, 1-(2-furanylmethyl)-, 1-hydroxy-2-butanone, 1-hydroxy-2-methoxy-4-ethyl benzene, 1-hydroxy-2-naphthoic acid, 1-hydroxyethylidene-1,1-diphosphonic acid, 1-methoxy-4-methylbenzene, 1-methoxy-4-propyl benzene, 1-methyl-4-(1-methylethyl)-1,4-cyclohexadiene, 1-methyl-4-(1-methylethyl)-1,4-cyclohexadiene en-ethylene diamine, 1-methyl-4-(1-methylethylidene)cyclohexene, 1-methylnaphthalene, 1-octen-3-ol, 1-octen-3-one, 1-octen-3-yl acetate, 1-octen-3-yl butyrate, 1-penten-3-ol, 1-penten-3-one, 1-phenyl-1,2-propanedione, 1-phenyl-1-propanol, 1-phenyl-2-pentanol, 1-phenylethyl propionate, 1-pyrazinylethanone, 2-(2-ethoxyethoxy)ethanol, 2-(3-phenylpropyl)pyridine, 2-(methyldithio)-isobutyraldehyde, 2,2,6-trimethylcyclohexanone, 2,2-dibromo-3-nitrilopropionamide, 2,2'-oxybisethanol, 2,3,4-trimethyl-3-pentanol, 2,3,6-trimethyl-phenol, 2,3-butanedithiol, 2,3-diethyl-5-methyl-pyrazine, 2,3-diethyl-pyrazine, 2,3-dimethyl-pyrazine, 2,3-hexanedione, 2,3-naphthalenediol, 2,3-pentanedione, 2,4,5-trimethylthiazole, 2,4,6-tribromophenol, 2,4,6-trinitro-1,3-dimethyl-5-tert-butylbenzene, 2,4-decadien-1-ol, 2,4-dihydroxybenzoic acid, 2,4-dimethyl-3-cyclohexene-1-carboxaldehyde, 2',4'-dimethylacetophenone, 2,4-dimethylanisole, 2,4-dimethylbenzaldehyde, 2,4-dimethylphenol, 2,4-hexadien-1-ol, 2,4-hexadienal, 2,4-hexadienoic acid, methyl ester, (E,E)-, 2,4-hexadienoic acid, potassium salt, (E,E)-, 2,4-nonadien-1-ol, 2,4-octadien-1-ol, 2,5-diethyltetrahydrofuran, 2,5-dihydro-4,5-dimethyl-2-(2-methyl propyl)thiazole, 2,5-dihydroxy, 2,5-dimethyl-1,4-dithiane, 2,5-dihydroxybenzoic acid, 2,5-dihydroxybenzoic acid, gentisic acid, 2,5-dimethyl pyrrole, 2,5-dimethyl-3-furanthiol, 2,5-dimethyl-4-methoxy-3(2H)-furanone, 2,5-dimethylphenol, 2,5-dimethylpyrazine, 2,6,10-trimethyl-2,6,10-pentadecatrien-14-one, 2,6-dimethoxyphenol, 2,6-dimethyl-4-heptanol, 2,6-dimethyl-4-heptanone, 2,6-dimethyl-5-hepten-1-al, 2,6-dimethylphenol, 2,6-dimethylpyrazine, 2,6-dimethylpyridine, 2,6-dimethylthiophenol, 2,6-di-tert-butyl-p-cresol, 2,6-octadien-1-ol, 3,7-dimethyl-, propanoate, (Z)-, 2-acetoxy-3-butanone, 2-acetyl-1-methylpyrrole, 2-acetyl-2-thiazoline, 2-acetyl-3-ethyl pyrazine, 2-acetyl-5-methyl furan, 2-acetylfuran, 2-acetylpyridine, 2-acetylpyrrole 2-acetylthiazole, 2-amino-2-(hydroxymethyl)-1,3-propanediol, 2-aminopropionic acid, 2-butanone, 1-(methylthio)-, 2-butanone, 3-hydroxy-, (+−)-, 2-butenal, 2-methyl-, (E)-, 2-butoxy ethanol, 2-chloro-1-propanol, 2-dehydrolinalool, 2-ethoxyethanol, 2-ethoxythiazole, 2-ethyl pyrazine, 2-ethyl-1-hexanol, 2-ethyl-3,5(6)-dimethylpyrazine, 2-ethyl-3,5-dimethylpyrazine, 2-ethyl-3-hydroxy-4-pyrone, 2-ethyl-3-methyl-pyrazine, 2-ethyl-4,5-dimethyl oxazole, 2-ethyl-4-methyl thiazole, 2-ethyl-5-methyl pyrazine, 2-ethylbutyl acetate, 2-ethylbutyric acid, 2-ethylbutyrinc acid, 2-ethylfenchol, 2-ethylfuran, 2-ethylhexanoic acid, 2-furancarboxylic acid, 2-furancarboxylic acid, propyl ester, 2-heptenoic acid, 2-hexanoylfuran, 2-hexen-1-yl acetate, 2-hexenal, 2H-pyrrole, 3,4-dihydro-, 2'-hydroxyacetophenone, 2-hydroxyethanesulfonate, 2-isobutyl-3-methoxypyrazine, 2-isobutyl-3-methyl-pyrazine, 2-isobutylthiazole, 2-isopropyl-4-methyl thiazole, 2-isopropylphenol, 2-isopropylpyrazine, 2-ketobutyric acid, 2-ketoglutaric acid, 2-ketovaline, 2-mercaptobenzoic acid, 2-mercaptopropionic acid, 2-methoxy-3-sec-butyl-pyrazine, 2-methoxy-4-methylphenol, 2-methoxy-4-propylphenol, 2-methoxycinnamaldehyde, 2-methoxynaphthalene, 2-methoxypyrazine, 2-methoxystyrene, 2-methyl-1,3-dithiolane, 2-methyl-1-butanethiol, 2-methyl-1-phenyl-2-propanol, 2-methyl-1-propanol, 2-methyl-2-pentenal, 2-methyl-2-pentenoic acid, 2-methyl-3-(2-furyl) acrolein, 2-methyl-3-(dimercaptomethyl)-furan, 2-methyl-3-buten-2-ol, 2-methyl-3-furanethiol, 2-methyl-4-pentenoic acid, 2-methyl-4-propyl-1,3-oxathiane, 2-methyl-5-(1-methylethenyl)-2-cyclohexene-1-one, 2-methyl-5-(methylthio)-furan, 2-methyl-5-ethylpyridine, 2-methylbutanoic acid, 2-methylbutyl 2-methylbutanoate, 2-methylbutyl isovalerate, 2-methylbutyraldehyde, 2-methylcyclohexanone, 2-methylheptanoic acid, 2-methylhexanoic acid, 2-methylpyrazine, 2-methyltetrahydrofuran-3-one, 2-methyltetrahydrothiophen-3-one, 2-methylthio-3(6)-methyl-pyrazine, 2-methylthiopyrazine, 2-naphthalenesulfonic acid sodium salt, 2-naphthalenethiol, 2-n-propylphenol, 2-octanol, 2-octen-4-one, 2-pentanone, 2-pentenal, 2-pentyl furan, 2-pentylpyridine, 2-phenyl-1-propanol, 2-phenyl-2-butenal, 2-phenyl-3-(2-furyl)-propenal, 2-phenylpropyl butyrate, 2-phenylpropyl isobutyrate, 2-propanol, 2-propenoic acid, 3-phenyl-, 2-methylpropyl ester, 2-propenoic acid, 3-phenyl-, 3-phenylpropyl ester, 2-propenoic acid, 3-phenyl-, cyclohexyl ester, 2-propenoic acid, 3-phenyl-, methyl ester, (E)-, 2-propionylpyrrole, 2-propionylthiazole, 2-propylpyrazine, 2-sec-butyl thiazole, 3(2H)-furanone, 2,5-dimethyl-, 3-(5-methyl-2-furyl)butanal, 3-(methylthio)butanal, 3-(methylthio)propanol, 3-(methylthio)propionaldehyde, 3,3,5-trimethyl-1-cyclohexanol, 3,3-dimethylacrylic acid, 3,3'-thiodipropionic acid, 3,4-dihydrocoumarin, 3,4-dimethyl-1,2-cyclopentanedione, 3,4-hexanedione, 3,4-xylenol, 3,5,5-trimethylhexanal, 3,5,5-trimethylhexanol, 3,5,9-undecatrien-2-one, 6,10-dimethyl-, 3,5-dihydroxyacetophenone, 3,5-di-tert-butyl-4-hydroxybenzyl alcohol, 3,7,7-trimethyl bicyclohep-3-ene, 3,7-dimethyl-1,3,6-octatriene, 3,7-dimethyl-1,6-octadien-3-yl benzoate, 3,7-dimethyl-1,6-octadien-3-yl butyrate, 3,7-dimethyl-1,6-octadien-3-yl isobutyrate, 3,7-dimethyl-1,6-octadien-3-ylpropanoate, 3,7-dimethyl-1-octanol, 3,7-dimethyl-3-octanol, 3-acetyl-2,5-dimethylthiophene, 3-acetyl-2-5dimethylfuran, 3-acetyl-6-methyl-2,4-pyrandione, 3-buten-2-one, 3-methyl-4-phenyl-, 3-butyl-1 (3H)-isobenzofuranone, 3-cyclopentylpropionic acid, 3-ethyl pyridine, 3-ethyl-2-hydroxy-2-cyclopenten-1-one, 3-heptanol, 3-hepten-2-one, 3-hexanol, 3-hexanone, 3-hexen-1-ol, acetate, (Z)-, 3-hexenal, 3-hexenyl 3-methylbutanoate, 3-hydroxy-4,5-dimethyl-2(5H)-furanone, 3-mercapto-2-butanol, 3-mercapto-2-pentanone, 3-methoxy-p-cymene, 3-methyl-1,2-cyclohexanedione, 3-methyl-1,2-cyclopentanedione, 3-methyl-1-pentanol, 3-methyl-2-butanethiol, 3-methyl-2-butanol, 3-methyl-2-buten-1-ol, 3-methyl-2-butenal, 3-methyl-2-cyclohexen-1-one, 3-methyl-2-cyclopenten-1-one, 3-methyl-2-cyclopentene-2-ol-one, 3-methylbutanoic acid, 3-methylbutanoic acid butyl ester, 3-methylbutyl phenylacetate, 3-methylcyclohexanone, 3-methylthio-1-hexanol, 3-nonen-2-one, 3-octanol, 3-octen-2-one, 3-octyl acetate, 3-penten-2-one, 3-phenyl-1-propanol, 3-phenyloxiranecarboxylic acid ethyl ester, 3-phenylprop-2-enyl cinnamate, 3-phenylpropionaldehyde, 3-phenylpropionic acid, 3-phenylpropyl acetate, 3-phenylpropyl formate, 3-phenylpropyl isobutyrate, 3-phenylpropyl propanoate, 3-propylidene phthalide, 4-(2,6,6-trimethyl cyclohexa-1,3-dienyl)but-2-en-4-one, 4-(2,6,6-trimethyl-1-cyclohexen-1-yl)-3-buten-2-one, 4-(2,6,6-trimethyl-2-cyclohexen-1-yl)-3-buten-2-one, 4-(2,6,6-trimethyl-2-cyclohexen-1-yl)butan-2-one, 4-(4-hydroxy-4-methyl pentyl)-3-cyclohexene-1-carboxaldehyde, 4-(4-hydroxyphenyl)-2-butanone, 4-(4-methoxyphenyl)-2-butanone, 4-(methylthio)butanol, 4,5-dimethyl thiazole, 4-acetamidobenzoic acid, 4-acetyl-6-t-butyl-1,1-dimethylindan, 4-allyl-2,6-dimethoxyphenol, 4-aminobenzoic acid, 4-aminosalicylic acid, 4-chloro-3-methylphenol, 4-ethoxybenzaldehyde, 4-ethoxyphenol, 4-ethylbenzaldehyde, 4-ethylphenol, 4-heptanolide, 4-hexanolide, 4-hexen-3-one, 4-hexylresorcinol, 4-hydroxybenzoic acid, 4'-methoxyacetophenone, 4-methoxyphenylacetone, 4-methyl-1,1'-biphenyl, 4-methyl-2,3-pentanedione, 4-methyl-2-oxopentanoate, 4-methyl-2-pentenal, 4-methyl-2-pentyl-1,3-dioxolane, 4-methyl-5-thiazoleethanol, 4-methyl-5-thiazolylethyl acetate, 4-methyl-5-vinylthiazole, 4-methyl-alpha-methylstyrene, 4-methylcyclohexanone, 4-methylnonanoic acid, 4-methyloctanoic acid, 4-methylquinoline, 4-methyl-thiazole, 4-methylthio-2-butanone, 4-methylthio-4-methyl-2-pentanone, 4'-nitroacetanilide, 4-oxoisophorone, 4-phenyl-2-butanol, 4-phenyl-2-butyl acetate, 4-propylphenol, 4-tert-octylphenol, 4-vinylguaiacol, 5' IMP, 5-(cis-3-hexenyl) dihydro-5-methyl-2(3H)furanone, 5,6,7,8-tetrahydroquinoxaline, 5,6-dimethyl-8-isopropenylbicyclo[4,4,0]dec-1-en-3-one, 5,7-dihydro-2-methyl thieno(3,4-d)pyrimidine, 5-acetyl-2,4-dimethylthiazole, 5-ethyl-3-hydroxy-4-methyl-2(5H)-furanone malic acid, 5-ethyl-4-hydroxy-2-methyl-3[2H]furanone, 5-formyl-2-furansulfonic acid, sodium salt, 5-hydroxy-4-octanone, 5-hydroxy-6-methyl-3,4-pyridinedimethanol, 5-isopropyl-2-methyl-phenol, 5-methyl hexanoic acid, 5-methyl-2-thiophenecarboxaldehyde, 5-methyl-3-hexen-2-one, 5-methyl-3H-furan-2-one, 5-methyl-6,7-dihydro-5H-cyclopenta(b)pyrazine, 5-methylfurfural, 5-methylquinoxaline, 5-n-butyl-delta-valerolactone, 5-octanolide, 6,10-dimethyl-9-undecen-2-one, 6-amyl-alpha-pyrone, 6-methyl-3,5-heptadiene-2-one, 6-methyl-5-hepten-2-ol, 6-methyl-5-hepten-2-one, 6-methyl-alpha-ionone, 6-methylcoumarin, 6-methylquinoline, 6-octen-1-ol, 3,7-dimethyl-, (R)-, 6-octen-1-ol, 3,7-dimethyl-, (S)-, 6-octen-1-ol, 3,7-dimethyl-, formate, 6-octenal, 3,7-dimethyl-, (R)-, 7-methyl-3-methylene-1,6-octadiene, 8,8-diethoxy-2,6-dimethyl-2-octanol, 8-mercapto-p-menthan-3-one, 8-p-menthen-1-ol, acetaldehyde, acetaldehyde ethyl cis-3-hexenyl acetal, acetaldehyde phenethyl propyl acetal, acetic acid, acetic anhydride, acetoacetic acid isoamyl ester, acetoin, acetone, acetone propylene glycol acetal, acetophenone, acetyl isoeugenol, acetyl isovaleryl, acetyl tributyl citrate, acetyl valeryl, acetylacetaldehyde dimethyl acetal, aconitic acid, adipic acid, alginic acid, allyl 2-ethylbutyrate, allyl 2-furoate, allyl 3-methylbutyrate, allyl alpha-ionone, allyl anthranilate, allyl cinnamate, allyl crotonate, allyl cyclohexylacetate, allyl cyclohexylbutyrate, allyl cyclohexylpropionate, allyl hexanoate, allyl isothiocyanate, allyl mercaptan, allyl phenoxyacetate, allyl phenylacetate, allyl propionate, allyl sorbate, allyl thiopropionate, allyl tiglate, allylacetic acid, alpha, 4-dimethylbenzylalcohol, alpha,alpha-dimethyl phenethyl formate, alpha,alpha-dimethylphenethyl butyrate, alpha,beta-santalol, alpha-amyl cinnamaldehyde dimethyl acetal, alpha-amylcinnamyl alcohol, alpha-damascone, alpha-D-xylose, alpha-fenchyl acetate, alpha-furfuryl pentanoate, alpha-hydroxypropionic acid, alpha-ionol, alpha-isomethyl ionone, alpha-L-rhamnose, alpha-methyl benzyl formate, alpha-methylanisalacetone, alpha-methylbenzyl alcohol, alpha-methylcinnamaldehyde, alpha-methyl-p isopropylphenylpropanaldehyde, alpha-n-amyl-beta-phenyl acryl isovalerate, alpha-n-amyl-beta-phenylacryl acetate, alpha-phellandrene, alpha-piperitone, alpha-terpinene, alpha-terpineol, alpha-thioglycerol, aluminum, aluminum ammonium sulfate, aluminum chloride, aluminum chloride hexahydrate, aluminum hydroxide, aluminum nitrate nonahydrate, aluminum potassium sulfate, dodecahydrate, aluminum potassium sulfate, dodecahydrate, aluminum sulfate, aluminum sulfate, octadecahydrate, ammonium acetate, ammonium benzoate, ammonium bicarbonate, ammonium bisulfite, ammonium chloride, ammonium citrate, ammonium fluoride, ammonium hydroxide, ammonium nitrate, ammonium persulfate, ammonium phosphate monobasic, ammonium phosphate, dibasic, ammonium sulfate, ammonium sulfide, ammonium sulfite, amyl alcohol, amyl butyrate, amyl salicylate, amylcinnamaldehyde, amylcyclohexyl acetate, anethole, anisic acid, anisole, anisyl acetate, anisyl butyrate, anisyl formate, anisyl phenylacetate, anisyl propionate, arabinose, arginine, ascorbic acid, asparagine, aspartame, aspartic acid, aspirin, benzalacetone, benzaldehyde, benzaldehyde dimethylacetal, benzaldehyde glyceryl acetal, benzaldehyde propylene glycol acetal, benzene, benzene, (2-methoxyethyl)-, benzene, (butoxymethyl)-, benzene, 1,2-dimethoxy-4-(1-propenyl)-, benzene, 4-ethenyl-1,2-dimethoxy-, benzeneacetaldehyde, 4-methyl-, benzeneacetaldehyde, alpha-methyl-, benzeneacetic acid, 3-phenyl-2-propenyl ester, benzeneacetic acid, butyl ester, benzenepentanol, benzenepropanol, alpha, alpha-dimethyl-, benzenesulfonic acid, benzofuran-2-carboxaldehyde, benzoic acid, benzoic acid, 2-(methylamino)-, 2-methylpropyl ester, benzoin, benzophenone, benzothiazole, benzoyl peroxide, benzyl 3-methyl butanoate, benzyl acetate, benzyl alcohol, benzyl alcohol, alpha-methyl-, butyrate, benzyl benzoate, benzyl butyrate, benzyl cinnamate, benzyl dipropyl ketone, benzyl ether, benzyl ethyl ether, benzyl formate, benzyl isobutyl ketone, benzyl isobutyrate, benzyl mercaptan, benzyl methyl sulfide, benzyl phenylacetate, benzyl propionate, benzyl salicylate, benzyl tiglate, benzylacetoacetic acid, ethyl ester, benzylcarbinyl 2-methyl butyrate, benzylcarbinyl 3-phenyl propenoate, benzylcarbinyl alpha-toluate, benzylcarbinyl butyrate, benzylcarbinyl caproate, benzylcarbinyl formate, benzylcarbinyl isobutyrate, benzylcarbinyl propionate, benzylcarbinyl salicylate, benzylcarbinyl tiglate, beta-(2-furyl)acrolein, beta-alanine, beta-cyclodextrin, beta-D-fructopyranose, beta-homocyclocitral, betaine, beta-ionol, beta-phenylethylmethylethylcarbinol, bicyclo[4,1,0]hept-3-ene, 3,7,7-trimethyl-, (1S)-, biphenyl, bis(2-methyl-3-furyl)disulfide, bis(methylthio)methane, bisabolene, bois de rose oxide, borates, tetrasodium salts, borneol, bornyl acetate, bornyl formate, bornyl isovalerate, butane, 2-ethoxy-, butanethioic acid, S-methyl ester, butanoic acid, 2-propenyl ester, butanoic acid, 3-oxo-, 2-methylpropyl ester, butanoic acid, 3-oxo-, butyl ester, butanoic acid, 3-oxo-, phenylmethyl ester, butanoic acid, 3-phenyl-2-propenyl ester, butyl 2-methyl butyrate, butyl 2-methylpropanoate, butyl acetate, butyl anthranilate, butyl benzyl phthalate, butyl butyrate, butyl butyrolactate, butyl cinnamate, butyl cinnamic aldehyde, butyl formate, butyl levulinate, butyl mercaptan, butyl paraben, butyl sulfide, butylated hydroxyanisole, butylidene phthalide, butyraldehyde, caffeine, calcium acetate, calcium carbonate, calcium chloride, calcium chloride dihydrate, calcium citrate, calcium cyclamate, calcium gluconate, calcium glycerophosphate, calcium hydroxide, calcium hypophosphite, calcium iodate, calcium nitrate tetrahydrate, calcium oxide, calcium pantothenate, calcium peroxide, calcium phosphate monobasic, calcium phosphate tribasic, calcium phosphate, dibasic, calcium propionate, calcium pyrophosphate, calcium sorbate, calcium sulfate, camphene, campholenic aldehyde, camphoric acid, camphorsulfonic acid, capsaicin, carbonic acid, carvacryl ethyl ether, carveol, carvone, carvyl acetate, caryophyllene, cedran-8-yl acetate, chloroacetic acid, chloromethyl methyl ether, cholesterol, cholic acid, choline, choline bitartrate, choline chloride, cinnamaldehyde, cinnamic, acid, cinnamyl acetate, cinnamyl alcohol, cinnamyl benzoate, cinnamyl formate, cinnamyl isobutyrate, cinnamyl isovalerate, cinnamyl propionate, cis-2-hexen-1-ol, cis-3,7-dimethyl-2,6-octadien-1-yl 2-methyl propanoate, cis-3-hexen-1-ol, cis-3-hexenoic acid, cis-3-hexenyl anthranilate, cis-3-hexenyl benzoate, cis-3-hexenyl butyrate, cis-3-hexenyl caproate, cis-3-hexenyl cis-3-hexenoate, cis-3-hexenyl formate, cis-3-hexenyl isobutyrate, cis-3-hexenyl lactate, cis-3-hexenyl phenylacetate, cis-3-hexenyl propionate, cis-3-hexenyl pyruvate, cis-3-hexenyl tiglate, cis-3-hexenyl valerate, cis-3-octen-1-ol, cis-4-hepten-1-ol, cis-4-heptenal, cis-5-octen-1-ol, cis-6-nonenal, cis-6-nonenol, citral, citral diethyl acetal, citral dimethyl acetal, citral ethylene glycol acetal, citric acid, citronellal, citronellol, citronellyl acetate, citronellyl butyrate, citronellyl isobutyrate, citronellyl isovalerate, citronellyl phenylacetate, citronellyl propionate, citronellyl tiglate, citronellyl valerate, citronellyloxyacetaldehyde, citroxide, cocal, copper(I) iodide, copper(II) sulfate, coumarin, creatinine, cumene, cumic alcohol, cyclamic acid, cyclohexaamylose, cyclohexane, cyclohexanecarboxylic acid, cyclohexaneethanol, acetate, cyclohexanol, 5-methyl-2-(1-methylethyl)-, (1alpha,2beta,5alpha)-, cyclohexanol, 5-methyl-2-(1-methylethyl)-,(1alpha,2beta,5alpha)-, cyclohexene, 1-methyl-4-(1-methylethenyl)-, (+−)-, cyclohexyl acetate, cyclohexyl amine, cyclohexyl anthranilate, cyclohexyl butyrate, cyclohexyl formate, cyclohexyl isovalerate, cyclohexyl propionate, cyclohexylacetic acid, cyclopentanethiol, cyclopentanone, cymene, cysteine, D-(−)-fructose, D-(−)-tartaric acid, D(+)-10-camphorsulfonic acid, D-(+)-camphoric acid, D-(+)-glucono-1,5-lactone, D-(+)-lactose, D-(+)-maltose, D-(+)-mannose, D-(+)-proline, D-(+)-xylose, dabco, D-arabinose, decalactone, dehydro-beta-cyclocitral, delta-decalactone, delta-hexalactone, deoxycholic acid, dexpanthenol, D-fenchone, D-fructose 1,6-bisphosphate, D-fructose 1-phosphate, D-galactose, D-galacturonate, D-glucose, D-glucuronate, di(2-ethylhexyl) sulfosuccinic acid, sodium salt, diacetyl, diallyl disulfide, diallyl sulfide, dibenzyl disulfide, dibenzyl ketone, dibutyl phthalate, dichloroacetic acid, dicyclohexyl disulfide, diethanolamine, diethyl hydroxybutanedioate, diethyl L-(+)-tartrate, diethyl malonate, diethyl phthalate, diethyl succinate, diethylamine, diethylaminoethanol, diethylenetriamine, difurfuryldisulfide, difurfurylsulfide, dihydrocarveol, dihydrojasmone, dihydromyrcenol, dihydroxyacetophenone, dimethoxane, dimethyl anthranilate, dimethyl carbonate, dimethyl succinate, dimethyl sulfate, dimethyl sulfide, dimethyl terephthalate, dimethylacetal, dimethylamine, dimethylbenzylcarbinyl acetate, dimethyl-carbamodithioic acid, sodium salt, dimethyldicarbonate, dimethyldisulfide, dimethyltrisulfide, diphenylacetic acid, diphenyldisulfide, dipropyl disulfide, dipropyl ketone, D-isoascorbic acid, disodium, disodium cyanodithioimidocarbonate, disodium ethylenediaminetetraacetate dihydrate, disodium metasilicate, disodium pytophosphate, disodium succinate hexahydrate, DL-3-methylvaleric acid, DL-alanine, DL-alpha-tocopheryl acetate, DL-arginine, DL-aspartic acid, DL-cystine, DL-glutamic acid, D-limonene, DL-isoleucine, DL-lysine, DL-malic acid, DL-methionine, DL-monosodium glutamate, DL-phenylalanine, DL-proline, DL-tartaric acid, DL-tetrohydrofurfuryl propionate, DL-tyrosine, DL-valine, D-lysine hydrochloride, D-maltose monohydrate, d-mannitol, dodecyl sulfate, lithium salt, dodecylsulfonic acid, D-ribose, D-sorbitol 6-phosphate, D-tyrosine, dulcin, E-2-octenoic acid, EDTA, calcium derivative, disodium salt, eglantal, enanthoic acid, erythorbic acid monosodium salt, erythorbic acid sodium salt, erythritol, estragole, ethane-1,2-disulfonic acid, ethanesulfonic acid, ethanesulfonic acid, 2-hydroxy, ethanesulfonic acid, 2-hydroxy-, monosodium salt, ethanethioic acid, S-(2-furanylmethyl) ester, ethanethioic acid, S-methyl ester, ethanethioic acid, S-propyl ester, ethanol amine, ethoxyquin, ethyl (methylthio)acetate, ethyl (p-tolyloxy)acetate, ethyl 2-(methyldithio)propionate, ethyl 2-aminobenzoate, ethyl 2-mercaptopropionate, ethyl 2-methyl pentanoate, ethyl 2-methyl-3,4-pentadienoate, ethyl 2-methyl-4-pentenoate, ethyl 2-methylbutyrate, ethyl 2-trans-4-cis-decadienoate, ethyl 3(2-furyl)propanoate, ethyl 3-(2-furyl)propanoate, ethyl 3-(methylthio)propionate, ethyl 3-hexenoate, ethyl 3-hydroxybutyrate, ethyl 3-hydroxyhexanoate, ethyl 3-methyl pentanoate, ethyl 3-phenylpropionate, ethyl 4-hydroxybenzoate, ethyl 4-methoxybenzoate, ethyl 4-oxopentanoate, ethyl aalicylate, ethyl acetate, ethyl acetoacetate, ethyl acrylate, ethyl alcohol, ethyl benzoate, ethyl benzoylacetate, ethyl butyl ketone, ethyl butyraldehyde, ethyl butyrate, ethyl butyrylacetate, ethyl caproate, ethyl caprylate, ethyl cinnamate, ethyl crotonate, ethyl cyclohexanecarboxylate, ethyl cyclohexanepropionate, ethyl E-2-hexenoate, ethyl formate, ethyl isobutyrate, ethyl isovalerate, ethyl lactate, ethyl methyl carbonate, ethyl methylphenylglycidate, ethyl nitrite, ethyl n-valerate, ethyl phenylacetate, ethyl propionate, ethyl pyruvate, ethyl salicylate, ethyl sorbate, ethyl sulfide, ethyl tiglate, ethyl trans-2-octenoate, ethyl trans-4-decenoate, ethyl vanillin, ethyl vanillin propylene glycol acetal, ethylene brassylate, ethylene mercaptan, ethylenediamine, ethylenediamine dihydrochloride, ethylenediaminetetraacetate dihydrate, ethylenediaminetetraacetic acid, ethylenediaminetetraacetic acid, disodium salt, ethylsulfuric acid, eugenol, eugenyl acetate, farnesene, farnesol, fenchyl alcohol, ferric chloride, ferric oxide, ferric sulfate, folic acid, formaldehyde, formic acid, fructose 1,6-diphosphate disodium salt, fructose-6-phosphate, fumaric acid, furaneol, furfural, furfural acetone, furfuryl 3-methylbutanoate, furfuryl acetate, furfuryl alcohol, furfuryl butyrate, furfuryl isopropyl sulfide, furfuryl mercaptan, furfuryl methyl sulfide, furfuryl propionate, furfuryl thiopropionate, furfurylmethylether, fusidic acid sodium salt, galactaric acid, gallic acid, gamma-butyrolactone, gamma-decalactone, gamma-nonanolactone, gamma-octanoic lactone, gamma-undecalactone, gamma-valerolactone, gentisic acid, geraniol, geranyl acetate, geranyl acetoacetate, geranyl acetone, geranyl benzoate, geranyl formate, geranyl isobutyrate, geranyl isovalerate, geranyl N-butyrate, geranyl phenylacetate, geranyl propionate, glucoheptonic acid, gluconic acid, gluconic acid potassium salt, glucose-1-phosphate dipotassium salt, glutamic acid, glutamine, glutaraldehyde, glutaric acid, glutaric acid, 2-oxo-, glycerin, glycine, glycine ethyl ester hydrochloride, glycocholic acid, glycolic acid, guaiacyl phenyl acetate, guanosine-5'-monophosphate, disodium salt, heliotropine, hexaldehyde, hexane, hexyl 2-formate, hexyl 2-methylbutyrate, hexyl benzoate, hexyl butanoate, hexyl crotonate, hexyl formate, hexyl hexanoate, hexyl phenylacetate, hexyl propionate, hippuric acid, histidine, hydrazine, hydriodic acid, hydrobromic acid, hydrochloric acid, hydrogen peroxide, hydroquinone, hydroquinone dimethyl ether, hydroxycitronellal, hydroxycitronellol, hydroxymethylpyrone, hydroxyproline, hydroxypyruvate, iberverin, indole, inosine-5'-monophosphate sodium salt, inositol 1-phosphate, iron, iron (II)sulfate heptahydrate, isoamyl 2-methylbutyrate, isoamyl 3-(2-furyl)propionate, isoamyl alcohol, isoamyl benzoate, isoamyl cinnamate, isoamyl formate, isoamyl hexanoate, iso-amyl mercaptan, isoamyl n-butyrate, isoamyl propionate, isoamyl pyruvate, isoamyl salicylate, isoamylamine, isoborneol, isobornyl acetate, isobornyl isovalerate, isobornyl propionate, isobutyl 2-butenoate, isobutyl acetate, isobutyl anthranilate, isobutyl benzoate, isobutyl cis-2-methyl-2-butenoate, isobutyl formate, isobutyl isobutyrate, isobutyl isopentanoate, isobutyl mercaptan, isobutyl n-butyrate, isobutyl n-hexanoate, isobutyl phenylacetate, isobutyl propionate, isobutyl salicylate, isobutyraldehyde, isobutyric acid, isocaproic acid, isodihydro lavandulal, isoeugenol, isoeugenyl phenyl acetate, isoheptanol, isohexenyl cyclohexenyl carboxaldehyde, isoleucine, isopentyl acetate, isopentyl iso-pentanoate, isophorone, isopropyl 2-methylbutanoate, isopropyl 3-methylbutanoate, isopropyl acetate, isopropyl alpha-methylcrotonate, isopropyl benzoate, isopropyl formate, isopropyl hexanoate, isopropyl isobutyrate, isopropyl mercaptan, isopropyl N-butyrate, isopropyl phenylacetate, isopropyl propionate, isopulegol, isopulegyl acetate, isoquinoline, isovaleraldehyde, L-(−)-apple acid, L-(−)-carvone, L-(−)-fucose, L-(+)-arabinose, L-(+)-arginine monohydrochloride, L-(+)-isoleucine, L-(+)-lactic acid, L-(+)-tartaric acid, L-2-aminopropionic acid, lactic acid, lactitol, lactitol monohydrate, lactobionic acid, L-ascorbic acid sodium salt, L-asparagine, L-aspartic acid, lauric acid, L-borneol, L-bornyl acetate, L-carnitine, L-cysteine hydrochloride, leucine, levulinic acid, L-glutamic acid, L-glutamic acid hydrochloride, L-glutamic acid monopotassium salt, L-glutamine, L-histidine hydrochloride monohydrate, L-histidine methyl ester dihydrochloride, L-hydroxyproline, linalool, linalyl acetate, linalyl anthranilate, linalyl cinnamate, linalyl formate, linalyl isovalerate, linalyl phenylacetate, L-leucine, L-leucine methyl ester hydrochloride, L-linalool, L-malic acid, L-menthol, L-menthone, L-methionine, L-monosodium glutamate, L-proline, L-serine, L-threonine, L-tyrosine ethyl ester hydrochloride, L-valine, lysine, magnesium carbonate hydroxide, magnesium chloride, magnesium chloride hexahydrate, magnesium fumarate, magnesium gluconate, magnesium hydrogen phosphate trihydrate, magnesium hydroxide, magnesium phosphate tribasic, magnesium sulfate, magnesium sulfate heptahydrate, maleic acid, malic acid, malonaldehyde, malonaldehyde, sodium salt, malonic acid, maltitol, maltol isobutyrate, maltol propionate, mandelic acid, manganese (II) sulfate monohydrate, manganese chloride, manganese gluconate, mannitol, m-cresol, m-dimethoxybenzene, menthalactone, menthofuran, menthyl acetate, menthyl isovalerate, meso-inositol, meta-phenylenediamine, meta-phenylenedimine, methanesulfonic acid, methanol, methoxycinnamaldehyde, methyl 2,4-decadienoate, methyl 2-furoate, methyl 2-methoxybenzoate, methyl 2-methylbutanoate, methyl 2-methylpentanoate, methyl 2-naphthyl ketone, methyl 2-thiofuroate, methyl 3-(methylthio)propionate, methyl 3-hydroxyhexanoate, methyl 3-nonenoate, methyl 3-oxo-2-pentylcyclopentaneacetate, methyl 4-(methylthio)butyrate, methyl 4-hydroxybenzoate, methyl 4-methoxybenzoate, methyl 4-methyl pentanoate, methyl 4-phenylbutyrate, methyl acetate, methyl acrylate, methyl anthranilate, methyl benzaldehyde, methyl benzoate, methyl b-phenylpropionate, methyl butyrate, methyl caproate, methyl cinnamate, methyl cyclohexanecarboxylate, methyl e-2-octenoate, methyl ethyl ketone, methyl furfuryl disulfide, methyl heptyne carbonate, methyl isobutenyl ketone, methyl isobutyl ketone, methyl isobutyrate, methyl isopropenyl ketone, methyl isovalerate, methyl mercaptan, methyl methacrylate, methyl n-amyl ketone, methyl nicotinate, methyl pentanoate, methyl phenyl disulfide, methyl phenylacetate, methyl propionate, methyl propyl disulfide, methyl p-tert-butylphenylacetate, methyl salicylate, methyl valeraldehyde, methylethyl disulfide, methyleugenol, methylglyoxal, methylphenol, hydrogen sulfate, methylsulfuric acid sodium salt, methylthioethane, methyl-urea, mineral oil, m-methoxybenzoic acid, morpholine, musk ketone, N-(2-hydroxyethyl)morpholine, N-(2-hydroxyethyl)pyrrolidine, N,2,3-trimethyl-2-isopropylbutamide, N,N-dimethylethanolamine, nabam, N-acetylglycine, N-acetyl-L-methionine, n-amyl ethyl ketone, n-amyl formate, n-amyl n-caproate, naphthalene, 2-(2-methylpropoxy)-, naphthalene, 2-ethoxy-, naphthalene-1,5-disulfonic acid, naphthalene-2-sulfonic acid, N-benzyl-2-phenylethylamine, n-butanol, n-butyl lactate, n-butyl n-caproate, n-butyl pentanoate, n-butyl propionate, n-butyl salicylate, n-butylamine, n-butyric acid, n-decanoic acid, neosperidin dihydrochalcone, neral, nerol, nerol oxide, neryl acetate, neryl butyrate, neryl formate, neryl isovalerate, N-ethyl-p-menthane-3-carboxamide, n-hexanoic acid, n-hexanol, n-hexyl acetate, n-hexyl mercaptan, niacin, nickel, nicotinamide, nicotinic acid, nitric acid, nitrilotriacetic acid trisodium salt, nitrosyl chloride, nitrous oxide, N-methyl-D-glucamine, nonalactone, nonivarnide, nopol, n-propanol, n-propyl acetate, n-propyl benzoate, n-propyl butyrate, n-propyl isobutyrate, n-tetradecanoic acid, n-valeraldehyde, o-aminoacetophenone, o-cresol, octafluorocyclobutane, octahydrocoumarin, octanoic acid, oleic acid, o-methoxybenzaldehyde, o-methoxybenzoic acid, o-methoxycinnamaldehyde, o-methoxyphenyl acetate, o-methylanisole, o-methylbenzoic acid, orotic acid, orthoboric acid, ortho-sec-butyl cyclohexanone, o-toluenethiol, o-toluic acid, o-tolyl acetate, o-tolyl isobutyrate, oxalic acid, p-acetamidobenzoic acid, palmitic acid, pamoic acid, p-anisaldehyde, p-anise alcohol, p-cresol, p-cresyl alpha-toluate, p-cresyl isovalerate, p-cymen-8-ol, p-dimethylaminobenzaldehyde, pectin sugar, perillol, perillyl aldehyde, periodic acid, peroxyacetic acid, p-formylacetanilide, phenethyl 2-furoate, phenethyl acetate, phenethyl alcohol, phenethyl anthranilate, phenethyl benzoate, phenethylamine, phenol, phenol, 2-(methylthio)-, phenoxy ethyl isobutyrate, phenoxyacetic acid, phenyl acetate, phenyl ether, phenylacetaldehyde diisobutylacetal, phenylacetaldehyde dimethyl acetal, phenylacetaldehyde glyceryl acetal, phenylacetic acid, phenylalanine, phenylethanal, phenylethyl isovalerate, phenylmercaptan, phenylpyruvate, phosphoric acid, phosphorus oxychloride, picric acid, piperazine, piperidine, piperine, piperitenone, piperonyl acetate, p-isopropyl phenylacetaldehyde, p-isopropylacetophenone, pivalic acid, p-menth-1-en-8-yl propionate, p-menthan-2-one, p-methyl hydratropaldehyde, p-methylacetophenone, potassium acetate, potassium benzoate, potassium bicarbonate, potassium bisulfate, potassium bitartrate, potassium bromide, potassium carbonate, potassium carbonate, sesquihydrate, potassium chloride, potassium citrate, potassium citrate, monohydrate, potassium diphosphate, potassium fluoride, potassium hydroxide, potassium hypophosphite, potassium iodate, potassium iodide, potassium lactate, potassium metabisulfite, potassium metaphosphate, potassium nitrate, potassium nitrite, potassium permanganate, potassium persulfate, potassium phosphate monobasic, potassium phosphate, dibasic, potassium phosphate, tribasic, n-hydrate, potassium sodium tartrate, potassium sorbate, potassium sulfate, potassium sulfite, potassium thiocyanate, potassium, citrate, monohydrate, p-phenylenediamine, procaine, procaine hydrochloride, proline, propanoic acid, 2-hydroxy-, calcium salt (2:1), propanoic acid, 2-hydroxy-, calcium salt (2:1), (S)-, propanoic acid, 2-methyl-, 4-methylphenyl ester, propargyl alcohol, propionaldehyde, propionic acid, propionic acid, sodium salt, propiophenone, propyl formate, propyl gallate, propyl hexanoate, propyl isopentanoate, propyl mercaptan, propyl paraben, propyl phenylacetate, propyl propionate, propylene glycol, p-toluenesulfonic acid, p-toluenesulfonic acid monohydrate, p-tolyl acetate, p-vinylphenol, pyrazineethanethiol, pyridoxine hydrochloride, pyroglutamic acid, pyrrole, pyrrolidine, pyruvic acid, pyruvic acid sodium salt, quinine hydrochloride, quinine sulfate, dihydrate, quinoline, quinone, R-carvone, resorcinol, riboflavin, riboflavin 5'-(dihydrogen phosphate), monosodium salt, riboflavin-5-phosphate, ribose, ribose 5-phosphate, rose oxide, sabinene hydrate, saccharin, saccharin sodium, saccharin sodium, dihydrate, saccharin, sodium salt hydrate, salicylic acid, salicylylaldehyde, sebacic acid, sec-amyl alcohol, sec-butyl alcohol, serine, S-ethyl thioacetate, sodium (2-ethylhexyl)alcohol sulfate, sodium acetate, sodium acetate trihydrate, sodium aluminate, sodium benzoate, sodium bicarbonate, sodium bisulfite, sodium borohydride, sodium bromide, sodium carbonate, sodium carbonate monohydrate, sodium chloride, sodium chlorite, sodium citrate, dihydrate, sodium dehydroacetate, sodium dithionate dihydrate, sodium dithionite, sodium dodecyl sulfate, sodium D-pantothenate, sodium fluoride, sodium formate, sodium gluconate, sodium hexametaphosphate, sodium hydrogen phosphate, sodium hydroxide, sodium hypochlorite, sodium iodide, sodium lactate, sodium malonate, sodium metabisulfite, sodium monophosphate, sodium nitrate, sodium nitrite, sodium phosphate monobasic, sodium polymethacrylate, sodium potassium tartrate, tetrahydrate, sodium pyrophosphate, sodium salicylate, sodium silicate, sodium sorbate, sodium sulfate, sodium sulfate decahydrate, sodium sulfide, sodium sulfite, sodium tartrate, sodium taurocholate, sodium thiocyanate, sodium thiosulfate, sodium thiosulfate pentahydrate, sodium tripolyphosphate, sorbic acid, sorbitol, stearic acid, styrallyl acetate, succinic acid, succinic acid, disodium salt, succinic anhydride, sucrose, sucrose diacetate hexaisobutyrate, sulfamic acid, sulfosalicylic acid, sulfosalicylic acid, dihydrate, sulfric acid, zinc salt (1:1), heptahydrate, sulfuric acid, sulfuric acid, zinc salt (1:1), heptahydrate, sulfurous acid, tartaric acid, taurine, taurocholic acid, t-butyl alcohol, terephthalic acid, terpinen-4-ol, terpinyl acetate, tert-butylhydroquinone, tetrahydro-2-furanmethanol, tetrahydro-2-furanmethanol acetate, tetrahydrofurfuryl butyrate, tetramethyl-pyrazine, tetrasodium ethylenediaminetetraacetate, theophylline-7-acetic acid, thiamine hydrochloride, thiamine nitrate, thiazole, thiazole, 2,5-dimethyl-, thioanisole, thiobenzoic acid, S-methyl ester, thiocyanic acid, thiophene, 2,2'-dithiobis-, thiophenethiol, thiourea, threonine, thujone, thymol, tiglic acid, tiron, titanium dioxide, trans beta-(2-furyl)acrolein, trans,cis-2,6-dodecadien-1-al, trans,cis-2,6-nonadien-1-ol, trans,trans-2,4-decadienal, trans-2,trans-6-nonadienal, trans-2-hexen-1-ol, trans-2-hexenal, trans-2-hexenoic acid, trans-2-hexenyl butyrate, trans-2-hexenyl formate, trans-2-hexenyl isovalerate, trans-2-hexenyl propionate, trans-2-hexenyl valerate, trans-2-octen-1-yl acetate, trans-2-octen-4-ol, trans-2-octenal, trans-3-hexenal, trans-3-phenyl-2-propen-1-ol, trans-cinnamic aldehyde, trans-citral, triacetin, trichloroacetic acid, triethanolamine, triethyl citrate, trifluoromethanesulfonic acid, trihydroxybutyrophenone, trimethylamine, trimethyl-pyrazine, tri-n-butyrin, triphosphoric acid, pentapotassium salt, tripropionin, trisodium citrate, trisodium phosphate, Triton® X-100, tryptophan, tyrosine, urea, valeric acid, valine, valproic acid, vanillin, veratraldehyde, veratrole, vitamin B 1, vitamin C, vitamin E, vitamin P, vitamin U chloride, xylitol, zeranol, zinc acetate, zinc acetate dihydrate, zinc carbonate, zinc chloride, zinc hydrosulfite, and zinc oxide.

In some embodiments, the energetic compound is octahydro-1,3,5,7-tetranitro-1,3,5,7-tetrazocine (HMX) and the secondary material is N-methyl-2-pyrrolidone.

In some embodiments, the energetic compound is octahydro-1,3,5,7-tetranitro-1,3,5,7-tetrazocine (HMX) and the secondary material is 2,4-dinitro-2,4-diazapentane in a mole ratio of about 1:2.

In some embodiments, the energetic compound is octahydro-1,3,5,7-tetranitro-1,3,5,7-tetrazocine (HMX) and the secondary material is 1,2-phenylenediamine in a mole ratio of about 1:1.

In some embodiments, the energetic compound is octahydro-1,3,5,7-tetranitro-1,3,5,7-tetrazocine (HMX) and the secondary material is 2-bromoaniline in a mole ratio of about 1:1.

In some embodiments, the energetic compound is octahydro-1,3,5,7-tetranitro-1,3,5,7-tetrazocine (HMX) and the secondary material is 3,4-diaminotoluene in a mole ratio of about 1:1.

In some embodiments, the energetic compound is octahydro-1,3,5,7-tetranitro-1,3,5,7-tetrazocine (HMX) and the secondary material is 4-fluoroaniline in a mole ratio of about 1:1.

In some embodiments, the energetic compound is octahydro-1,3,5,7-tetranitro-1,3,5,7-tetrazocine (HMX) and the secondary material is thieno[3,2-b]thiophene in a mole ratio of about 1:1.

In some embodiments, the energetic compound is octahydro-1,3,5,7-tetranitro-1,3,5,7-tetrazocine (HMX) and the secondary material is dimethylformamide (DMF).

In some embodiments, the energetic compound is octahydro-1,3,5,7-tetranitro-1,3,5,7-tetrazocine (HMX) and the secondary material is 2-pyrrolidone in a mole ratio of about 1:1.

In some embodiments, the energetic compound is octahydro-1,3,5,7-tetranitro-1,3,5,7-tetrazocine (HMX) and the secondary material is 4-picolene-N-oxide in a mole ratio of about 1:1.

In some embodiments, the energetic compound is octahydro-1,3,5,7-tetranitro-1,3,5,7-tetrazocine (HMX) and the secondary material is 2-picoline-N-oxide in a mole ratio of about 1:2.

In some embodiments, the energetic compound is octahydro-1,3,5,7-tetranitro-1,3,5,7-tetrazocine (HMX) and the secondary material is 1,4-piperazinedicarboxaldehyde in a mole ratio of about 1:1.

In some embodiments, the energetic compound is octahydro-1,3,5,7-tetranitro-1,3,5,7-tetrazocine (HMX) and the secondary material is 2,4,6,8,10,12-hexanitro-2,4,6,8,10,12-hexaazaisowurtzitane (CL-20) in a mole ratio of about 1:2.

In some embodiments, the energetic compound is octahydro-1,3,5,7-tetranitro-1,3,5,7-tetrazocine (HMX) and the secondary material is 5-nitro-1,2,4-triazol-3-one (NTO).

In some embodiments, the energetic compound is octahydro-1,3,5,7-tetranitro-1,3,5,7-tetrazocine (HMX) and the secondary material is $H_2O$ in a mole ratio of about 2:1.

In some embodiments, the energetic compound is 2,4,6-trinitrotoluene (TNT) and the secondary material is 2,4,6,8,10,12-hexanitro-2,4,6,8,10,12-hexaazaisowurtzitane (CL-20) in a mole ratio of about 1:1.

In some embodiments, the energetic compound is 2,4,6-trinitrotoluene (TNT) and the secondary material is 1,3,5-trinitrobenzene (TNB) in a mole ratio of about 1:1.

In some embodiments, the energetic compound is 2,4,6-trinitrotoluene (TNT) and the secondary material is naphthalene in a mole ratio of about 1:1.

In some embodiments, the energetic compound is 2,4,6-trinitrotoluene (TNT) and the secondary material is 1-bromonaphthalene in a mole ratio of about 1:1.

In some embodiments, the energetic compound is 2,4,6-trinitrotoluene (TNT) and the secondary material is 9-bromonaphthalene in a mole ratio of about 1:1.

In some embodiments, the energetic compound is 2,4,6-trinitrotoluene (TNT) and the secondary material is anthracene in a mole ratio of about 1:1.

In some embodiments, the energetic compound is 2,4,6-trinitrotoluene (TNT) and the secondary material is 9-bromoanthracene in a mole ratio of about 1:1.

In some embodiments, the energetic compound is 2,4,6-trinitrotoluene (TNT) and the secondary material is phenanthrene in a mole ratio of about 1:1.

In some embodiments, the energetic compound is 2,4,6-trinitrotoluene (TNT) and the secondary material is perylene in a mole ratio of about 1:1.

In some embodiments, the energetic compound is 2,4,6-trinitrotoluene (TNT) and the secondary material is tetrathiafulvalene in a mole ratio of about 1:1.

In some embodiments, the energetic compound is 2,4,6-trinitrotoluene (TNT) and the secondary material is thieno[3,2-b]thiophene in a mole ratio of about 1:1.

In some embodiments, the energetic compound is 2,4,6-trinitrotoluene (TNT) and the secondary material is phenothiazine in a mole ratio of about 1:1.

In some embodiments, the energetic compound is 2,4,6-trinitrotoluene (TNT) and the secondary material is dibenzothiophene in a mole ratio of about 1:1.

In some embodiments, the energetic compound is 2,4,6-trinitrotoluene (TNT) and the secondary material is 4,6-dimethyldibenzothiophene in a mole ratio of about 1:1.

In some embodiments, the energetic compound is 2,4,6-trinitrotoluene (TNT) and the secondary material is 1,2-phenylenediamine in a mole ratio of about 1:1.

In some embodiments, the energetic compound is 2,4,6-trinitrotoluene (TNT) and the secondary material is 1,4-dimethyoxybenzene in a mole ratio of about 1:1.

In some embodiments, the energetic compound is 2,4,6-trinitrotoluene (TNT) and the secondary material is 4-aminobenzoic acid in a mole ratio of about 1:1.

In some embodiments, the energetic compound is 2,4,6-trinitrotoluene (TNT) and the secondary material is 4-aminobenzoic acid in a mole ratio of about 1:2.

In some embodiments, the energetic compound is 2,4,6-trinitrotoluene (TNT) and the secondary material is anthranilic acid in a mole ratio of about 1:1.

In some embodiments, the energetic compound is 2,4,6-trinitrotoluene (TNT) and the secondary material is anthranilic acid in a mole ratio of about 1:2.

In some embodiments, the energetic compound is 2,4,6-trinitrotoluene (TNT) and the secondary material is pyrene in a mole ratio of about 1:1.

In some embodiments, the energetic compound is 2,4,6,8,10,12-hexanitro-2,4,6,8,10,12-hexaazaisowurtzitane (CL-20) and the secondary material is caprolactam.

In some embodiments, the energetic compound is 2,4,6,8,10,12-hexanitro-2,4,6,8,10,12-hexaazaisowurtzitane (CL-20) and the secondary material is $H_2O$ in a mole ratio of about 1:1.

In some embodiments, the energetic compound is 2,4,6,8,10,12-hexanitro-2,4,6,8,10,12-hexaazaisowurtzitane (CL-20) and the secondary material is dimethylformamide (DMF) in a mole ratio of about 1:2.

In some embodiments, the energetic compound is 2,4,6,8,10,12-hexanitro-2,4,6,8,10,12-hexaazaisowurtzitane (CL-20) and the secondary material is $CO_2$ in a mole ratio of about 2:1.

In some embodiments, the energetic compound is 2,4,6,8,10,12-hexanitro-2,4,6,8,10,12-hexaazaisowurtzitane (CL-20) and the secondary material is γ-butyrolactone in a mole ratio of about 1:1.

In some embodiments, the energetic compound is 2,4,6,8,10,12-hexanitro-2,4,6,8,10,12-hexaazaisowurtzitane (CL-20) and and the secondary material is benzotrifuroxan (BTF) in a mole ratio of about 1:1.

In some embodiments, the energetic compound is 2,4,6,8,10,12-hexanitro-2,4,6,8,10,12-hexaazaisowurtzitane (CL-20) and the secondary material is 1,4-dioxane in a mole ratio of about 2:7.

In some embodiments, the energetic compound is 2,4,6,8,10,12-hexanitro-2,4,6,8,10,12-hexaazaisowurtzitane (CL-20) and the secondary material is hexamethylphosphoramide in a mole ratio of about 1:4.

In some embodiments, the energetic compound is benzotrifuroxan (BTF) and the secondary material is 1,3,5-trinitrobenzene (TNB) in a mole ratio of about 1:1.

In some embodiments, the energetic compound is benzotrifuroxan (BTF) and the secondary material is 2-methoxy-1,3,5-trinitrobenzene or trinitroanisole (TNA) in a mole ratio of about 1:1.

In some embodiments, the energetic compound is benzotrifuroxan (BTF) and the secondary material is 2,4,6-trinitrotoluene (TNT) in a mole ratio of about 1:1.

In some embodiments, the energetic compound is benzotrifuroxan (BTF) and the secondary material is 1,3,3-trinitroazetidine (TNAZ) in a mole ratio of about 1:1.

In some embodiments, the energetic compound is benzotrifuroxan (BTF) and the secondary material is 1-methylamino-2,4,6-trinitrobenzene (MATNB) in a mole ratio of about 1:1.

Other Components.

In some embodiments, the composition including the cocrystals includes a carrier fluid. The carrier fluid can be any suitable carrier fluid. The carrier fluid can be any downhole fluid. In some embodiments, the carrier fluid is at least one of an aqueous liquid and an organic liquid. The carrier fluid can be at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, and dimethyl formamide. In some embodiments, the carrier fluid is about 0.001 wt % to about 99.999 wt % of the composition, or about 50 wt % to about 99 wt % of the composition, or about 0.001 wt % or less, or about 0.01 wt %, 0.5, 0.1, 1, 2, 3, 4, 5, 10, 15, 20, 30, 40, 50, 60, 70, 80, 85, 90, 95, 96, 97, 98, 99, 99.5, 99.9, 99.99, or about 99.999 wt % or more of the composition.

The composition can further include a viscosifier. The viscosifier can be any suitable viscosifier, such that the cocrystals can be used as described herein. In some embodiments, the viscosifier can be a gel or a crosslinked gel, such as at least one of poly(acrylic acid), poly(acrylate), poly(vinyl acetate), poly(vinyl alcohol), poly(ethylene glycol), poly(vinyl pyrrolidone), polyacrylamide, poly (hydroxyethyl methacrylate), starch, tamarind, tragacanth, guar gum, gum ghatti, gum arabic, locust bean gum, acetan, alginate, chitosan, curdlan, a cyclosophoran, dextran, diutan, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar. In some embodiments, the gel or crosslinked gel can include a crosslinker, such a crosslinker including at least one of chromium, aluminum, antimony, zirconium, titanium, calcium, boron, iron, silicon, copper, zinc, magnesium, and an ion thereof. The viscosifier can be any suitable proportion of the composition. In some example, the viscosifier can be about 0.001 wt % to about 99.999 wt % of the composition, or about 0.001 wt % to about 50 wt % of the composition, or about 0.001 wt % or less, or about 0.01 wt %, 0.5, 0.1, 1, 2, 3, 4, 5, 10, 15, 20, 30, 40, 50, 60, 70, 80, 85, 90, 95, 96, 97, 98, 99, 99.5, 99.9, 99.99, or about 99.999 wt % or more of the composition.

Downhole Mixture or Composition.

The composition including energetic cocrystals can be combined with any suitable downhole fluid before, during, or after the placement of the composition in the subterranean formation or the contacting of the composition and the subterranean material. In some examples, the energetic cocrystals are combined with a downhole fluid above the surface, then the combined composition is placed in a subterranean formation or is placed downhole and contacted with a subterranean material. In another example, the energetic cocrystals are injected into a subterranean formation to combine with a downhole fluid, and the combined composition is contacted with a subterranean material or is considered to be placed in the subterranean formation. In various examples, at least one of prior to, during, and after the placement of the composition in the subterranean formation or the contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, or a combination thereof.

In various embodiments, the method includes combining the composition including energetic cocrystals with any suitable downhole fluid, such as an aqueous or oil-based fluid including a drilling fluid, stimulation fluid, fracturing fluid, spotting fluid, clean-up fluid, production fluid, completion fluid, remedial treatment fluid, abandonment fluid, pill, acidizing fluid, or a combination thereof, to form a mixture. The placement of the composition in the subterranean formation can include contacting the subterranean material and the mixture. The contacting of the subterranean material and the composition can include contacting the subterranean material and the mixture. A mixture that is placed in the subterranean formation or contacted with the subterranean material can include any suitable weight percent of the composition including energetic cocrystals, such as about 0.000,000,01 wt % to 99.999,99 wt %, 0.000,1-99.9 wt %, 0.1 wt % to 99.9 wt %, or about 20-90 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt % or more of the composition.

In some embodiments, the composition can include any suitable amount of any suitable material used in a downhole fluid. For example, the composition can include water, saline, aqueous base, oil, organic solvent, synthetic fluid oil phase, aqueous solution, alcohol or polyol, cellulose, starch, alkalinity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, dispersants, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement fly ash, metakaolin, shale, zeolite, a crystalline silica compound, amorphous silica, hydratable clays, microspheres, pozzolan lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture. The drilling fluid can be present in the mixture with the composition including energetic cocrystals in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 ($5^{th}$ ed. 1988). An oil-based or invert emulsion-based drilling fluid can include between about 50:50 to about 95:5 by volume of oil phase to water phase. A substantially all oil mud includes about 100% liquid phase oil by volume; e.g., substantially no internal aqueous phase.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

In various embodiments, the present invention can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, manmade materials such as ceramic proppant. In some embodiments, proppant can have an average particle size of about 0.15 mm to about 2.5 mm, about 0.25-0.43 mm, 0.43-0.85 mm, 0.85-1.18 mm, 1.18-1.70 mm, and 1.70-2.36 mm.

System or Apparatus.

In various embodiments, the present invention provides a system. The system can include a composition including energetic cocrystals, wherein each energetic cocrystal independently includes an energetic compound and a secondary material. The system can also include a subterranean formation including the composition therein, or including a subterranean material in contact with the composition.

In various embodiments, the present invention provides an apparatus. The apparatus can be any suitable apparatus for using the energetic cocrystals described herein in a subterranean formation, or for carrying out methods of using the energetic cocrystals described herein. In some embodiments, the apparatus can include a mixing tank configured to blend energetic cocrystals with a downhole fluid to form a composition. Each energetic cocrystal independently includes an energetic compound and a secondary material. The apparatus can include a pump configured to place the composition in a subterranean formation.

In some embodiments, an apparatus provided by the present invention can include an activator configured to trigger detonation of energetic cocrystals placed in a subterranean formation such that compression waves are generated in the subterranean formation. The apparatus can include a detector configured to detect the compression waves and thereby measure at least one dimension of an area surrounding the composition placed in the subterranean formation.

Various embodiments provide systems and apparatus configured for delivering the composition described herein to a downhole location and for using the composition therein, such as for detonating the energetic cocrystals and detecting compression waves therefrom for measurement of subterranean features. In various embodiments, the systems can include a pump fluidly coupled to a tubular (e.g., any suitable type of oilfield pipe, such as pipeline, drill pipe, production tubing, and the like), the tubular containing a composition including the energetic cocrystals described herein.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery downhole.

Figure 3:
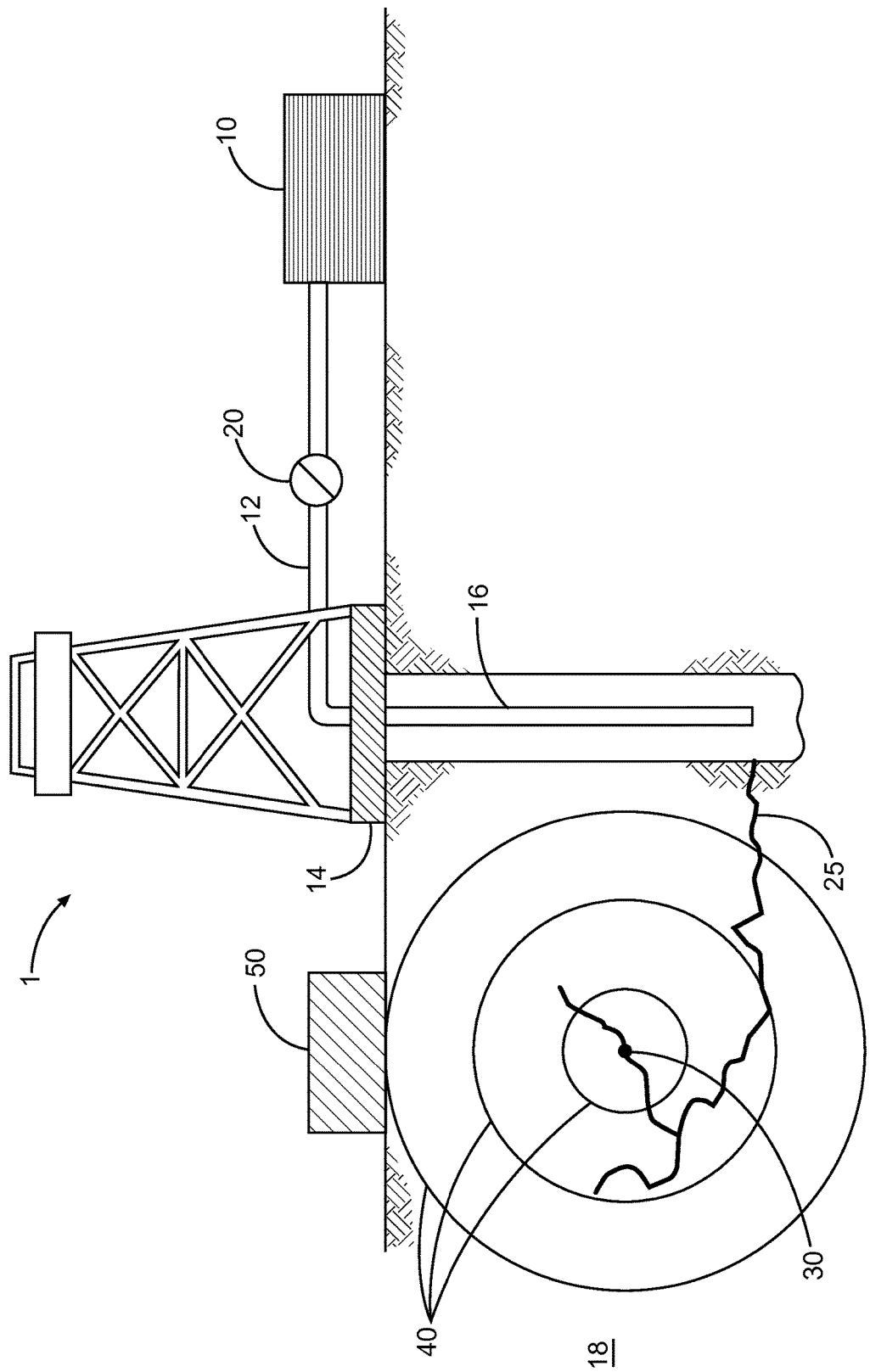
FIG. 3 illustrates systems and apparatuses for using an energetic cocrystal downhole, in accordance with various embodiments.
Figure 4A:
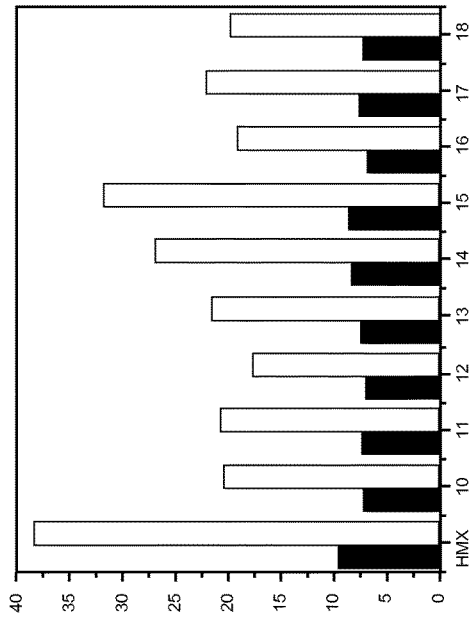
FIG. 4a illustrates the power as indicated by the estimated detonation velocity ($V_D$) and detonation pressure ($P_D$) of various energetic cocrystals including CL-20 as contrasted with pure CL-20, in accordance with various embodiments.
Figure 4B:
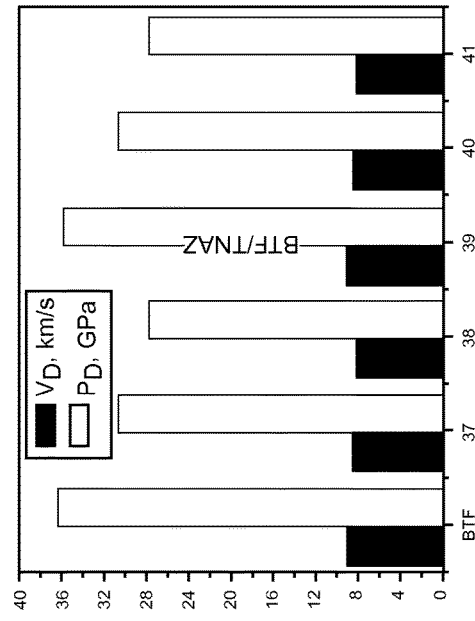
FIG. 4b illustrates the power as indicated by the estimated detonation velocity ($V_D$) and detonation pressure ($P_D$) of various energetic cocrystals including HMX as contrasted with pure HMX, in accordance with various embodiments.
Figure 4C:
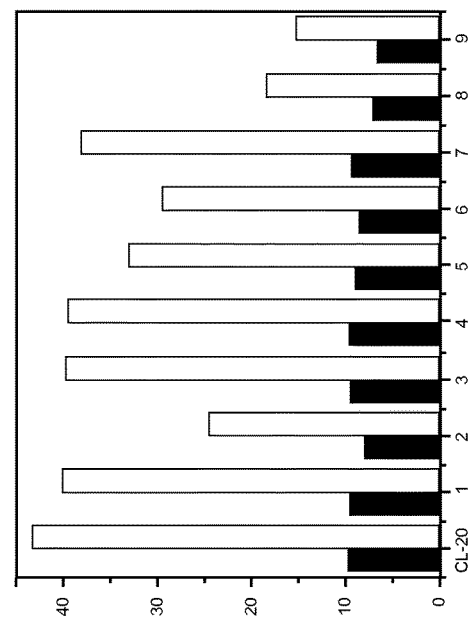
FIG. 4c illustrates the power as indicated by the estimated detonation velocity ($V_D$) and detonation pressure ($P_D$) of various energetic cocrystals including TNT as contrasted with pure TNT, in accordance with various embodiments.
Figure 4D:
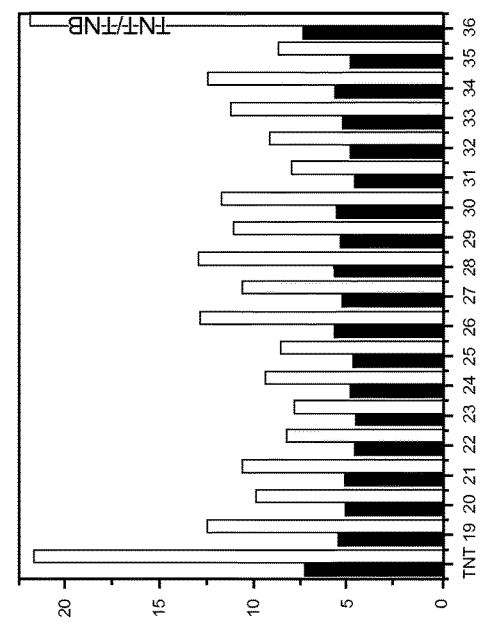
FIG. 4d illustrates the power as indicated by the estimated detonation velocity ($V_D$) and detonation pressure ($P_D$) of various energetic cocrystals including BTF as contrasted with pure BTF, in accordance with various embodiments.
Figure 5A:
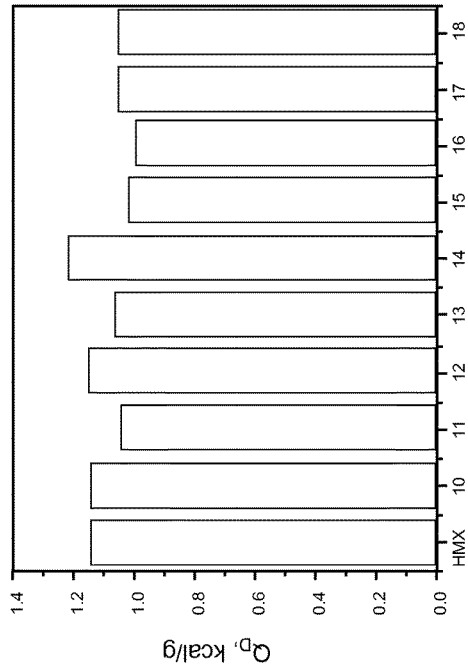
FIG. 5a illustrates the heat of detonation of various energetic cocrystals including CL-20 as contrasted with pure CL-20, in accordance with various embodiments.
Figure 5B:
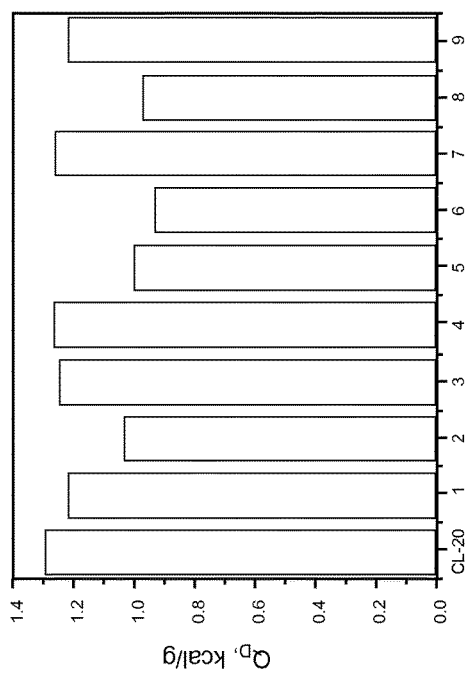
FIG. 5b illustrates the heat of detonation of various energetic cocrystals including HMX as contrasted with pure HMX, in accordance with various embodiments.
Figure 5C:
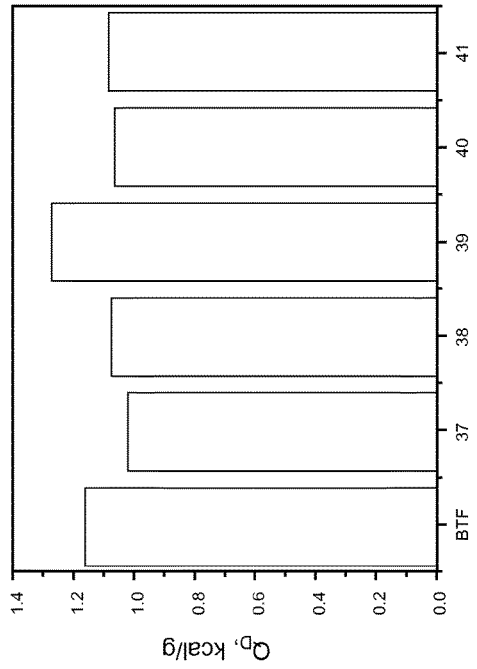
FIG. 5c illustrates the heat of detonation of various energetic cocrystals including TNT as contrasted with pure TNT, in accordance with various embodiments.
Figure 5D:
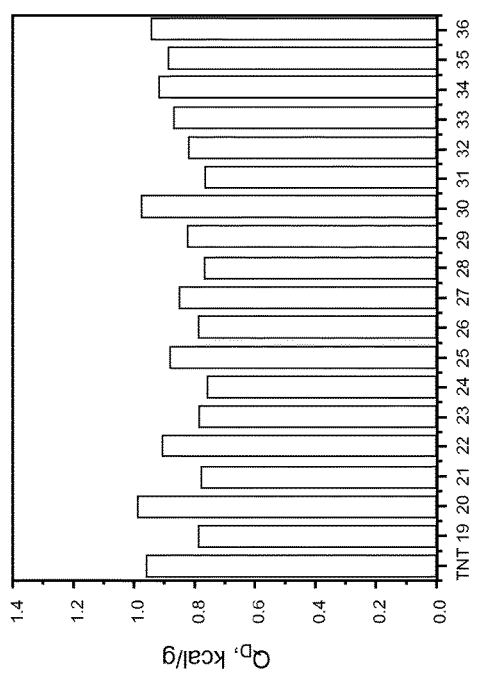
FIG. 5d illustrates the heat of detonation of various energetic cocrystals including BTF as contrasted with pure BTF, in accordance with various embodiments.
Figure 6A:
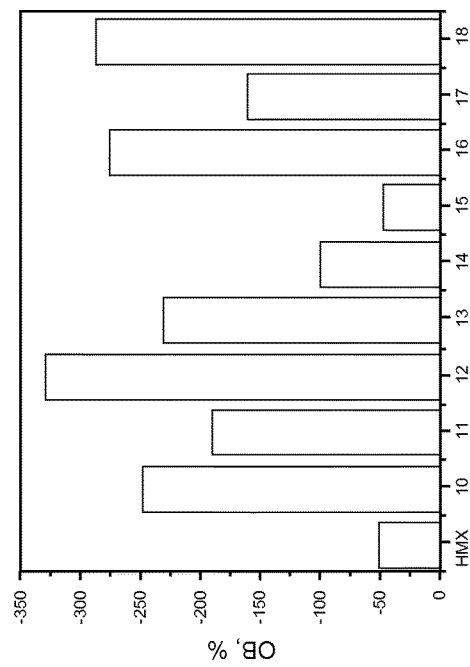
FIG. 6a illustrates the estimated oxygen balance (OB) of various energetic cocrystals including CL-20 as contrasted with pure CL-20, in accordance with various embodiments.
Figure 6B:
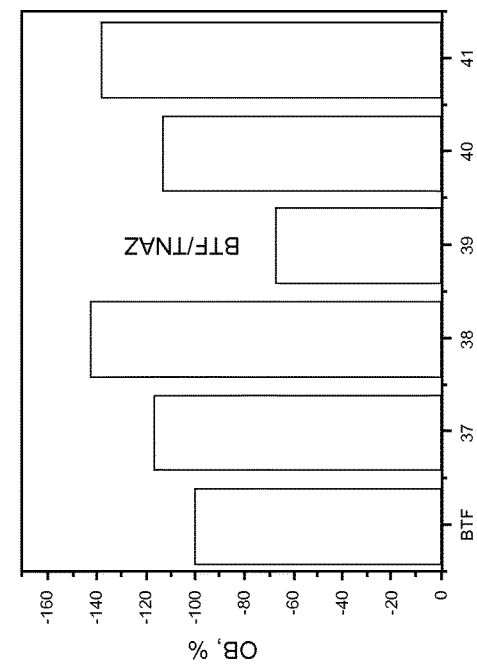
FIG. 6b illustrates the estimated oxygen balance (OB) of various energetic cocrystals including HMX as contrasted with pure HMX, in accordance with various embodiments.
Figure 6C:
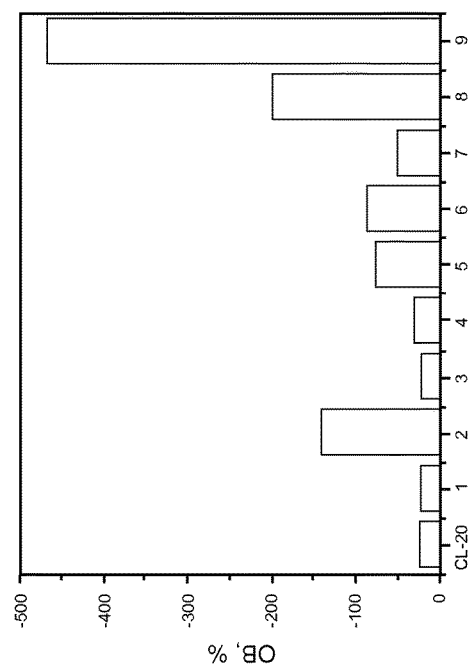
FIG. 6c illustrates the estimated oxygen balance (OB) of various energetic cocrystals including TNT as contrasted with pure TNT, in accordance with various embodiments.
Figure 6D:
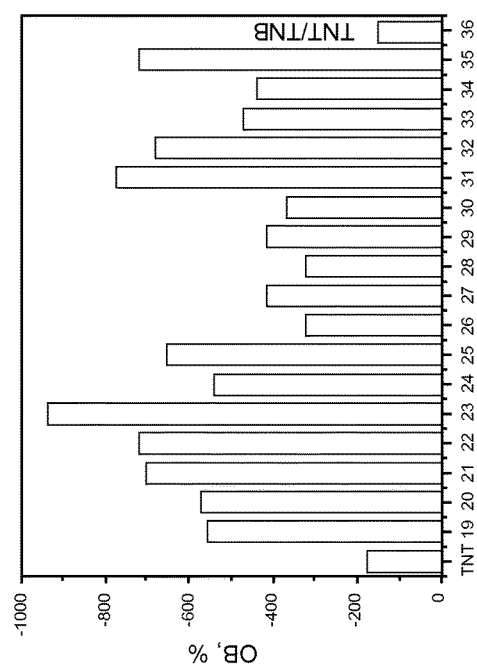
FIG. 6d illustrates the estimated oxygen balance (OB) of various energetic cocrystals including BTF as contrasted with pure BTF, in accordance with various embodiments.
Figure 7A:
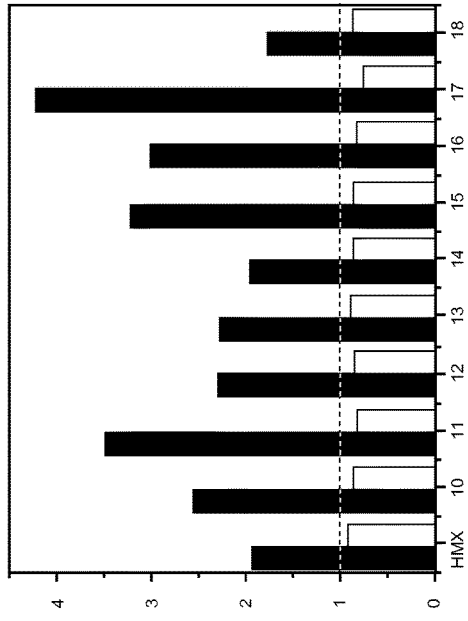
FIG. 7a illustrates the estimated aspect ratio (AR) and sphericity (SP) of various energetic cocrystals including CL-20 as contrasted with pure CL-20, in accordance with various embodiments.
Figure 7B:
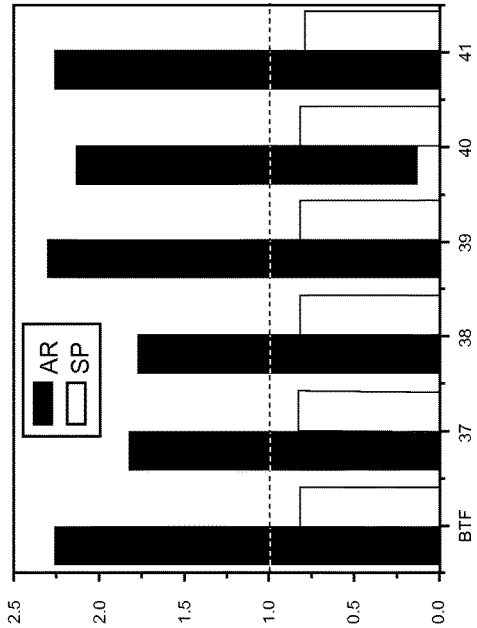
FIG. 7b illustrates the estimated aspect ratio (AR) and sphericity (SP) of various energetic cocrystals including HMX as contrasted with pure HMX, in accordance with various embodiments.
Figure 7C:
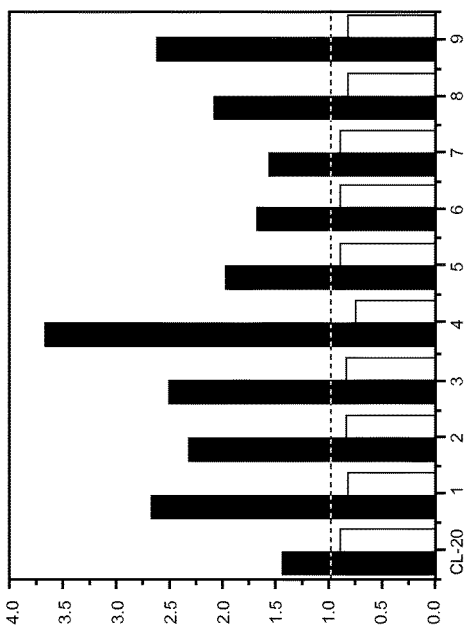
FIG. 7c illustrates the estimated aspect ratio (AR) and sphericity (SP) of various energetic cocrystals including TNT as contrasted with pure TNT, in accordance with various embodiments.
Figure 7D:
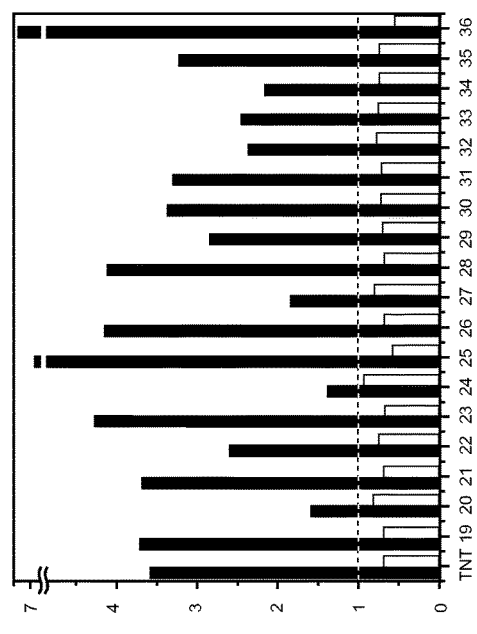
FIG. 7d illustrates the estimated aspect ratio (AR) and sphericity (SP) of various energetic cocrystals including BTF as contrasted with pure BTF, in accordance with various embodiments.

FIG. 3 shows an illustrative schematic of systems and apparatuses that can deliver embodiments of the compositions of the present invention to a downhole location, according to one or more embodiments. It should be noted that while FIG. 3 generally depicts a land-based system or apparatus, it is to be recognized that like systems and apparatuses can be operated in subsea locations as well. Embodiments of the present invention can have a different scale than that depicted in FIG. 3. As depicted in FIG. 3, system or apparatus 1 can include mixing tank 10, in which an embodiment of the composition can be formulated. The composition can be conveyed via line 12 to wellhead 14, where the composition enters tubular 16, tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 3 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 3, at least part of the composition can, in some embodiments, flow back to wellhead 14 and exit subterranean formation 18. The composition that flows back can be substantially diminished in the concentration of energetic cocrystals, or can have no cocrystals therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole equipment and tools that can come into contact with the composition during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components can be included in the systems and apparatuses generally described above and depicted in FIG. 3.

The wellbore can include a fracture or flow pathway 25 fluidly connected to the tubular. The fracture or flow pathway 25 can have energetic cocrystals 30 therein. The energetic cocrystals 30 can have any suitable distribution within the fracture or flow pathway 25, and can be concentrated in one or more locations or can be substantially dispersed throughout portions of the fracture or flow pathway 25. Detonation of the energetic cocrystals 30 causes compression waves in the subterranean formation 18, which can be detected by compression wave detector 50. The detector 50 can be above-surface, as shown, or can be in any suitable location, such as downhole. The detector 50 can use the compression waves to measure at least one dimension of the fracture or flow pathway 25.

Composition for Treatment of a Subterranean Formation.

Various embodiments provide a composition for treatment of a subterranean formation. The composition can be any suitable composition that can be used to perform an embodiment of the method for treatment of a subterranean formation described herein. For example, the composition can include energetic cocrystals, wherein each energetic cocrystal independently includes an energetic compound and a secondary material.

In some embodiments, the composition further includes a downhole fluid. The downhole fluid can be any suitable downhole fluid. In some embodiments, the downhole fluid is a composition for fracturing of a subterranean material, or a fracturing fluid. In some embodiments, the composition further includes a proppant. In various embodiments, at least some of the cocrystals can be coated on the proppant. In some embodiments, at least some of the cocrystals can be in a slurry with the proppant. In some embodiments, the composition can be a composition for microseismic imaging of a downhole fracture or flow pathway. In some embodiments, the composition can be a composition for generation or enlargement of downhole fractures.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including energetic cocrystals, wherein each energetic cocrystal independently includes an energetic compound, and a secondary material. The cocrystals can be formed in any suitable manner, such as by melting and blending together the energetic compound and the secondary material, and allowing the blend to cool and recrystallize to form the cocrystals; or, by dissolving the energetic compound and the secondary material in a common solution, and allowing the solution to evaporate or otherwise reducing the solubility of the materials in the solution, forming the cocrystals.

EXAMPLES

The present invention can be better understood by reference to the following Examples which are offered by way of illustration. The present invention is not limited to the Examples given herein.

The following Examples appear in Landenberger, K., et al. *Cryst. Growth Des.*, 2010, 10, pp 5341-5347; Bolton, O., et al. *Cryst. Growth Des.*, 2012, 12, pp 4311-4313; Yang, Z., et al. *Cryst. Growth Des.*, 2012, 12, pp 5155-5158; Landenberger, K., et al. *Cryst. Growth Des.*, 2012, 12, pp 3603-3609; and Zhang, C. et al. *CrystEngComm*, 2013, 15, 4003-4014.

Example 1

Cocrystals of octahydro-1,3,5,7-tetranitro-1,3,5,7-tetrazocine (HMX) and 1,4-piperazinedicarboxaldehyde (1:1), HMX and N-methyl-2-pyrrolidone, HMX and 2-bromoaniline (1:1), HMX and 2-picoline-N-oxide (1:2), HMX and 4-picolene-N-oxide (1:1), HMX and thieno[3,2-b]thiophene (1:1), HMX and 1,2-phenylenediamine (1:1), HMX and 2-pyrrolidone (1:1), HMX and 3,4-diaminotoluene (1:1), HMX and 4-fluoroaniline (1:1)

2-Bromoaniline (98%), 2-pyrrolidone (98%), 1,4-piperazinedicarboxaldehyde (98%), and 2-picoline-N-oxide (98%) were obtained from Acros Organics (New Jersey, USA). 1,2-Phenylenediamine (99.5%), 3,4-diaminotoluene (97%), and 4-picoline-N-oxide (98%) were obtained from Aldrich, (St. Louis, Mo.). 4-Fluoroaniline (98%) was obtained from Aldrich (Milwaukee, Wis.). N,N-Dimethylformamide (Synthesis, Fisher BioReagent) and N-methyl-2-pyrrolidone (Fisher BioReagents) were obtained from Fisher Scientific. Thieno[3,2-b]thiophene was synthesized and purified according to the published procedure. 1,3,5,7-Tetranitro-1,3,5,7-tetrazacyclooctane (HMX) was obtained from both the China Lake Naval Air Weapons Station and the Indian Head Naval Surface Warfare Center.

HMX/1,4-Piperazinedicarboxaldehyde, HMX/2-bromoaniline, and HMX/thieno[3,2-b]thiophene were prepared in a 1:1 molar ratio, while HMX/2-pyrrolidone and HMX/4-fluoroaniline were prepared in 1:10 molar ratio. HMX/4-Picoline-N-oxide was prepared in a 2:3 ratio and HMX/2-picoline-N-oxide in a 1:2 ratio. In all of these samples HMX and the cocrystal-former (e.g., the secondary material) were dissolved in acetonitrile (Fisher Chemical, HPLC Grade), in a sufficient amount to ensure full dissolution, placed in 4 mL glass vials and left to evaporate at room temperature. In the case of HMX/1,2-phenylenediamine and HMX/3,4-diaminotoluene, cocrystals were prepared in a 3:4 ratio, dissolved in a sufficient volume of acetonitrile, deposited in a polypropylene 96 well plate and left to evaporate at room temperature. To achieve larger, pure sample quantities of HMX/1,4-piperazinedicarboxaldehyde, samples in both a 1:1 and 1:3 ratio were prepared, dissolved in acetonitrile, placed in a 96 well polypropylene plate and left to evaporate at room temperature. The mass of HMX employed for HMX cocrystal formation ranged from 0.5 to 20 mg as measured on a Sartorius ME36S microbalance (±0.005 mg).

Example 2

Cocrystals of octahydro-1,3,5,7-tetranitro-1,3,5,7-tetrazocine (HMX) and 2,4,6,8,10,12-hexanitro-2,4,6,8,10,12-hexaazaisowurtzitane (CL-20) (1:2)

Energetic compounds 2,4,6,8,10,12-hexanitro-2,4,6,8,10,12-hexaazaisowurtzitane (CL-20) and 1,3,5,7-tetranitro-1,3,5,7-tetrazacyclooctane (HMX) were received from the Naval Surface Warfare Center at Indian Head.

A glass vial was loaded with 2.19 mg of CL-20 (5.0 µmol), 0.74 mg of HMX (2.5 µmol) and 1 mL of 2-propanol, which had been first dried over 3A molecular sieves. Sonication and mild heating were used to completely dissolve all solids. The solution was passed through a 0.45 µm PTFE filter into a clean glass vial and the solvent was allowed to evaporate from a loosely capped vial at 23° C. over several days. Colorless plates of the 2:1 CL20:HMX cocrystal were formed, though with approximately 10-15% (estimated visually) β-HMX and β/ε-CL20 also present. Concomitant growth of pure component crystals occurred frequently when 2 was grown by evaporation. To obtain phase-pure samples, solvent-mediated conversions were utilized as described below.

Solvent-mediated cocrystallization was conducted by charging a glass vial with 22.42 mg of ε-CL-20 (51.2 µmol), 7.58 mg of β-HMX (25.6 µmol), dissolving both in approximately 200 µL of acetone, then drying the sample rapidly with a stream of nitrogen gas while heating the vial to 80° C. This produced both compounds in low density polymorphs, γ-CL-20 and γ or α-HMX. A single seed crystal of a CL20:HMX cocrystal, prepared from solution growth as described above, was added to the vial along with 1 mL of 2-propanol, which had been dried over 3A molecular sieves and filtered through a 0.45 µm PTFE syringe filter. The slurry was shaken on an IKA model KS 260 shaker for five days, during which time all solids converted to CL20:HMX. Samples were analyzed by Raman spectroscopy to confirm the presence of CL20:HMX cocrystal and lack of other phases. These samples included very small crystals whose habits were not immediately recognizable as CL20:HMX by optical microscopy.

Example 3

Cocrystals of 2,4,6-trinitrotoluene (TNT) and naphthalene (1:1), TNT and anthracene (1:1), TNT and 9-bromoanthracene (1:1), TNT and phenanthrene (1:1), TNT and tetrathiafulvalene (1:1), TNT and thieno[3,2-b]thiophene (1:1), TNT and phenothiazine (1:1), TNT and dibenzothiophene (1:1), TNT and 4,6-dimethyldibenzothiophene (1:1), TNT and 1,2-phenylenediamine (1:1), TNT and 1,4-dimethyoxybenzene (1:1), TNT and 4-aminobenzoic acid (1:1 or 1:2), and TNT and anthranilic acid (1:1 or 1:2)

Naphthalene (98%), anthracene (99%), 9-bromoanthracene (94%), phenanthrene (98+%), dibenzothiophene (98%), 2-amino-4,5-dimethoxybenzoic acid (98%) and perylene (99%) were obtained from Aldrich (Milwaukee, Wis.). Tetrathiafulvalene (97%), 4,6-dimethyldibenzothiophene (97%), 1,4-dimethoxybenzene (99%) and 1,2-phenylenediamine (99.5%) were obtained from Aldrich, (St. Louis, Mo.). Phenothiazine and 1-bromonaphthalene (97%) were obtained from Sigma (St. Louis, Mo.). Anthranilic acid (puriss, >99.5%) was obtained from Fluka (Steinheim, Switzerland). 2,4,6-Trinitrotoluene and thieno[3,2-b]thiophene were synthesized and purified according to published procedures.

High throughput screening (HTS) experiments were performed in 96 well polypropylene plates. Solutions were dispensed into the plates using either a Gilson 215 liquid handler or an Eppendorf EpMotion 5070 liquid handling robot. A 10 mg/mL (0.044 M) solution of TNT in ethanol (Decon Labs, Inc., 200 Proof, USP) was dispensed throughout the plate; the volumes dispensed across each row were 0, 2, 2, 3, 4, 3, 4, 4, 6, 6, 6, and 4 μL. A different cocrystal former solution (0.044 M) was dispensed for every row; the volumes dispensed across each row were 6, 8, 6, 6, 6, 4, 4, 3, 4, 3, 2, and 0 μL. Cocrystal formers screened were dissolved in ethanol when possible. Cocrystal formers anthracene, 9-bromoanthracene, and tetrathiafulvalene were dissolved in inhibitor-free tetrahydrofuran (Fisher Chemical, HPLC Grade). Other solvents used for the screening process include methanol (Fisher Chemical, Certified ACS), dimethylsulfoxide (Fisher Chemical, HPLC Grade), and toluene (Fisher Chemical, Certified ACS). The solutions were mixed, covered, and allowed to evaporate at room temperature over a period of three days. The resulting ratios of cocrystal former to TNT were 1:4, 1:3, 1:2, 2:3, 3:4, 1:1, 4:3, 3:2, 2:1, and 3:1.

Additional crystallizations were performed to produce cocrystals for powder X-ray diffraction (PXRD), thermal analysis and single crystal X-ray diffraction. TNT:naphthalene –1.380 mg TNT and 0.779 mg naphthalene in 1 mL ethanol, 6.1 mg TNT and 3.7 mg naphthalene in 0.7 mL ethanol, 0.604 mg TNT and 0.232 mg naphthalene in acetone; TNT:anthracene—0.367 mg TNT and 0.401 mg anthracene in 0.5 mL tetrahydrofuran (THF), 0.845 mg TNT and 0.798 mg anthracene in 0.5 mL THF; TNT:9-bromoanthracene—0.442 mg TNT and 0.506 mg of 9-bromoanthracene in 0.5 mL acetonitrile, 10.4 mg TNT and 11.8 mg 9-bromoanthracene in 1 mL THF; TNT:phenanthrene—0.651 mg TNT and 0.532 mg phenanthrane in 0.5 mL ethanol; TNT:tetrathiafulvalene—0.582 mg TNT and 0.522 mg tetrathiafulvalene in 0.5 mL THF; TNT:thieno[3,2-b]thiophene—6.7 mg TNT and 4.6 mg thieno[3,2-b]thiophene in 0.7 mL ethanol, 1.373 mg TNT and 0.623 mg thieno[3,2-b]thiophene in acetone, 1.240 mg TNT and 0.747 mg thieno[3,2-b]thiophene in ethanol; TNT:phenothiazine—0.853 mg TNT and 0.795 mg phenothiazine in 0.5 mL ethanol; 0.372 mg TNT and 0.342 mg phenothiazine in ethanol; TNT:dibenzothiophene—0.657 mg TNT and 0.629 mg dibenzothiophene in 0.5 mL ethanol; TNT:4,6-dimethyldibenzothiophene—2.0 mg TNT and 1.9 mg 4,6-dimethyldibenzothiophene in 0.4 mL of ethanol; TNT:1,2-phenylenediamine—5.903 mg TNT and 2.775 mg 1,2-phenylenediamine in 1 mL of methanol; 0.967 mg TNT and 0.503 mg 1,2-phenylenediamine in a 1:1 mixture by volume of THF and ethanol; TNT:1,4-dimethoxybenzene—13.399 mg TNT and 8.216 mg 1,4-dimethoxybenzene in 1.6 mL ethanol; TNT:4-aminobenzoic acid 1:1—12.128 mg TNT and 7.384 mg 4-aminobenzoic acid in 1.4 mL ethanol; TNT:anthranilic acid 1:1—7.473 mg TNT and 4.750 mg anthranilic acid in 1 mL ethanol.

Example 4

Cocrystals of 2,4,6,8,10,12-hexanitrohexaazaisowurtzitane (CL-20) and benzotrifuroxan (BTF) (1:1)

2,4,6,8,10,12-hexanitrohexaazaisowurtzitane (HNIW epsilon-form) was provided by Liaoning Qingyang Chemical Industry Co., Ltd. 1,3,5-trichloro-2,4,6-trinitrobenzene (starting material) was obtained by Beijing Hengye Zhongyuan Chemical Co., Ltd. BTF was synthesized by treatment of starting material with sodium azide to obtain intermediate product followed by its denitrification with propionic acid under reflex in the laboratory. The other chemicals and reagents used in the present Example were purchased from trade without further purification.

A 1:1 mixture of epsilon-HNIW (438 mg 1 mmol) and BTF (252 mg 1 mmol) was added to 100 ml of ethanol and mildly heated to all HNIW dissolution. The solution was allowed to evaporate slowly at room temperature over several days. Light yellow prism of 1:1 HNIW-BTF cocrystal explosive was obtained. This cocrystal also can be produced from alternative solvents, such as methanol, ethyl acetate, acetone.

Example 5

Characterization of Energetic Cocrystals

Table 1 shows the cocrystals and their properties, where d is density, $\Delta E_{1a}$ is lattice energy (calculated from COMPASS field with the field assigned charges, Ewald and atom-based summation methods for electrostatic and van der Walls interactions, respectively), HOF is heat of formation of the solid cocrystal (summation of lattice energy and the heats of formation of the gaseous state of molecules involved (HOF(g), which were derived from PM6 calculations)), $Q_D$ is the heat of detonation reaction (derived from HOF differences converted to per gram), $V_D$ is the detonation velocity, $P_D$ is the detonation pressure, OB is the oxygen balance, AR is the aspect ratio, and SP is the sphericity. When not recorded directly, $d_{298k}$ was estimated as $d_{T0}/(1+ \alpha_v(298-T_0))$, wherein $d_{T0}$ is the density at $T_0$ and $\alpha_v$ is the coefficient of volume expansion. It was assumed for calculation purposes that there was no polymorphic transition within 95-298K for the cocrystals, and that the cocrystals had the same coefficient of volume expansion as the pure energetic crystals, where the $\alpha_v$ used was $1.5 \times 10^{-4}$, $1.6 \times 10^4$, $2.26 \times 10^{-4}$, and $3.57 \times 10^{-4}$ $K^{-1}$ for CL-20, HMX, TNT and BTF, respectively. For a cocrystal having formation $C_aH_bO_cN_dX_eS_fP_g$, its OB was calculated as $(c-(2a+b/2+2f+5g/2-e/2))/2*100\%$. $V_D$ and $P_D$ were determined by Kamlet approximation, where $V_D=1.01*(N^2*M*Q_D)*0.25*(1+1.30*d_{298k})$, and $P_D=1.588*(N^2*M*Q_D)^{0.5}*d_{298k}^2$, where N is the moles of gaseous detonation products per gram of explosive and M is the average molecular weight of gaseous products. Aspect ratio (AR) and sphericity (SR) were estimated by predicting the morphologies of the cocrystals in a vacuum using an attachment energy model. SR was determined as $A_s/A_{ob}$, where $A_{ob}$ and $A_s$ are the surface areas of the object of interest and a sphere with the same volume as the object, respectively. OB and crystal morphologies can be indicators for safety, where a more negative OB and a crystal shape closer to a sphere correspond to higher safety. AR and SP values closer to 1 can suggest a crystal shape closer to a sphere, and can indicate better safety.

TABLE 1

Cocrystals and their estimated properties. All data are at room temperature unless otherwise specified.

| No. | Components in unit cells | $d_{To}$ (g cm$^{-3}$) | $d_{298K}$ (g cm$^{-3}$) | $d_{mix}$ (g cm$^{-3}$) | $d_{298K, cef}$ (g cm$^{-3}$) | $\Delta E_{la}$ (kcal mol$^{-1}$) |
|---|---|---|---|---|---|---|
| ε-CL-20 | 4ε-CL-20 | 2.044 | 2.044 | | | −47.23 |
| β-CL-20 | 4β-CL-20 | 1.985 | 1.985 | | | −44.19 |
| γ-CL-20 | 4γ-CL-20 | 1.916 | 1.916 | | | −42.45 |
| 1 | 8α-CL-20/8H$_2$O | 1.981 | 1.981 | 1.963 | 1.000 (l) | −60.20 |
| 2 | 2γ-CL-20/4DMF | 1.725$^d$ | 1.675 | 1.651 | 1.047 (l) | −78.87 |
| 3 | 8α-CL-20/4CO$_2$ | 2.031$^g$ | 1.987 | 2.014 | 1.560 (s)$^h$ | −50.37 |
| 4 | 4β-CL-20/2β-HMX | 1.945 | 1.945 | 2.006 | 1.903 | −64.29 |
| 5 | 8β-CL-20/8TNT | 1.910$^e$ | 1.853 | 1.892 | 1.655 | −79.64 |
| 6 | 16β-CL-20/16BL | 1.858$^d$ | 1.804 | 1.904 | 1.413 (l) | −59.41 |
| 7 | 4β-CL-20/4BTF | 1.918 | 1.918 | 1.989 | 1.901 | −62.18 |
| 8 | 2γ-CL-20/7DO | 1.606$^d$ | 1.560 | 1.457 | 1.034 (l) | −94.19 |
| 9 | 4β-CL-20/12HMPA | 1.436$^d$ | 1.395 | 1.321 | 1.025 (l) | −106.8 |
| β-HMX | β-HMX | 1.903 | 1.903 | | | −34.68 |
| α-HMX | α-HMX | 1.840 | 1.840 | | | −39.05 |
| 10 | 4α-HMX/4PDA | 1.651$^e$ | 1.599 | 1.552 | 1.031 | −56.14 |
| 11 | 4β-HMX/4PDCA | 1.630$^e$ | 1.579 | 1.664 | 1.397 | −62.68 |
| 12 | β-HMX/2PNox | 1.583$^e$ | 1.533 | 1.384 | 1.010 | −53.86 |
| 13 | 4α-HMX/4FA | 1.687$^e$ | 1.634 | 1.625 | 1.170 (l) | −55.50 |
| 14 | 2β-HMX/4DNDA | 1.640 | 1.640 | 1.593 | 1.389 (l) | −35.62 |
| 15 | 4γ-HMX/2H$_2$O | 1.780 | 1.780 | 1.757 | 1.000 (l) | −43.69 |
| 16 | 4α-HMX4T$_2$ | 1.764$^e$ | 1.709 | 1.690 | 1.367 | −51.28 |
| 17 | 6α-HMX/6Py | 1.658$^h$ | 1.603 | 1.646 | 1.120 | −55.37 |
| 18 | 4α-HMX/4DAT | 1.656$^e$ | 1.604 | 1.573 | 1.107 | −63.74 |
| TNT | TNT | 1.654 | 1.654 | | | −32.85 |
| 19 | 2TNT/2 1-BN | 1.737$^e$ | 1.661 | 1.571 | 1.489 (l) | −52.56 |
| 20 | 2TNT/2Nap | 1.495$^e$ | 1.430 | 1.423 | 1.140 | −52.10 |
| 21 | 2TNT/2 9-BN | 1.688$^e$ | 1.614 | 1.669 | 1.622 | −54.85 |
| 22 | 4TNT/4Ant | 1.515$^e$ | 1.449 | 1.449 | 1.250 | −55.78 |
| 23 | 4TNT/4Per | 1.531$^e$ | 1.464 | 1.486 | 1.361 | −67.29 |
| 24 | 2TNT/2TT | 1.707$^e$ | 1.632 | 1.630 | 1.604 | −54.67 |
| 25 | 8TNT/8DBZ | 1.545$^e$ | 1.477 | 1.517 | 1.376 | −52.13 |
| 26 | 4TNT/4α-ABA | 1.575$^e$ | 1.506 | 1.537 | 1.374 | −58.62 |
| 27 | 4TNT/8α-ABA | 1.510$^e$ | 1.444 | 1.489 | 1.374 | −84.24 |
| 28 | 2TNT/2AA | 1.594$^e$ | 1.524 | 1.553 | 1.409 | −63.20 |
| 29 | 4TNT/8AA | 1.544$^e$ | 1.476 | 1.511 | 1.409 | −89.11 |
| 30 | 4TNT/4DMB | 1.501$^e$ | 1.435 | 1.451 | 1.207 | −50.34 |
| 31 | 2TNT/2DMDBT | 1.496$^e$ | 1.430 | 1.462 | 1.300 | −52.77 |
| 32 | 4TNT/4PA | 1.564$^e$ | 1.496 | 1.499 | 1.353 | −63.66 |
| 33 | 2TNT/2T$_3$ | 1.677$^e$ | 1.604 | 1.698 | 1.367 | −45.72 |
| 34 | 4TNT/4PDA | 1.578$^e$ | 1.509 | 1.439 | 1.031 | −62.79 |
| 35 | 4TNT/4Phe | 1.487$^e$ | 1.422 | 1.425 | 1.210 | −56.93 |
| 36 | 4TNT/4TNB | 1.640 | 1.640 | 1.665 | 1.676 | −66.93 |
| BTF | BTF | 1.901 | 1.901 | | | −27.39 |
| 37 | 4BTF/4TNA | 1.892$^e$ | 1.834 | 1.846 | 1.773 | −56.20 |
| 38 | 4BTF/4MATNB | 1.804$^f$ | 1.751 | 1.804 | 1.643 | −57.80 |
| 39 | 2BTF/2TNAZ | 1.844 | 1.844 | 1.874 | 1.840 | −43.67 |
| 40 | 4BTF/4TNB | 1.806 | 1.806 | 1.791 | 1.676 | −57.95 |
| 41 | 4BTF/4TNT | 1.805$^f$ | 1.747 | 1.776 | 1.655 | −53.60 |

| No. | HOF(s) (kcal mol$^{-1}$) | $Q_D$ (kcal g$^{-1}$) | $V_D$ (km s$^{-1}$) | $P_D$ (GPa) | OB (%) | AR | SP |
|---|---|---|---|---|---|---|---|
| ε-CL-20 | 32.44 | 1.29 | 9.53 | 43.3 | −25 | 1.44 | 0.91 |
| β-CL-20 | 35.48 | 1.30 | 9.34 | 41.0 | −25 | 2.36 | 0.86 |
| γ-CL-20 | 37.22 | 1.31 | 9.12 | 38.2 | −25 | 1.92 | 0.89 |
| 1 | −35.06 | 1.22 | 9.24 | 40.0 | −23 | 2.68 | 0.83 |
| 2 | −79.24 | 1.03 | 7.58 | 24.4 | −143 | 2.33 | 0.85 |
| 3 | −13.29 | 1.24 | 9.19 | 39.7 | −23 | 2.51 | 0.85 |
| 4 | 32.37 | 1.26 | 9.23 | 39.5 | −31 | 3.66 | 0.76 |
| 5 | 14.20 | 1.00 | 8.54 | 32.9 | −75 | 1.98 | 0.89 |
| 6 | −70.41 | 0.93 | 8.15 | 29.5 | −86 | 1.69 | 0.89 |
| 7 | 179.4 | 1.26 | 9.08 | 38.0 | −50 | 1.56 | 0.89 |
| 8 | −310.9 | 0.97 | 6.71 | 18.2 | −200 | 2.08 | 0.83 |
| 9 | −320.44 | 1.21 | 6.32 | 15.0 | −470 | 2.64 | 0.82 |

TABLE 1-continued

Cocrystals and their estimated properties. All data are at room temperature unless otherwise specified.

| | | | | | | | | |
|---|---|---|---|---|---|---|---|---|
| β-HMX | −0.71, −22.8[i] | 1.14, 1.32[i] | 9.14 | 38.3 | −50 | 1.95 | 0.89 | |
| α-HMX | −5.08 | 1.12 | 8.89 | 35.6 | −50 | 2.78 | 0.82 | |
| 10 | −1.020 | 1.14 | 7.01 | 20.2 | −250 | 2.52 | 0.83 | |
| 11 | −100.8 | 1.04 | 7.10 | 20.6 | −190 | 3.46 | 0.78 | |
| 12 | 15.03 | 1.15 | 6.58 | 17.4 | −330 | 2.27 | 0.82 | |
| 13 | −48.10 | 1.06 | 7.15 | 21.4 | −231 | 2.26 | 0.86 | |
| 14 | −41.73 | 1.21 | 8.02 | 26.9 | −100 | 1.92 | 0.83 | |
| 15 | −58.83 | 1.01 | 8.48 | 31.7 | −47 | 3.18 | 0.83 | |
| 16 | 31.74 | 0.99 | 6.63 | 18.9 | −275 | 2.98 | 0.79 | |
| 17 | −73.44 | 1.05 | 7.26 | 21.8 | −161 | 1.74 | 0.87 | |
| 18 | −18.00 | 1.06 | 6.92 | 19.8 | −288 | 4.19 | 0.72 | |
| TNT | −18.67, −16.02[i] | 0.96, 1.04[i] | 7.18 | 21.7 | −175 | 3.70 | 0.75 | |
| 19 | 4.345 | 0.79 | 5.44 | 12.5 | −558 | 3.83 | 0.73 | |
| 20 | 4.165 | 0.99 | 5.06 | 9.81 | −575 | 1.68 | 0.88 | |
| 21 | 23.03 | 0.78 | 5.08 | 10.7 | −708 | 3.82 | 0.75 | |
| 22 | 21.34 | 0.91 | 4.60 | 8.17 | −725 | 2.72 | 0.81 | |
| 23 | 32.76 | 0.79 | 4.46 | 7.73 | −942 | 4.41 | 0.72 | |
| 24 | 27.09 | 0.76 | 4.73 | 9.33 | −542 | 1.47 | 0.98 | |
| 25 | 13.42 | 0.88 | 4.67 | 8.51 | −675 | 6.96 | 0.61 | |
| 26 | −113.0 | 0.79 | 5.68 | 12.8 | −325 | 4.27 | 0.73 | |
| 27 | −138.6 | 0.85 | 5.26 | 10.6 | −415 | 1.93 | 0.87 | |
| 28 | −119.4 | 0.77 | 5.69 | 12.9 | −325 | 4.26 | 0.72 | |
| 29 | −145.3 | 0.83 | 5.31 | 11.0 | −415 | 2.96 | 0.77 | |
| 30 | −98.27 | 0.98 | 5.53 | 11.7 | −369 | 3.49 | 0.78 | |
| 31 | −6.955 | 0.77 | 4.56 | 7.95 | −775 | 3.42 | 0.77 | |
| 32 | 1.812 | 0.82 | 4.79 | 9.05 | −683 | 2.46 | 0.83 | |
| 33 | 19.59 | 0.87 | 5.24 | 11.3 | −475 | 2.55 | 0.82 | |
| 34 | −25.39 | 0.92 | 5.60 | 12.4 | −442 | 2.25 | 0.79 | |
| 35 | 15.02 | 0.89 | 4.76 | 8.63 | −725 | 3.33 | 0.79 | |
| 36 | −28.64 | 0.94 | 7.25 | 22.0 | −150 | 7.42 | 0.60 | |
| BTF | 134.4, 143.7[i] | 1.16, 1.41[i] | 8.90 | 36.3 | −100 | 2.39 | 0.84 | |
| 37 | 112.2 | 1.02 | 8.25 | 30.6 | −117 | 1.83 | 0.85 | |
| 38 | 118.6 | 1.07 | 7.95 | 27.6 | −142 | 1.78 | 0.84 | |
| 39 | 140.9 | 1.27 | 8.91 | 35.8 | −67 | 2.31 | 0.84 | |
| 40 | 128.1 | 1.06 | 8.29 | 30.5 | −113 | 2.14 | 0.84 | |
| 41 | 122.5 | 1.08 | 7.97 | 27.7 | −138 | 2.27 | 0.80 | |

L represents liquid state. Subscript ccf indicates data for the pure cocrystal-formers (e.g., the secondary material).
[b]85K.
[c]95K.
[d]100K.
[e]135K.
[f]145K.
[g]150K.
[h]density of dry ice.

In Table 1, abbreviations for energetic materials are given herein, other abbreviations are AA=anthranilic acid, ABA=aminobenzoic acid, Ant=anthracene, BL=γ-butyrolkactone, BN=bromonaphthalene, DAT=3,4-diaminotoluene, DATB=1,3-diamino-2,4,6-trinitrobenzene, DBZ=dibenzothiophene, DMB=1,4-dimethoxybenzene, DMDBT=4,6-dimethyldibenzothiophene, DMF=N,N-dimethylformamide, DNDA=bis-2,4-dinitro-2,4-diazapentane, DO=1,4-dioxane, FA=4-fluoroaniline, HMPA=hexamethylphosphoramide, Nap=naphthalene, PA=phenothiazine, PDA=1,2-phenylenediamine, PDCA=1,4-piperazinedicarboxaldehyde, Per=perylene, Phe=phenanthrene, PNox=2-picoline-N-oxide, Py=2-pyrrolidone, $T_2$=thieno[3,2-b]thiophene, TT=tetrathiofulvene.

FIGS. 4a-d illustrates the power as indicated by the estimated $V_D$ and $P_D$ of 41 energetic cocrystals contrasted with their pure energetic components.

FIGS. 5a-d illustrates the heat of detonation ($Q_D$) of 41 energetic cocrystals contrasted with their pure energetic components.

FIGS. 6a-d illustrates the estimated OB of 41 energetic cocrystals contrasted with their pure energetic components.

Table 2 shows a summary of thermal stability and impact sensitivity characteristics of the energetic cocrystals. $T_1$ corresponds to the temperature where the material melts of decomposes, ccf indicates data for the pure cocrystal former, $H_{50}$ indicates the impact sensitivity of the material. All thermal data are of DSC at a ramp rate of 10° C./min unless otherwise specified. $T_1$ represents decomposition temperatures for CL-20, and samples 3, 4, and 7, and the melting point for others. [b]ramp rate of 3° C./min. The impact sensitivity was determined using a drop weight impact test. In this test, a small amount of the energetic material was placed on a striker plate, an approximately 2.5 kg anvil was dropped from several heights onto the sample, and any evidence of initiation is noted. The value of $H_{50}$ corresponds to the lowest height at which 50% of drops yield a response from the energetic material. Generally, the higher the $H_{50}$ value, the more insensitive the energetic material is.

| No. | Components | $T_1$ (° C.) | $T_1$, ccf (° C.) | $H_{50}$ (cm) | $H_{50}$, ccf (cm) |
|---|---|---|---|---|---|
| CL-20 | CL-20 | 244 | | 29 | |
| 1 | CL-20/H$_2$O | | | | |
| 2 | CL-20/DMF | | | | |
| 3 | CL-20/CO$_2$ | 184.4[b] | | | |
| 4 | CL-20/HMX | 240 | 279 | 55 | |
| 5 | CL-20/TNT | 136 | 81.0 | 99 | |
| 6 | CL-20/BL | | | | |
| 7 | CL-20/BTF | 235 | 289 | | |
| 8 | CL-20/DO | | | | |
| 9 | CL-20/HMPA | | | | |
| HMX | HMX | 279 | | 55 | |

-continued

| No. | Components | $T_1$ (°C.) | $T_1$, ccf (°C.) | $H_{50}$ (cm) | $H_{50}$, ccf (cm) |
|---|---|---|---|---|---|
| 10 | HMX/PDA | 170 | 102.1 | >145 | |
| 11 | HMX/PDCA | 151 | 129.1 | >145 | |
| 12 | HMX/PNox | 153 | 46-50 | >145 | |
| 13 | HMX/FA | 128 | −1.9 | >145 | |
| 14 | HMX/DNDA | | | | |
| 15 | HMX/H$_2$O | | | 27 | |
| 16 | HMX/T$_2$ | 179 | 56 | >145 | |
| 17 | HMX/Py | 163 | 12.2 | >145 | |
| 18 | HMX/DAT | 148 | 88.7 | >145 | |
| TNT | TNT | 81.0/81.9 | | | |
| 19 | TNT/1-BN | 73.3 | −1.0 | | |
| 20 | TNT/Nap | 95.9 | 81.5 | | |
| 21 | TNT/9-BN | 101.0 | 102.9 | | |
| 22 | TNT/Ant | 108.5 | 217.1 | | |
| 23 | TNT/Per | 151.5 | 276 | | |
| 24 | TNT/TT | 108.8 | 119.2 | | |
| 25 | TNT/DBZ | 118.8 | 99.0 | | |
| 26 | TNT/ABA | 117.6 | 188.1 | | |
| 27 | TNT/ABA | 175.2 | 188.1 | | |
| 28 | TNT/AA(1/1) | 151.7 | 99.0 | | |
| 29 | TNT/AA(1/2) | 139.3 | 99.0 | | |
| 30 | TNT/DMB | 45.2 | 56.6 | | |
| 31 | TNT/DMDBT | 116.3 | 154.6 | | |
| 32 | TNT/PA | 73.8 | 101.8 | | |
| 33 | TNT/T$_2$ | 83.7 | 56.0 | | |
| 34 | TNT/PDA | 73.8 | 101.8 | | |
| 35 | TNT/Phe | 100.2 | 99.7 | | |
| 36 | TNT/TNB | 62.3 | 122.9 | | |
| BTF | BTF | 197.4 | | | |
| 37 | BTF/TNA | 205.8 | 184.2 | <17.8 | 61.9 |
| 38 | BTF/MATNB | 171.3 | 109.0 | <17.8 | 46.4 |
| 39 | BTF/TNAZ | 164.5 | 100.7 | <12.6 | 28 |
| 40 | BTF/TNB | 189 | 122.9 | 42.2 | 79 |
| 41 | BTF/TNT | 132.6 | 80.5 | 36.2 | 59 |

FIGS. 7a-d illustrates the estimated AR and SP of 41 energetic cocrystals contrasted with their pure energetic components.

Table 3 illustrates a comparison of estimated properties of energetic cocrystals including multiple energetic materials versus their pure components.

TABLE 3

Comparison of estimated properties of energetic cocrystals and their pure components, where A and B represent the former and latter components in the cocrystal, and C represents the cocrystal.

| Components in unit cells (molar ratio) | $d_{298K}$, g cm$^{-3}$ | | | $V_D$, km s$^{-1}$ | | | $P_D$, GPa | | | $Q_D$, kcal g$^{-1}$ | | | OB, % | | |
|---|---|---|---|---|---|---|---|---|---|---|---|---|---|---|---|
| | A | C | B | A | C | B | A | C | B | A | C | B | A | C | B |
| CL-20/TNT (1/1) | 2.044 | 1.853 | 1.654 | 9.53 | 8.54 | 7.18 | 43.3 | 32.9 | 21.7 | 1.29 | 1.00 | 0.96 | −25 | −75 | −175 |
| CL-20/HMX (2/1) | 2.044 | 1.945 | 1.903 | 9.53 | 9.23 | 9.14 | 43.3 | 39.5 | 38.3 | 1.29 | 1.26 | 1.14 | −25 | −31 | −50 |
| CL-20/BTF (1/1) | 2.044 | 1.918 | 1.901 | 9.53 | 9.08 | 8.90 | 43.3 | 38.0 | 36.3 | 1.29 | 1.26 | 1.16 | −275 | −150 | −125 |
| BTF/TNA (1/1) | 1.901 | 1.834 | 1.773 | 8.90 | 8.25 | 7.62 | 36.3 | 30.6 | 25.5 | 1.16 | 1.02 | 0.86 | −25 | −50 | −100 |
| BTF/MATNB (1/1) | 1.901 | 1.751 | 1.643 | 8.90 | 7.95 | 7.13 | 36.3 | 27.6 | 21.3 | 1.16 | 1.07 | 0.97 | −100 | −117 | −133 |
| BTF/TNAZ (1/1) | 1.901 | 1.844 | 1.840 | 8.90 | 8.91 | 9.07 | 36.3 | 35.8 | 37.1 | 1.16 | 1.27 | 1.35 | −100 | −142 | −183 |
| BTF/TNB (1/1) | 1.901 | 1.806 | 1.676 | 8.90 | 8.29 | 7.52 | 36.3 | 30.5 | 24.0 | 1.16 | 1.06 | 0.94 | −100 | −67 | −33 |
| BTF/TNT (1/1) | 1.901 | 1.747 | 1.654 | 8.90 | 7.97 | 7.18 | 36.3 | 27.7 | 21.7 | 1.16 | 1.08 | 0.96 | −100 | −113 | −125 |
| TNT/TNB (1/1) | 1.654 | 1.640 | 1.676 | 7.18 | 7.25 | 7.52 | 21.7 | 22.0 | 24.0 | 0.96 | 0.94 | 0.94 | −100 | −138 | −175 |

Table 4 and 5 illustrate predicted properties of energetic cocrystals.

TABLE 4

| | $d_{298K}$ of energetic cocrystals, g/cm$^3$ | | | | |
|---|---|---|---|---|---|
| | TATB | DATB | FOX-7 | LLM-105 | NTO |
| HMX | 1.919 | 1.873 | 1.895 | 1.907 | 1.911 |
| CL-20 | 1.998 | 1.960 | 1.993 | 1.993 | 2.010 |
| HNB | 1.978 | 1.935 | 1.969 | 1.972 | 1.988 |
| RTF | 1.919 | 1.869 | 1.892 | 1.907 | 1.911 |

TABLE 5

| | OB of energetic cocrystals (%) | | | | |
|---|---|---|---|---|---|
| | TATB | DATB | FOX-7 | LLM-105 | NTO |
| HMX | −93 | −89 | −50 | −69 | −55 |
| CL-20 | −67 | −64 | −31 | −47 | −33 |
| HNB | −50 | −47 | −13 | −29 | −13 |
| BTF | −125 | −121 | −80 | −100 | −89 |

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments.

The present invention provides for the following exemplary embodiments, the numbering of which is not to be construed as designating levels of importance:

Embodiment 1 provides a method of treating a subterranean formation, the method comprising: obtaining or providing a composition comprising energetic cocrystals, each energetic cocrystal independently comprising an energetic compound; and a secondary material; and placing the composition in a subterranean formation.

Embodiment 2 provides the method of Embodiment 1, wherein placing the composition in the subterranean formation comprises placing the composition in at least one of a fracture, at least a part of an area surrounding a fracture, a flow pathway, an area surrounding a flow pathway, and an area desired to be fractured.

Embodiment 3 provides the method of Embodiment 2, wherein the method further comprises hydraulic fracturing to generate the fracture or flow pathway.

Embodiment 4 provides the method of any one of Embodiments 2-3, wherein the method further comprises performing a stimulation treatment before placing the composition in the fracture or flow pathway.

Embodiment 5 provides the method of Embodiment 4, wherein the stimulation treatment comprises at least one of perforating, acidization, injecting of cleaning fluids, propellant stimulation, and hydraulic fracturing to at least partially generate the fracture or flow pathway.

Embodiment 6 provides the method of Embodiment 5, wherein the hydraulic fracturing comprises at least one of a pre-pad stage, a pad stage, or a slurry stage.

Embodiment 7 provides the method of any one of Embodiments 1-6, wherein the method comprises a method of approximately measuring at least one dimension of a fracture or flow pathway in the subterranean formation.

Embodiment 8 provides the method of any one of Embodiments 1-7, wherein the obtaining or providing of the composition occurs above the surface.

Embodiment 9 provides the method of any one of Embodiments 1-8, wherein the obtaining or providing of the composition occurs downhole.

Embodiment 10 provides the method of any one of Embodiments 1-9, wherein the placing the composition in the subterranean formation comprises at least partially depositing the cocrystals in a fracture or flow pathway.

Embodiment 11 provides the method of any one of Embodiments 1-10, further comprising detonating at least some of the cocrystals downhole.

Embodiment 12 provides the method of Embodiment 11, wherein the cocrystals are sufficient to produce a compression wave downhole upon the detonating.

Embodiment 13 provides the method of any one of Embodiments 11-12, wherein the detonating occurs at least one of during and after placing the composition in at least one of a fracture, at least a part of an area surrounding a fracture, a flow pathway, an area surrounding a flow pathway, and an area desired to be fractured.

Embodiment 14 provides the method of any one of Embodiments 11-13, comprising triggering the detonating.

Embodiment 15 provides the method of Embodiment 14, wherein the triggering occurs at least one of during and after placing the composition in at least one of a fracture, at least a part of an area surrounding a fracture, a flow pathway, an area surrounding a flow pathway, and an area desired to be fractured.

Embodiment 16 provides the method of any one of Embodiments 14-15, wherein the triggering comprises exposing at least some of the cocrystals to at least one of a compression wave, a chemical activator, heat, pH change, pressure, friction, passage of time, and vibration.

Embodiment 17 provides the method of Embodiment 16, wherein the compression wave that triggers the detonation is produced by a detonator or primer.

Embodiment 18 provides the method of any one of Embodiments 14-17, wherein the triggering comprises exposing at least some of the cocrystals to closure of a fracture or flow pathway.

Embodiment 19 provides the method of any one of Embodiments 14-18, wherein the triggering occurs while at least some of the cocrystals are within a fracture or flow pathway.

Embodiment 20 provides the method of any one of Embodiments 1-19, further comprising placing a detonator or primer proximate to at least some of the cocrystals downhole.

Embodiment 21 provides the method of any one of Embodiments 11-20, wherein the detonating is sufficient to generate a compression wave downhole.

Embodiment 22 provides the method of Embodiment 21, wherein the detonating is sufficient to generate a compression wave at least partially within a fracture or flow pathway.

Embodiment 23 provides the method of Embodiment 22, comprising using the compression wave to measure at least one characteristic of the fracture or the flow pathway.

Embodiment 24 provides the method of any one of Embodiments 21-23, comprising using the compression wave to measure at least one characteristic of an area surrounding the composition placed in the subterranean formation.

Embodiment 25 provides the method of Embodiment 24 wherein the measured characteristic comprises at least one of length, height, width, volume, surface area, shape, degree of closure, and time of closure.

Embodiment 26 provides the method of any one of Embodiments 24-25, wherein using the compression wave to measure the characteristic comprises using a compression wave detector to approximately determine at least one dimension of an area surrounding the composition placed in the subterranean formation.

Embodiment 27 provides the method of Embodiment 26, wherein the compression wave detector comprises at least one of an accelerometer, a geophone, and a microseismic detector.

Embodiment 28 provides the method of any one of Embodiments 26-27, wherein the compression wave detector is located at least one of downhole or above the surface.

Embodiment 29 provides the method of any one of Embodiments 26-28, further comprising placing the compression wave detector at least one of downhole or above the surface.

Embodiment 30 provides the method of any one of Embodiments 26-29, further comprising placing the compression wave detector proximate the composition placed in the subterranean formation.

Embodiment 31 provides the method of any one of Embodiments 1-30, wherein the composition further comprises a carrier fluid.

Embodiment 32 provides the method of Embodiment 31, wherein the carrier fluid comprises at least one of an aqueous liquid and an organic liquid.

Embodiment 33 provides the method of any one of Embodiments 31-32, wherein the carrier fluid comprises at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, and dimethyl formamide.

Embodiment 34 provides the method of any one of Embodiments 31-33, wherein the carrier fluid is about 0.001 wt % to about 99.999 wt % of the composition.

Embodiment 35 provides the method of any one of Embodiments 31-34, wherein the carrier fluid is about 50 wt % to about 99 wt % of the composition.

Embodiment 36 provides the method of any one of Embodiments 1-35, wherein the composition comprising the cocrystals has a viscosity of about 0.01 cP to about 10,000 cP at standard temperature and pressure.

Embodiment 37 provides the method of any one of Embodiments 1-36, wherein the composition comprising the cocrystals has a viscosity of about 0.05 cP to about 1,500 cP.

Embodiment 38 provides the method of any one of Embodiments 1-37, wherein the composition further comprises a viscosifier.

Embodiment 39 provides the method of any one of Embodiments 1-38, wherein the composition further comprises a viscosifier comprising a gel or a crosslinked gel.

Embodiment 40 provides the method of Embodiment 39, wherein the viscosifier comprises a crosslinker.

Embodiment 41 provides the method of any one of Embodiments 39-40, wherein the gel or crosslinked gel comprises at least one of poly(acrylic acid), poly(acrylate), poly(vinyl acetate), poly(vinyl alcohol), poly(ethylene glycol), poly(vinyl pyrrolidone), polyacrylamide, poly (hydroxyethyl methacrylate), starch, tamarind, tragacanth, guar gum, gum ghatti, gum arabic, locust bean gum, acetan, alginate, chitosan, curdlan, a cyclosophoran, dextran, diutan, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 42 provides the method of any one of Embodiments 39-41, wherein the viscosifier is about 0.001 wt % to about 99.999 wt % of the composition.

Embodiment 43 provides the method of any one of Embodiments 39-42, wherein the viscosifier is about 0.001 wt % to about 50 wt % of the composition.

Embodiment 44 provides the method of any one of Embodiments 1-43, wherein the cocrystals are explosive.

Embodiment 45 provides the method of any one of Embodiments 1-44, wherein the cocrystal comprises a crystalline structure comprising a unit cell comprising both the energetic compound and the at least one secondary material.

Embodiment 46 provides the method of Embodiment 45, wherein the cocrystal has a crystal structure that is different from a crystal structure of a crystal of the energetic compound alone.

Embodiment 47 provides the method of any one of Embodiments 45-46, wherein the cocrystal has a crystal structure that is different from a crystal structure of a crystal of the secondary material alone.

Embodiment 48 provides the method of any one of Embodiments 45-47, wherein the cocrystal has at least one property that is different than a corresponding property of a crystal of the energetic compound alone.

Embodiment 49 provides the method of any one of Embodiments 45-48, wherein the cocrystal has at least one property that is different than a corresponding property of a crystal of the energetic compound alone, wherein the property is at least one of density, melting point, solubility, rate of dissolution, reactivity, mechanical properties, volatility, hygroscopicity, water resistance, impact sensitivity, aspect ratio, sphericity, heat sensitivity, friction sensitivity, electrical sensitivity, stability, velocity of detonation, oxygen balance, explosive power, brisance, and toxicity.

Embodiment 50 provides the method of any one of Embodiments 45-49, wherein the cocrystal has at least one property that is different than a corresponding property of a crystal of the secondary material alone.

Embodiment 51 provides the method of any one of Embodiments 45-50, wherein the cocrystal has at least one property that is different than a corresponding property of a crystal of the secondary material alone, wherein the property is at least one of density, melting point, solubility, rate of dissolution, reactivity, mechanical properties, volatility, hygroscopicity, water resistance, impact sensitivity, aspect ratio, sphericity, heat sensitivity, friction sensitivity, electrical sensitivity, stability, velocity of detonation, oxygen balance, explosive power, brisance, and toxicity.

Embodiment 52 provides the method of any one of Embodiments 1-51, wherein the cocrystals comprise a crystal structure wherein the energetic compound and the secondary material interact via at least one of ionic interaction, ionic bonding, Van der Waals force, London dispersion force, dipole-dipole interaction, hydrogen bonding, metallic bond, pi-interaction, and cation-pi interaction.

Embodiment 53 provides the method of any one of Embodiments 1-52, wherein the cocrystals comprise at least one of a hydrate, a solvate, and a clathrate.

Embodiment 54 provides the method of any one of Embodiments 1-53, wherein the cocrystals are substantially spherical.

Embodiment 55 provides the method of any one of Embodiments 1-54, wherein the cocrystals are irregular.

Embodiment 56 provides the method of any one of Embodiments 1-55, wherein the cocrystals are nanoparticles.

Embodiment 57 provides the method of any one of Embodiments 1-56, wherein the cocrystals have a particle size of about 0.1 nm to about 10 mm.

Embodiment 58 provides the method of any one of Embodiments 1-57, wherein the cocrystals have a particle size of about 1 nm to about 5 mm.

Embodiment 59 provides the method of any one of Embodiments 1-58, wherein the cocrystals are about 0.000,000,1 wt % to about 99.999,999,9 wt % of the composition.

Embodiment 60 provides the method of any one of Embodiments 1-59, wherein the cocrystals are about 0.001 wt % to about 50 wt % of the composition.

Embodiment 61 provides the method of any one of Embodiments 1-60, wherein the cocrystals are less sensitive to detonation than a crystal of the energetic compound alone.

Embodiment 62 provides the method of any one of Embodiments 1-61, wherein the cocrystals have an impact sensitivity $H_{50}$ of about 10 cm to about 1000 cm.

Embodiment 63 provides the method of any one of Embodiments 1-62, wherein the cocrystals have an impact sensitivity $H_{50}$ that is about 50 cm to about 1000 cm.

Embodiment 64 provides the method of any one of Embodiments 1-63, wherein the cocrystals have a density of about 1.4 g/cm$^3$ to about 3.0 g/cm$^3$.

Embodiment 65 provides the method of any one of Embodiments 1-64, wherein the cocrystals have a density of about 1.78 g/cm$^3$ to about 3.0 g/cm$^3$.

Embodiment 66 provides the method of any one of Embodiments 1-65, wherein the cocrystals have a velocity of detonation of about 4 km/s to about 20 km/s.

Embodiment 67 provides the method of any one of Embodiments 1-66, wherein the cocrystals have a velocity of detonation of about 8.5 km/s to about 20 km/s.

Embodiment 68 provides the method of any one of Embodiments 1-67, wherein the cocrystals have an oxygen balance (OB) of about −1000% to about −20%.

Embodiment 69 provides the method of any one of Embodiments 1-68, wherein the cocrystals have an oxygen balance (OB) of greater than or equal to about −100% to less than or equal to about −50%.

Embodiment 70 provides the method of any one of Embodiments 1-69, wherein the cocrystals are at least partially coated on a proppant.

Embodiment 71 provides the method of Embodiment 70, wherein the coating has a thickness of about 1 nm to about 5 mm Embodiment 72 provides the method of any one of Embodiments 70-71, wherein the coating is substantially uniform.

Embodiment 73 provides the method of any one of Embodiments 70-72, wherein the coating substantially covers the proppant.

Embodiment 74 provides the method of any one of Embodiments 1-73, wherein the cocrystals are at least partially encapsulated by a protective shell.

Embodiment 75 provides the method of Embodiment 74, wherein the protective shell at least partially protects the cocrystals from the surrounding environment.

Embodiment 76 provides the method of any one of Embodiments 74-75, comprising triggering a detonation of at least some of the cocrystals comprising breaking or chemically dissolving at least part of the protective shell.

Embodiment 77 provides the method of any one of Embodiments 1-76, wherein the energetic compound is explosive.

Embodiment 78 provides the method of any one of Embodiments 1-77, wherein the energetic compound is at least one of detonatable, explodable, implodable, ignitable, or combustable.

Embodiment 79 provides the method of any one of Embodiments 1-78, wherein the energetic compound is at least one of acetone peroxide, ammonium azide, ammonium chlorate, ammonium dinitramide, ammonium nitrate, ammonium permanganate, 1,1'-azobis-1,2,3-triazole, barium azide, benzotrifuroxan (BTF), tricyclo[3.1.0.0$^{2,6}$] hex-3-ene or benzvalene, 1,2,4-butanetriol trinitrate, chlorine azide, copper(I) acetylide, copper(II) azide, cyanuric triazide, diacetyl peroxide, 2,6-diamino-3,5-dinitropyrazine-1-oxide (LLM-105), 6-diazo-2,4-dinitrocyclohexa-2,4-dien-1-one or diazodinitrophenol, diazomethane, diethylene glycol dinitrate, 4-dimethylaminophenylpentazole, 4,4'-dinitro-3,3'-diazenofuroxan (DDF), 2,4-dinitrotoluene, [(2R,3R)-1,3,4-trinitrooxybutan-2-yl] nitrate or erythritol tetranitrate, ethyl azide, ethylene glycol dinitrate, fluorine perchlorate, 1,1-diamino-2,2-dinitroethene (FOX-7 or DADNE), N,N'-bis-(1H-tetrazol-5-yl)-hydrazine (HBT), heptanitrocubane (HNC), 3,4,8,9,12,13-hexaoxa-1,6-diazabicyclo[4.4.4]tetradecane or hexamethylene triperoxide diamine (HMTD), hexanitrobenzene (HNB), 2,4,6-trinitro-N-(2,4,6-trinitrophenyl)aniline or hexanitrodiphenylamine (HND), hexanitroethane, 2,4,6,8,10,12-hexanitro-2,4,6,8,10,12-hexaazaisowurtzitane (HNIW or CL-20), 1,3,5-trinitro-2-[2-(2,4,6-trinitrophenyl)ethenyl]benzene or hexanitrostilbene (HNS), 2,6-dioxo-1,3,4,5,7,8-hexanitrodecahydro-1H,5H-diimidazo[4,5-b:4',5'-e] (HHTDD), octahydro-1,3,5,7-tetranitro-1,3,5,7-tetrazocine (HMX), hydrazoic acid or hydrogen azide, lead 2,4,6-trinitrobenzene-1,3-diolate or lead styphnate, lead(II) azide, manganese heptoxide, (2R,3R,4R,5R)-Hexane-1,2,3,4,5,6-hexol-1,2,3,4,5,6-hexanitrate or mannitol hexanitrate, methyl azide, methyl nitrate, methylammonium nitrate, 1-methyl-2-nitro-benzene or mononitrotoluene, nitrocellulose, nitrogen trichloride, nitrogen triiodide, nitroglycerin, nitroguanidine, nitromethane, nitrostarch, 5-nitro-1,2,4-triazol-3-one (NTO), nitrourea, octaazacubane, octanitrocubane (ONC), [3-nitrooxy-2,2-bis(nitrooxymethyl)propyl] nitrate or pentaerythritol tetranitrate (PETN), pentazenium, pentazole, picric acid, picryl chloride, polycarbonyl, polyvinyl nitrate, potassium picrate, propylene glycol dinitrate, 1,3,5-trinitroperhydro-1,3,5-triazine (RDX), silicon tetraazide, silver acetylide, silver azide, silver nitride, sodium azide, 2,4,6-trinitrobenzene-1,3-diol or styphnic acid, 1,3-diamino-2,4,6-trinitrobenzene (DATB), 1,3,5-triamino-2,4,6-trinitrobenzene (TATB), tetraazidomethane, tetranitromethane, 1-(5-tetrazolyl)-3-guanyl tetrazene hydrate, N-methyl-N,2,4,6-tetranitroaniline or tetryl, 1,3,5-triazido-2,4,6-trinitrobenzene, 2,2'-(ethane-1,2-diylbis(oxy))bisethyl dinitrate] or triethylene glycol dinitrate, [2-methyl-3-nitrooxy-2-(nitrooxymethyl)propyl] nitrate or trimethylolethane trinitrate (TMETN or METN), 2,4,6-trinitroaniline, 2-methoxy-1,3,5-trinitrobenzene or trinitroanisole (TNA), 1,3,5-trinitrobenzene (TNB), 2,4,6-trinitrobenzenesulfonic acid, 1,3,3-trinitroazetidine (TNAZ), 1-methyl-amino-2,4,6-trinitrobenzene (MATNB), 2-methyl-1,3,5-trinitrobenzene or trinitrotoluene (TNT), 2,4,6-trinitro-1,3,5-triazine or trinitrotriazine, 2,4,6-tris(trinitromethyl)-1,3,5-triazine, urea nitrate, and 1,2,3,4,5-pentakis-nitrooxy-pentane or xylitol pentanitrate.

Embodiment 80 provides the method of any one of Embodiments 1-79, wherein the energetic compound is at least one of 2,4,6-trinitrotoluene (TNT), octahydro-1,3,5,7-tetranitro-1,3,5,7-tetrazocine (HMX), 2,4,6,8,10,12-hexanitro-2,4,6,8,10,12-hexaazaisowurtzitane (HNIW or CL-20), 1,3,5-trinitroperhydro-1,3,5-triazine (RDX), nitroglycerin, nitrocellulose, [3-nitrooxy-2,2-bis(nitrooxymethyl)propyl] nitrate or pentaerythritol tetranitrate (PETN), and benzotrifuroxan (BTF).

Embodiment 81 provides the method of any one of Embodiments 1-80, wherein the energetic compound and the secondary material have a molar ratio of about 1:0.01 to about 1:100 in the cocrystals.

Embodiment 82 provides the method of any one of Embodiments 1-81, wherein the energetic compound and the secondary material have a molar ratio of about 1:1 or about 1:2 in the cocrystals.

Embodiment 83 provides the method of any one of Embodiments 1-82, wherein the secondary material is different from the energetic compound.

Embodiment 84 provides the method of any one of Embodiments 1-83, wherein the secondary material is less energetic than the energetic compound.

Embodiment 85 provides the method of any one of Embodiments 1-84, wherein the secondary material is at least one of a substantially non-energetic material and a substantially inert material.

Embodiment 86 provides the method of any one of Embodiments 1-85, wherein the secondary material is an energetic material that is different than the energetic compound.

Embodiment 87 provides the method of any one of Embodiments 1-86, wherein the secondary material is at least one of a compound and an atom.

Embodiment 88 provides the method of any one of Embodiments 1-87, wherein the secondary material is at least one of acetone peroxide, ammonium azide, ammonium chlorate, ammonium dinitramide, ammonium nitrate, ammonium permanganate, 1,1'-azobis-1,2,3-triazole, barium azide, benzotrifuroxan (BTF), tricyclo[3.1.0.0$^{2,6}$] hex-3-ene or benzvalene, 1,2,4-butanetriol trinitrate, chlorine azide, copper(I) acetylide, copper(II) azide, cyanuric triazide, diacetyl peroxide, 2,6-diamino-3,5-dinitropyrazine- 1-oxide (LLM-105), 6-diazo-2,4-dinitrocyclohexa-2,4-dien-1-one or diazodinitrophenol, diazomethane, diethylene glycol dinitrate, 4-dimethylaminophenylpentazole, 4,4'-dinitro-3,3'-diazenofuroxan (DDF), 2,4-dinitrotoluene, [(2R,3R)-1,3,4-trinitrooxybutan-2-yl] nitrate or erythritol tetranitrate, ethyl azide, ethylene glycol dinitrate, fluorine perchlorate, 1,1-diamino-2,2-dinitroethene (FOX-7 or DADNE), N,N'-bis-(1H-tetrazol-5-yl)-hydrazine (HBT), heptanitrocubane (HNC), 3,4,8,9,12,13-hexaoxa-1,6-diazabicyclo[4.4.4]tetradecane or hexamethylene triperoxide diamine (HMTD), hexanitrobenzene (HNB), 2,4,6-trinitro-N-(2,4,6-trinitrophenyl)aniline or hexanitrodiphenylamine (HND), hexanitroethane, 2,4,6,8,10,12-hexanitro-2,4,6,8,10,12-hexaazaisowurtzitane (HNIW or CL-20), 1,3,5-trinitro-2-[2-(2,4,6-trinitrophenyl)ethenyl]benzene or hexanitrostilbene (HNS), 2,6-dioxo-1,3,4,5,7,8-hexanitrodecahydro-1H,5H-diimidazo[4,5-b:4',5'-e] (HHTDD), octahydro-1,3,5,7-tetranitro-1,3,5,7-tetrazocine (HMX), hydrazoic acid or hydrogen azide, lead 2,4,6-trinitrobenzene-1,3-diolate or lead styphnate, lead(II) azide, manganese heptoxide, (2R,3R,4R,5R)-Hexane-1,2,3,4,5,6-hexol-1,2,3,4,5,6-hexanitrate or mannitol hexanitrate, methyl azide, methyl nitrate, methylammonium nitrate, 1-methyl-2-nitro-benzene or mononitrotoluene, nitrocellulose, nitrogen trichloride, nitrogen triiodide, nitroglycerin, nitroguanidine, nitromethane, nitrostarch, 5-nitro-1,2,4-triazol-3-one (NTO), nitrourea, octaazacubane, octanitrocubane (ONC), [3-nitrooxy-2,2-bis(nitrooxymethyl)propyl] nitrate or pentaerythritol tetranitrate (PETN), pentazenium, pentazole, picric acid, picryl chloride, polycarbonyl, polyvinyl nitrate, potassium picrate, propylene glycol dinitrate, 1,3,5-trinitroperhydro-1,3,5-triazine (RDX), silicon tetraazide, silver acetylide, silver azide, silver nitride, sodium azide, 2,4,6-trinitrobenzene-1,3-diol or styphnic acid, 1,3-diamino-2,4,6-trinitrobenzene (DATB), 1,3,5-triamino-2,4,6-trinitrobenzene (TATB), tetraazidomethane, tetranitromethane, 1-(5-tetrazolyl)-3-guanyl tetrazene hydrate, N-methyl-N,2,4,6-tetranitroaniline or tetryl, 1,3,5-triazido-2,4,6-trinitrobenzene, 2,2'-(ethane-1,2-diylbis(oxy))bisethyl dinitrate] or triethylene glycol dinitrate, [2-methyl-3-nitrooxy-2-(nitrooxymethyl)propyl] nitrate or trimethylolethane trinitrate (TMETN or METN), 2,4,6-trinitroaniline, 2-methoxy-1,3,5-trinitrobenzene or trinitroanisole (TNA), 1,3,5-trinitrobenzene (TNB), 2,4,6-trinitrobenzenesulfonic acid, 1,3,3-trinitroazetidine (TNAZ), 1-methyl-amino-2,4,6-trinitrobenzene (MATNB), 2-methyl-1,3,5-trinitrobenzene or trinitrotoluene (TNT), 2,4,6-trinitro-1,3,5-triazine or trinitrotriazine, 2,4,6-tris(trinitromethyl)-1,3,5-triazine, urea nitrate, and 1,2,3,4,5-pentakis-nitrooxy-pentane or xylitol pentanitrate.

Embodiment 89 provides the method of any one of Embodiments 1-88, wherein the secondary material is at least one of 2,4,6-trinitrotoluene (TNT), octahydro-1,3,5,7-tetranitro-1,3,5,7-tetrazocine (HMX), 2,4,6,8,10,12-hexanitro-2,4,6,8,10,12-hexaazaisowurtzitane (HNIW or CL-20), 1,3,5-trinitroperhydro-1,3,5-triazine (RDX), nitroglycerin, nitrocellulose, [3-nitrooxy-2,2-bis(nitrooxymethyl)propyl] nitrate or pentaerythritol tetranitrate (PETN), benzotrifuroxan (BTF), N-methyl-2-pyrrolidone, 2,4-dinitro-2,4-diazapentane, 1,2-phenylenediamine, 2-bromoaniline, 3,4-diaminotoluene, 4-fluoroaniline, thieno[3,2-b]thiophene, dimethylformamide (DMF), 2-pyrrolidone, 2-picoline-N-oxide, 4-picoline-N-oxide, naphthalene, 1-bromonaphthalene, 9-bromonaphthalene, anthracene, 9-bromoanthracene, phenanthrene, perylene, tetrathiafulvalene, phenothiazine, dibenzothiophene, 4,6-dimethyldibenzothiophene, 1,2-phenylenediamine, 1,4-dimethoxybenzene, 4-aminobenzoic acid, 1,4-piperazinedicarboxaldehyde, anthranilic acid, Pyrene, caprolactam, $H_2O$, $CO_2$, dimethylformamide (DMF), 1,4-dioxane, γ-butyrolactone, and hexamethylphosphoramide.

Embodiment 90 provides the method of any one of Embodiments 1-89, wherein at least one of the energetic compound is octahydro-1,3,5,7-tetranitro-1,3,5,7-tetrazocine (HMX) and the secondary material is N-methyl-2-pyrrolidone, the energetic compound is octahydro-1,3,5,7-tetranitro-1,3,5,7-tetrazocine (HMX) and the secondary material is 2,4-dinitro-2,4-diazapentane in a mole ratio of about 1:2, the energetic compound is octahydro-1,3,5,7-tetranitro-1,3,5,7-tetrazocine (HMX) and the secondary material is 1,2-phenylenediamine in a mole ratio of about 1:1, the energetic compound is octahydro-1,3,5,7-tetranitro-1,3,5,7-tetrazocine (HMX) and the secondary material is 2-bromoaniline in a mole ratio of about 1:1, the energetic compound is octahydro-1,3,5,7-tetranitro-1,3,5,7-tetrazocine (HMX) and the secondary material is 3,4-diaminotoluene in a mole ratio of about 1:1, the energetic compound is octahydro-1,3,5,7-tetranitro-1,3,5,7-tetrazocine (HMX) and the secondary material is 4-fluoroaniline in a mole ratio of about 1:1, the energetic compound is octahydro-1,3,5,7-tetranitro-1,3,5,7-tetrazocine (HMX) and the secondary material is thieno[3,2-b]thiophene in a mole ratio of about 1:1, the energetic compound is octahydro-1,3,5,7-tetranitro-1,3,5,7-tetrazocine (HMX) and the secondary material is dimethylformamide (DMF), the energetic compound is octahydro-1,3,5,7-tetranitro-1,3,5,7-tetrazocine (HMX) and the secondary material is 2-pyrrolidone in a mole ratio of about 1:1, the energetic compound is octahydro-1,3,5,7-tetranitro-1,3,5,7-tetrazocine (HMX) and the secondary material is 4-picolene-N-oxide in a mole ratio of about 1:1, the energetic compound is octahydro-1,3,5,7-tetranitro-1,3,5,7-tetrazocine (HMX) and the secondary material is 2-picoline-N-oxide in a mole ratio of about 1:2, the energetic compound is octahydro-1,3,5,7-tetranitro-1,3,5,7-tetrazocine (HMX) and the secondary material is 1,4-piperazinedicarboxaldehyde in a mole ratio of about 1:1, the energetic compound is octahydro-1,3,5,7-tetranitro-1,3,5,7-tetrazocine (HMX) and the secondary material is 2,4,6,8,10,12-hexanitro-2,4,6,8,10,12-hexaazaisowurtzitane (CL-20) in a mole ratio of about 1:2, the energetic compound is octahydro-1,3,5,7-tetranitro-1,3,5,7-tetrazocine (HMX) and the secondary material is 5-nitro-1,2,4-triazol-3-one (NTO), the energetic compound is octahydro-1,3,5,7-tetranitro-1,3,5,7-tetrazocine (HMX) and the secondary material is $H_2O$ in a mole ratio of about 2:1, the energetic compound is 2,4,6-trinitrotoluene (TNT) and the secondary material is 2,4,6,8,10,12-hexanitro-2,4,6,8,10,12-hexaazaisowurtzitane (CL-20) in a mole ratio of about 1:1, the energetic compound is 2,4,6-trinitrotoluene (TNT) and the secondary material is 1,3,5-trinitrobenzene (TNB) in a mole ratio of about 1:1, the energetic compound is 2,4,6-trinitrotoluene (TNT) and the secondary material is naphthalene in a mole ratio of about 1:1, the energetic compound is 2,4,6-trinitrotoluene (TNT) and the secondary material is 1-bromonaphthalene in a mole ratio of about 1:1, the energetic compound is 2,4,6-trinitrotoluene (TNT) and the secondary material is 9-bromonaphthalene in a mole ratio of about 1:1, the energetic compound is 2,4,6-trinitrotoluene (TNT) and the secondary material is anthracene in a mole ratio of about 1:1, the energetic compound is 2,4,6-trinitrotoluene (TNT) and the secondary material is 9-bromoanthracene in a mole ratio of about 1:1, the energetic compound is 2,4,6-trinitrotoluene (TNT) and the secondary material is phenanthrene in a mole ratio of about 1:1, the energetic compound is 2,4,6-trinitrotoluene (TNT) and the secondary material is perylene in a mole ratio of about 1:1, the energetic compound is 2,4,6-trinitrotoluene (TNT) and the secondary material is tetrathiafulvalene in a mole ratio of about 1:1, the energetic compound is 2,4,6-trinitrotoluene (TNT) and the secondary material is thieno[3,2-b]thiophene in a mole ratio of about 1:1, the energetic compound is 2,4,6-trinitrotoluene (TNT) and the secondary material is phenothiazine in a mole ratio of about 1:1, the energetic compound is 2,4,6-trinitrotoluene (TNT) and the secondary material is dibenzothiophene in a mole ratio of about 1:1, the energetic compound is 2,4,6-trinitrotoluene (TNT) and the secondary material is 4,6-dimethyldibenzothiophene in a mole ratio of about 1:1, the energetic compound is 2,4,6-trinitrotoluene (TNT) and the secondary material is 1,2-phenylenediamine in a mole ratio of about 1:1, the energetic compound is 2,4,6-trinitrotoluene (TNT) and the secondary material is 1,4-dimethoxybenzene in a mole ratio of about 1:1, the energetic compound is 2,4,6-trinitrotoluene (TNT) and the secondary material is 4-aminobenzoic acid in a mole ratio of about 1:1, the energetic compound is 2,4,6-trinitrotoluene (TNT) and the secondary material is 4-aminobenzoic acid in a mole ratio of about 1:2, the energetic compound is 2,4,6-trinitrotoluene (TNT) and the secondary material is anthranilic acid in a mole ratio of about 1:1, the energetic compound is 2,4,6-trinitrotoluene (TNT) and the secondary material is anthranilic acid in a mole ratio of about 1:2, the energetic compound is 2,4,6-trinitrotoluene (TNT) and the secondary material is pyrene in a mole ratio of about 1:1, the energetic compound is 2,4,6,8,10,12-hexanitro-2,4,6,8,10,12-hexaazaisowurtzitane (CL-20) and the secondary material is caprolactam, the energetic compound is 2,4,6,8,10,12-hexanitro-2,4,6,8,10,12-hexaazaisowurtzitane (CL-20) and the secondary material is $H_2O$ in a mole ratio of about 1:1, the energetic compound is 2,4,6,8,10,12-hexanitro-2,4,6,8,10,12-hexaazaisowurtzitane (CL-20) and the secondary material is dimethylformamide (DMF) in a mole ratio of about 1:2, the energetic compound is 2,4,6,8,10,12-hexanitro-2,4,6,8,10,12-hexaazaisowurtzitane (CL-20) and the secondary material is $CO_2$ in a mole ratio of about 2:1, the energetic compound is 2,4,6,8,10,12-hexanitro-2,4,6,8,10,12-hexaazaisowurtzitane (CL-20) and the secondary material is γ-butyrolactone in a mole ratio of about 1:1, the energetic compound is 2,4,6,8,10,12-hexanitro-2,4,6,8,10,12-hexaazaisowurtzitane (CL-20) and and the secondary material is benzotrifuroxan (BTF) in a mole ratio of about 1:1, the energetic compound is 2,4,6,8,10,12-hexanitro-2,4,6,8,10,12-hexaazaisowurtzitane (CL-20) and the secondary material is 1,4-dioxane in a mole ratio of about 2:7, the energetic compound is 2,4,6,8,10,12-hexanitro-2,4,6,8,10,12-hexaazaisowurtzitane (CL-20) and the secondary material is hexamethylphosphoramide in a mole ratio of about 1:4, the energetic compound is benzotrifuroxan (BTF) and the secondary material is 1,3,5-trinitrobenzene (TNB) in a mole ratio of about 1:1, the energetic compound is benzotrifuroxan (BTF) and the secondary material is 2-methoxy-1,3,5-trinitrobenzene or trinitroanisole (TNA) in a mole ratio of about 1:1, the energetic compound is benzotrifuroxan (BTF) and the secondary material is 2,4,6-trinitrotoluene (TNT) in a mole ratio of about 1:1, the energetic compound is benzotrifuroxan (BTF) and the secondary material is 1,3,3-trinitroazetidine (TNAZ) in a mole ratio of about 1:1, and the energetic compound is benzotrifuroxan (BTF) and the secondary material is 1-methylamino-2,4,6-trinitrobenzene (MATNB) in a mole ratio of about 1:1.

Embodiment 91 provides the method of any one of Embodiments 1-90, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, or a combination thereof, to form a mixture.

Embodiment 92 provides the method of Embodiment 91, wherein the placing of the composition in the subterranean formation comprises placing the mixture in the subterranean formation.

Embodiment 93 provides the method of any one of Embodiments 1-92, wherein at least one of prior to, during, and after the placing of the composition in the subterranean formation, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, or a combination thereof.

Embodiment 94 provides the method of any one of Embodiments 1-93, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 95 provides the method of any one of Embodiments 1-94, wherein the placing of the composition in the subterranean formation comprises fracturing at least part of the subterranean formation to form at least one subterranean fracture.

Embodiment 96 provides the method of any one of Embodiments 1-95, wherein the composition further comprises a proppant, a resin-coated proppant, an encapsulated resin, or a combination thereof.

Embodiment 97 provides a method of treating a subterranean formation, the method comprising: obtaining or providing a composition comprising energetic cocrystals, each energetic cocrystal independently comprising an energetic compound; and a secondary material; placing the composition in a subterranean formation comprising at least one of a fracture, flow pathway, area surrounding a fracture, and an area surrounding a flow pathway; detonating at least some of the energetic cocrystals to generate a compression wave; and using the compression wave to determine at least one characteristic of the fracture, flow pathway, area surrounding the fracture, or area surrounding the flow pathway.

Embodiment 98 provides an apparatus comprising a mixing tank configured to blend energetic cocrystals with a downhole fluid to form a composition, wherein each energetic cocrystal independently comprises an energetic compound and a secondary material; and a pump configured to place the composition in a subterranean formation.

Embodiment 99 provides an apparatus comprising an activator configured to trigger detonation of energetic cocrystals placed in a subterranean formation such that compression waves are generated in the subterranean formation, wherein each energetic cocrystal independently comprises an energetic compound and a secondary material; and a detector configured to detect the compression waves and thereby measure at least one dimension of an area surrounding the composition placed in the subterranean formation.

Embodiment 100 provides a system comprising: a composition comprising energetic cocrystals, each energetic cocrystal independently comprising an energetic compound; and a secondary material; and a subterranean formation comprising the composition therein.

Embodiment 101 provides a composition for treatment of a subterranean formation, the composition comprising: energetic cocrystals, each energetic cocrystal independently comprising an energetic compound; and a secondary material.

Embodiment 102 provides the composition of Embodiment 101, wherein the composition further comprises a downhole fluid.

Embodiment 103 provides the composition of any one of Embodiments 101-102, wherein the composition is a composition for microseismic imaging of a downhole fracture or flow pathway.

Embodiment 104 provides a method of preparing a composition for treatment of a subterranean formation, the method comprising: forming a composition comprising energetic cocrystals, each energetic cocrystal independently comprising an energetic compound; and a secondary material.

Embodiment 105 provides the apparatus or method of any one or any combination of Embodiments 1-104 optionally configured such that all elements or options recited are available to use or select from.

What is claimed is:

1. A method of treating a subterranean formation, the method comprising:
    placing in the subterranean formation a composition comprising energetic cocrystals, each energetic cocrystal independently comprising:
        an energetic compound; and
        a secondary material;
        wherein each energetic cocrystal has a particle size of about 0.01 mm or less;
    detonating the energetic cocrystals, wherein detonating the energetic cocrystals produces a compression wave;
    measuring the compression wave; and
    determining at least one characteristic of a fracture, flow path, area surrounding the fracture, area surrounding the flow path, or any combination thereof.

2. The method of claim 1, wherein placing the composition in the subterranean formation comprises placing the composition in at least one of a fracture, at least a part of an area surrounding a fracture, a flow pathway, an area surrounding a flow pathway, and an area desired to be fractured.

3. The method of claim 2, wherein the method further comprises hydraulic fracturing to generate the fracture or flow pathway.

4. The method of claim 1, wherein the method comprises a method of approximately measuring at least one dimension of a fracture or flow pathway in the subterranean formation.

5. The method of claim 1, further comprising detonating at least some of the cocrystals downhole.

6. The method of claim 5, comprising triggering the detonating.

7. The method of claim 6, wherein the triggering comprises exposing at least some of the cocrystals to at least one of a compression wave, a chemical activator, heat, pH change, pressure, friction, passage of time, and vibration.

8. The method of claim 5, wherein the detonating is sufficient to generate a compression wave downhole at least partially within a fracture or flow pathway, wherein the method further comprises using the compression wave to measure at least one characteristic of the fracture or the flow pathway.

9. The method of claim 8 wherein the measured characteristic comprises at least one of length, height, width, volume, surface area, shape, degree of closure, and time of closure.

10. The method of claim 8, wherein using the compression wave to measure the characteristic comprises using a compression wave detector to approximately determine at least one dimension of an area surrounding the composition placed in the subterranean formation.

11. The method of claim 10 wherein the compression wave detector is located at least one of downhole or above the surface.

12. The method of claim 1, wherein the composition further comprises a carrier fluid.

13. The method of claim 1, wherein the composition further comprises a viscosifier.

14. The method of claim 1, wherein the cocrystal comprises a crystalline structure comprising a unit cell comprising both the energetic compound and the at least one secondary material.

15. The method of claim 1, wherein the cocrystals are at least partially coated on a proppant.

16. The method of claim 1, wherein the energetic compound is at least one of acetone peroxide, ammonium azide, ammonium chlorate, ammonium dinitramide, ammonium nitrate, ammonium permanganate, 1,1'-azobis-1,2,3-triazole, barium azide, benzotrifuroxan (BTF), tricyclo[3.1.0.02,6]hex-3-ene or benzvalene, 1,2,4-butanetriol trinitrate, chlorine azide, copper(I) acetylide, copper(II) azide, cyanuric triazide, diacetyl peroxide, 2,6-diamino-3,5-dinitropyrazine-1-oxide (LLM-105), 6-diazo-2,4-dinitrocyclohexa-2,4-dien-1-one or diazodinitrophenol, diazomethane, diethylene glycol dinitrate, 4-dimethylaminophenylpentazole, 4,4'-dinitro-3,3'-diazenofuroxan (DDF), 2,4-dinitrotoluene, [(2R,3R)-1,3,4-trinitrooxybutan-2-yl] nitrate or erythritol tetranitrate, ethyl azide, ethylene glycol dinitrate, fluorine perchlorate, 1,1-diamino-2,2-dinitroethene (FOX-7 or DADNE), N,N'-bis-(1H-tetrazol-5-yl)-hydrazine (HMT), heptanitrocubane (HNC), 3,4,8,9,12,13-hexaoxa-1,6-diazabicyclo[4.4.4]tetradecane or hexamethylene triperoxide diamine (HMTD), hexanitrobenzene (HNB), 2,4,6-trinitro-N-(2,4,6-trinitrophenyl)aniline or hexanitrodiphenylamine (HND), hexanitroethane, 2,4,6,8,10,12-hexanitro-2,4,6,8,10,12-hexaazaisowurtzitane (HNIW or CL-20), 1,3,5-trinitro-2-[2-(2,4,6-trinitrophenyl)ethenyl]benzene or hexanitrostilbene (HNS), 2,6-dioxo-1,3,4,5,7,8-hexanitrodecahydro-1H,5H-diimidazo[4,5-b:4',5'-e] (HHTDD), octahydro-1,3,5,7-tetranitro-1,3,5,7-tetrazocine (HMX), hydrazoic acid or hydrogen azide, lead 2,4,6-trinitrobenzene-1,3-diolate or lead styphnate, lead(II) azide, manganese heptoxide, (2R,3R,4R,5R)-Hexane-1,2,3,4,5,6-hexol-1,2,3,4,5,6-hexanitrate or mannitol hexanitrate, methyl azide, methyl nitrate, methylammonium nitrate; 1-methyl-2-nitro-benzene or mononitrotoluene, nitrocellulose, nitrogen trichloride, nitrogen triiodide, nitroglycerin, nitroguanidine, nitromethane, nitrostarch, 5-nitro-1,2,4-triazol-3-one (NTO), nitrourea, octaazacubane, octanitrocubane (ONC), [3-nitrooxy-2,2-bis (nitrooxymethyl)propyl]nitrate or pentaerythritol tetranitrate (PETN), pentazenium, pentazole, picric acid, picryl chloride, polycarbonyl, polyvinyl nitrate, potassium picrate, propylene glycol dinitrate, 1,3,5-trinitroperhydro-1,3,5-triazine (RDX), silicon tetraazide, silver acetylide, silver azide, silver nitride, sodium azide, 2,4,6-trinitrobenzene-1,3-diol or styphnic acid, 1,3-diamino-2,4,6-trinitrobenzene (DATB), 1,3,5-triamino-2,4,6-trinitrobenzene (TATB), tetraazidomethane, tetranitromethane, 1-(5-tetrazolyl)-3-guanyl tetrazene hydrate, N-methyl-N,2,4,6-tetranitroaniline or tetryl, 1,3,5-triazido-2,4,6-trinitrobenzene, 2,2'-(ethane-1,2-diylbis(oxy))bisethyl dinitrate] or tri ethylene glycol dinitrate, [2-methyl-3-nitrooxy-2-(nitrooxymethyl)propyl] nitrate or trimethylolethane trinitrate (TMETN or METN), 2,4,6-trinitroaniline, 2-methoxy-1,3,5-trinitrobenzene or trinitroanisole (TNA), 1,3,5-trinitrobenzene (TNB), 2,4,6-trinitrobenzenesulfonic acid, 1,3,3-trinitroazetidine (TNAZ), 1-methyl-amino-2,4,6-trinitrobenzene (MATNB), 2-methyl-1,3,5-trinitrobenzene or trinitrotoluene (TNT), 2,4,6-trinitro-1,3,5-triazine or trinitrotriazine, 2,4,6-tris(trinitromethyl)-1,3,5-triazine, urea nitrate, and 1,2,3,4,5-pentakis-nitrooxy-pentane or xylitol pentanitrate.

17. The method of claim 1, wherein the secondary material is a substantially nonenergetic material or a substantially inert material, or an energetic material that is different than the energetic compound.

18. The method of claim 1, wherein the secondary material is at least one of acetone peroxide, ammonium azide, ammonium chlorate, ammonium dinitramide, ammonium nitrate, ammonium permanganate, 1,1'-azobis-1,2,3-triazole, barium azide, benzotrifuroxan (BTF), tricyclo[3.1.0.02,6]hex-3-ene or benzvalene, 1,2,4-butanetriol trinitrate, chlorine azide, copper(I) acetylide, copper(II) azide, cyanuric triazide, diacetyl peroxide, 2,6-diamino-3,5-dinitropyrazine-1-oxide (LLM-105), 6-diazo-2,4-dinitrocyclohexa-2,4-dien-1-one or diazodinitrophenol, diazomethane, diethylene glycol dinitrate, 4-dimethylaminophenylpentazole, 4,4'-dinitro-3,3'-diazenofuroxan (DDF), 2,4-dinitrotoluene, [(2R,3R)-1,3,4-trinitrooxybutan-2-yl] nitrate or erythritol tetranitrate, ethyl azide, ethylene glycol dinitrate, fluorine perchlorate, 1,1-diamino-2,2-dinitroethene (FOX-7 or DADNE), N,N'-bis-(1H-tetrazol-5-yl)-hydrazine (HBT), heptanitrocubane (HNC), 3,4,8,9,12,13-hexaoxa-1,6-diazabicyclo[4.4.4]tetradecane or hexamethylene triperoxide diamine (HMTD), hexanitrobenzene (HNB), 2,4,6-trinitro-N-(2,4,6-trinitrophenyl)aniline or hexanitrodiphenylamine (HND), hexanitroethane, 2,4,6,8,10,12-hexanitro-2,4,6,8,10,12-hexaazaisowurtzitane (HNIW or CL-20), 1,3,5-trinitro-2-[2-(2,4,6-trinitrophenyl)ethenyl] benzene or hexanitrostilbene (HNS), 2,6-dioxo-1,3,4,5,7,8-hexanitrodecahydro-1H,5H-diimidazo[4,5-b:4',5'-e] (HHTDD), octahydro-1,3,5,7-tetranitro-1,3,5,7-tetrazocine (HMX), hydrazoic acid or hydrogen azide, lead 2,4,6-trinitrobenzene-1,3-diolate or lead styphnate, lead(II) azide, manganese heptoxide, (2R,3R,4R,5R)-Hexane-1,2,3,4,5,6-hexol-1,2,3,4,5,6-hexanitrate or mannitol hexanitrate, methyl azide, methyl nitrate, methyl ammonium nitrate, 1-methyl-2-nitro-benzene or mononitrotoluene, nitrocellulose, nitrogen trichloride, nitrogen triiodide, nitroglycerin, nitroguanidine, nitromethane, nitrostarch, 5-nitro-1,2,4-triazol-3-one (NTO), nitrourea, octaazacubane, octanitrocubane (ONC), [3-nitrooxy-2,2-bis(nitrooxymethyl)propyl] nitrate or pentaerythritol tetranitrate (PETN), pentazenium, pentazole, picric acid, picryl chloride, polycarbonyl, polyvinyl nitrate, potassium picrate, propylene glycol dinitrate, 1,3,5-trinitroperhydro-1,3,5-triazine (RDX), silicon tetraazide, silver acetylide, silver azide, silver nitride, sodium azide, 4,6-trinitrobenzene-1,3-diol or styphnic acid, 1,3-diamino-2,4,6-trinitrobenzene (DATB), 1,3,5-triamino-2,4,6-trinitrobenzene (TATB), tetraazidomethane, tetranitromethane, 1-(5-tetrazolyl)-3-guanyl tetrazene hydrate, N-methyl-N,2,4,6-tetranitroaniline or tetryl, 1,3,5-triazido-2,4,6-trinitrobenzene, 2,2'-(ethane-1,2-diylbis(oxy))bisethyl dinitrate] or triethylene glycol dinitrate, [2-methyl-3-nitrooxy-2-(nitrooxymethyl)propyl] nitrate or trimethylolethane trinitrate (TMETN or METN), 2,4,6-trinitroaniline, 2-methoxy-1,3,5-trinitrobenzene or trinitroanisole (TNA), 1,3,5-trinitrobenzene (TNB), 2,4,6-trinitrobenzenesulfonic acid, 1,3,3-trinitroazetidine (TNAZ), 1-methyl-amino-2,4,6-trinitrobenzene (MATNB), 2-methyl-1,3,5-trinitrobenzene or trinitrotoluene (TNT), 2,4,6-trinitro-1,3,5-triazine or trinitrotriazine, 2,4,6-tris(trinitromethyl)-1,3,5-triazine, urea nitrate, and 1,2,3,4,5-pentakis-nitrooxy-pentane or xylitol pentanitrate, N-methyl-2-pyrrolidone, 2,4-dinitro-2,4-diazapentane, 1,2-phenylenediamine, 2-bromoaniline, 3,4-diaminotoluene, 4-fluoroaniline, thieno[3,2-b]thiophene, dimethylformamide (DMF), 2-pyrrolidone, 2-picoline-N-oxide, 4-picoline-N-oxide, naphthalene, 1-bromonaphthalene, 9-bromonaphthalene, anthracene, 9-bromoanthracene, phenanthrene, perylene, tetrathiafulvalene, phenothiazine, dibenzothiophene 4,6-dimethyldibenzothiophene, 1,2-phenylenediamine, 1,4-dimethoxybenzene, 4-aminobenzoic acid, 1,4-piperazinedicarboxaldehyde, anthranilic acid, pyrene, caprolactam, H2O, CO2, dimethylformamide (DMF), 1,4-☐☐☐☐☐☐☐☐☐-butyrolactone, and hexamethylphosphoramide.

19. The method of claim 1, wherein at least one of
the energetic compound is octahydro-1,3,5,7-tetranitro-1,3,5,7-tetrazocine (HMX) and the secondary material is N-methyl-2-pyrrolidone,
the energetic compound is octahydro-1,3,5,7-tetranitro-1,3,5,7-tetrazocine (HMX) and the secondary material is 2,4-dinitro-2,4-diazapentane in a mole ratio of about 1:2,
the energetic compound is octahydro-1,3,5,7-tetranitro-1,3,5,7-tetrazocine (HMX) and the secondary material is 1,2-phenylenediamine in a mole ratio of about 1:1,
the energetic compound is octahydro-1,3,5,7-tetranitro-1,3,5,7-tetrazocine (HMX) and the secondary material is 2-bromoaniline in a mole ratio of about 1:1,
the energetic compound is octahydro-1,3,5,7-tetranitro-1,3,5,7-tetrazocine (HMX) and the secondary material is 3,4-diaminotoluene in a mole ratio of about 1:1,
the energetic compound is octahydro-1,3,5,7-tetranitro-1,3,5,7-tetrazocine (HMX) and the secondary material is 4-fluoroaniline in a mole ratio of about 1:1,
the energetic compound is octahydro-1,3,5,7-tetranitro-1,3,5,7-tetrazocine (HMX) and the secondary material is thieno[3,2-b]thiophene in a mole ratio of about 1:1,
the energetic compound is octahydro-1,3,5,7-tetranitro-1,3,5,7-tetrazocine (HMX) and the secondary material is dimethylformamide (DMF),
the energetic compound is octahydro-1,3,5,7-tetranitro-1,3,5,7-tetrazocine (HMX) and the secondary material is 2-pyrrolidone in a mole ratio of about 1:1,
the energetic compound is octahydro-1,3,5,7-tetranitro-1,3,5,7-tetrazocine (HMX) and the secondary material is 4-picolene-N-oxide in a mole ratio of about 1:1,
the energetic compound is octahydro-1,3,5,7-tetranitro-1,3,5,7-tetrazocine (HMX) and the secondary material is 2-picoline-N-oxide in a mole ratio of about 1:2, the energetic compound is octahydro-1,3,5,7-tetranitro-1,3,5,7-tetrazocine (HMX) and the secondary material is 1,4-piperazinedicarboxaldehyde in a mole ratio of about 1:1, the energetic compound is octahydro-1,3,5,7-tetranitro-1,3,5,7-tetrazocine (HMX) and the secondary material is 2,4,6,8,10,12-hexanitro-2,4,6,8,10,12-hexaazaisowurtzitane (CL-20) in a mole ratio of about 1:2, the energetic compound is octahydro-1,3,5,7-tetranitro-1,3,5,7-tetrazocine (HMX) and the secondary material is 5-nitro-1,2,4-triazol-3-one (NTO), the energetic compound is octahydro-1,3,5,7-tetranitro-1,3,5,7-tetrazocine (HMX) and the secondary material is $H_2O$ in a mole ratio of about 2:1, the energetic compound is 2,4,6-trinitrotoluene (TNT) and the secondary material is 2,4,6,8,10,12-hexanitro-2,4,6,8,10,12-hexaazaisowurtzitane (CL-20) in a mole ratio of about 1:1, the energetic compound is 2,4,6-trinitrotoluene (TNT) and the secondary material is 1,3,5-trinitrobenzene (TNB) in a mole ratio of about 1:1, the energetic compound is 2,4,6-trinitrotoluene (TNT) and the secondary material is naphthalene in a mole ratio of about 1:1, the energetic compound is 2,4,6-trinitrotoluene (TNT) and the secondary material is 1-bromonaphthalene in a mole ratio of about 1:1, the energetic compound is 2,4,6-trinitrotoluene (TNT) and the secondary material is 9-bromonaphthalene in a mole ratio of about 1:1, the energetic compound is 2,4,6-trinitrotoluene (TNT) and the secondary material is anthracene in a mole ratio of about 1:1, the energetic compound is 2,4,6-trinitrotoluene (TNT) and the secondary material is 9-bromoanthracene in a mole ratio of about 1:1, the energetic compound is 2,4,6-trinitrotoluene (TNT) and the secondary material is phenanthrene in a mole ratio of about 1:1, the energetic compound is 2,4,6-trinitrotoluene (TNT) and the secondary material is perylene in a mole ratio of about 1:1, the energetic compound is 2,4,6-trinitrotoluene (TNT) and the secondary material is tetrathiafulvalene in a mole ratio of about 1:1, the energetic compound is 2,4,6-trinitrotoluene (TNT) and the secondary material is thieno[3,2-b]thiophene in a mole ratio of about 1:1, the energetic compound is 2,4,6-trinitrotoluene (TNT) and the secondary material is phenothiazine in a mole ratio of about 1:1, the energetic compound is 2,4,6-trinitrotoluene (TNT) and the secondary material is dibenzothiophene in a mole ratio of about 1:1, the energetic compound is 2,4,6-trinitrotoluene (TNT) and the secondary material is 4,6-dimethyldibenzothiophene in a mole ratio of about 1:1, the energetic compound is 2,4,6-trinitrotoluene (TNT) and the secondary material is 1,2-phenylenediamine in a mole ratio of about 1:1, the energetic compound is 2,4,6-trinitrotoluene (TNT) and the secondary material is 1,4-dimethoxybenzene in a mole ratio of about 1:1, the energetic compound is 2,4,6-trinitrotoluene (TNT) and the secondary material is 4-aminobenzoic acid in a mole ratio of about 1:1, the energetic compound is 2,4,6-trinitrotoluene (TNT) and the secondary material is 4-aminobenzoic acid in a mole ratio of about 1:2, the energetic compound is 2,4,6-trinitrotoluene (TNT) and the secondary material is anthranilic acid in a mole ratio of about 1:1, the energetic compound is 2,4,6-trinitrotoluene (TNT) and the secondary material is anthranilic acid in a mole ratio of about 1:2, the energetic compound is 2,4,6-trinitrotoluene (TNT) and the secondary material is pyrene in a mole ratio of about 1:1, the energetic compound is 2,4,6,8,10,12-hexanitro-2,4,6,8,10,12-hexaazaisowurtzitane (CL-20) and the secondary material is caprolactam, the energetic compound is 2,4,6,8,10,12-hexanitro-2,4,6,8,10,12-hexaazaisowurtzitane (CL-20) and the secondary material is $H_2O$ in a mole ratio of about 1:1, the energetic compound is 2,4,6,8,10,12-hexanitro-2,4,6,8,10,12-hexaazaisowurtzitane (CL-20) and the secondary material is dimethylformamide (DMF) in a mole ratio of about 1:2, the energetic compound is 2,4,6,8,10,12-hexanitro-2,4,6,8,10,12-hexaazaisowurtzitane (CL-20) and the secondary material is $CO_2$ in a mole ratio of about 2:1, the energetic compound is 2,4,6,8,10,12-hexanitro-2,4,6,8,10,12-hexaazaisowurtzitane (CL-20) and the secondary material is γ-butyrolactone in a mole ratio of about 1:1, the energetic compound is 2,4,6,8,10,12-hexanitro-2,4,6,8,10,12-hexaazaisowurtzitane (CL-20) and and the secondary material is benzotrifuroxan (BTF) in a mole ratio of about 1:1, the energetic compound is 2,4,6,8,10,12-hexanitro-2,4,6,8,10,12-hexaazaisowurtzitane (CL-20) and the secondary material is 1,4-dioxane in a mole ratio of about 2:7, the energetic compound is 2,4,6,8,10,12-hexanitro-2,4,6,8,10,12-hexaazaisowurtzitane (CL-20) and the secondary material is hexamethylphosphoramide in a mole ratio of about 1:4, the energetic compound is benzotrifuroxan (BTF) and the secondary material is 1,3,5-trinitrobenzene (TNB) in a mole ratio of about 1:1, the energetic compound is benzotrifuroxan (BTF) and the secondary material is 2-methoxy-1,3,5-trinitrobenzene or trinitroanisole (TNA) in a mole ratio of about 1:1, the energetic compound is benzotrifuroxan (BTF) and the secondary material is 2,4,6-trinitrotoluene (TNT) in a mole ratio of about 1:1, the energetic compound is benzotrifuroxan (BTF) and the secondary material is 1,3,3-trinitroazetidine (TNAZ) in a mole ratio of about 1:1, and the energetic compound is benzotrifuroxan (BTF) and the secondary material is 1-methyl-amino-2,4,6-trinitrobenzene (MATNB) in a mole ratio of about 1:1.

20. The method of claim 1, wherein the secondary material is not energetic, and wherein the energetic crystals are detonated in the fracture in the subterranean formation.

21. The method claim 20, wherein the energetic cocrystals are stable at surface temperatures and pressures, and wherein the energetic cocrystals detonated in response to at least one of heat or pressure in the subterranean formation, wherein the pressure is from closure stress of the fracture.

22. A method of treating a subterranean formation, the method comprising:

placing a composition comprising energetic cocrystals in the subterranean formation comprising at least one of a fracture, flow pathway, area surrounding a fracture, and an area surrounding a flow pathway, each energetic cocrystal independently comprising
  an energetic compound; and
  a secondary material that is not energetic;
detonating at least some of the energetic cocrystals to generate a compression wave, wherein detonating at least some of the energetic cocrystals to generate a compression wave comprises exposing at least some of the cocrystals to at least one of a compression wave, heat, pH change, pressure, friction, and vibration; and
using the compression wave to determine at least one characteristic of the fracture, flow pathway, area surrounding the fracture, or area surrounding the flow pathway.

23. The method of claim 22, wherein the energetic cocrystals are stable at surface temperatures and pressures, and wherein the energetic cocrystals detonate in response to at least one of heat or pressure in the subterranean formation, wherein the pressured is from closure stress of the fracture.

* * * * *